US007734515B1

(12) United States Patent
Frederick et al.

(10) Patent No.: US 7,734,515 B1
(45) Date of Patent: Jun. 8, 2010

(54) GENERATING NEW INVOCABLE COMPOSITE NETWORK SERVICES BASED ON MULTIPLE OTHER INVOCABLE CONSTITUENT NETWORK SERVICES

(75) Inventors: Robert Frederick, Seattle, WA (US); Gunavardhan Kakulapati, Bellevue, WA (US); Ashish Agrawal, Bangalore (IN); James R. McCann, III, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 1330 days.

(21) Appl. No.: 11/207,178

(22) Filed: Aug. 17, 2005

(51) Int. Cl.
*G07F 7/00* (2006.01)
(52) U.S. Cl. ...................................... 705/27
(58) Field of Classification Search ............ 705/26, 705/27
See application file for complete search history.

(56) References Cited

U.S. PATENT DOCUMENTS

| | | | |
|---|---|---|---|
| 5,815,665 A | 9/1998 | Teper et al. | |
| 5,826,244 A | 10/1998 | Huberman | 705/37 |
| 6,078,906 A | 6/2000 | Huberman | 705/37 |
| 7,555,547 B2 * | 6/2009 | Singh et al. | 709/224 |
| 2003/0188017 A1 | 10/2003 | Nomura | |
| 2004/0215550 A1 * | 10/2004 | Preist et al. | 705/37 |
| 2005/0096960 A1 * | 5/2005 | Plutowski et al. | 705/8 |
| 2005/0125389 A1 * | 6/2005 | Hazzard et al. | 707/3 |
| 2006/0026552 A1 * | 2/2006 | Mazzitelli et al. | 717/101 |

OTHER PUBLICATIONS

Unknown author, "Interkeel And Techspan Create E-Business Solutions Using Web Services," PR Newswire, May 30, 2001.*
"Metering and Accounting for Web Services," IBM®, Jul. 2001, http://www-106.ibm.com/developerworks/library/ws-maws/, 6 pages.
"NTT Com to Launch Asia's First UDDI Registry on Oct. 9," Oct. 8, 2002, NTT Communications, retrieved Sep. 9, 2005, from http://www.ntt.com/release_e/news02/0010/1008.html, 3 pages.
"The Bowstreet™ Business Web Exchange Fuels B2B Revolution With First-of-its-Kind 'Web Services' Marketplace," Mar. 16, 2000, Bowstreet.com Inc., retrieved Sep. 9, 2005, from http://web.archive.org/web/20010219033902/http://www.bowstreet.com/news/press_release..., 4 pages.

(Continued)

*Primary Examiner*—Amee A Shah
(74) *Attorney, Agent, or Firm*—Seed IP Law Group

(57) ABSTRACT

Techniques are described for assisting users in dynamically creating and using composite services that are based on other constituent services. In some situations, each constituent service is a Web service ("WS"), and each composite service is a new WS whose execution involves dynamically invoking multiple specified constituent WSes in a specified manner. Such techniques may be used, for example, in conjunction with an electronic WS marketplace via which third-party WS providers make their WSes available to third-party WS consumers who locate and purchase access to those WSes, such as to allow a user to dynamically create a new composite WS that is based on one or more WSes available from other WS providers and that reflects any constraints of the WS marketplace, with the composite WS available for use by other WS consumers. This abstract is not intended for use in interpreting or limiting the scope of the claims.

82 Claims, 19 Drawing Sheets

OTHER PUBLICATIONS

"The Web Services Architect: Catalysts For Fee-Based Web Services," IBM®, Nov. 2001, http://www-106.ibm.com/developerworks/library/ws-arc6/, 7pages.

"Web Service Use Case," ContentGuard Holdings, Inc., retrieved Aug, 9, 2005, from http://www.contentguard.com/reference/docs/SimpleWebServiceExampleContent.htm, 4 pages.

"Web Service Use Case: Travel Reservation—Use Case May 5, 2002," W3C®, May 2002, retrieved Aug. 9, 2005, from http://www.w3.org/2002/06/ws-example, 9 pages.

"Web Services Architecture Usage Scenarios—W3C Working Draft Jul. 30, 2002," W3C®, Jul. 2002, retrieved Aug. 2, 2005, from http://www.w3.org/TR/2002/WD-ws-arch-scenarios-20020730/, 78 pages.

"Web Services Marketplace," retrieved Sep. 9, 2005, from http://web.archive.org/web/20010404230735/www/epicentric.com/solutions/mkt.jsp, 4 pages.

Albrecht, C., et al., "Marketplace and Technology Standards For B2B. Ecommerce: Progress and Challenges," MIS Quarterly Special Issue on Standard Making, International Conference on Information Systems, Dec. 2003, Seattle, WA, pp. 188-209, 22 pages.

Binstock, A., "Staking New Territory, Breaking New Ground," retrieved Sep. 9, 2005, from http://archive.devx.com/javaSR/articles/binstock/binstock.asp, 6 pages.

Brown, R., "Epicentric Unveils Web Serices E-Hub," Mar. 21, 2001, Line56.com, retrieved Sep. 9, 2005, from http://www.line56.com/print/default.asp?ArticleID=2287, 2 pages.

Burbeck, S., "The Tao of E-Business Services—The Evolution of Web Applications Into Service-Oriented Components With Web Services," Oct. 2000, IBM®, http://www-4.ibm.com/software/developer/library/ws-tao/index.html, 13 pages.

Clark, M., "Business Architecture For A Web Services Brokerage—Understanding The Business Context Of Web Services," Aug. 1, 2001, retrieved Aug. 2, 2005, from http://www.webservicesarchitect.com/content/artciles/clark01print.asp, 5 pages.

Irani, R., "Web Serivce Intermediaries—Adding value to Web Services," Nov. 21, 2001, retrieved Aug. 2, 2005, from http://www.webservicesarchitect.com/content/artciles.irani07print.asp, 5 pages.

Khare, R., "Whiz-Bangery, Indeed: Primordial's WSBANG," Nov. 16, 2001, retrieved Sep. 9, 2005, from http://lair.xent.com/pipermail/fork/2001-November/006569.html, 2 pages.

Levitt, J., "From EDI to XML and UDDI: A Brief History of Web Services," Oct. 1, 2001, InformationWeek, retrieved Sep. 9, 2005, from http://www.informationweek.com/story/IWK20010928S0006, 3 pages.

Radding, A., "Generating Revenue from Web Services—Six Vendors With the Right Tools," Jan. 20, 2003, http://72.14.207.104/search?q=cache:W5EXBA4Lr54J:home. comcast.net/~alanradding/iaws.pdf+generating+revenue+from+web+services+radding&hl=en&gl=us&ct=clnk&cd=3, 4 pages.

Samtani, G., et al., "Integration Brokers and Web Services— Will Web Services Support Be Just Another Feature?" Jan. 30, 2002, retrieved Aug. 2, 2005, from http://www.webservicesarchitect.com/content/articles/samtani03print.asp, 5 pages.

Siddiqui, B., "UDDI Based Electronic Marketplaces—Easier Integration With UDDI and WSDL," Feb. 20, 2002, retrieved Aug. 2, 2005, from http://www.webservicesarchitect.com/content/articles/siddiqui02print.asp, 4 pages.

Tolksdorf, R., et al., "A Web Service Market Model Based on Dependencies," retrieved Sep. 9, 2005, from http://www.wiwiss.fu-berlin.de/suhl/bizer/pub/p49-tolksdorf.html, 4 pages.

Schofield, J., "The Third Era Starts Here," *The Guardian*, May 29, 2003, retrieved Nov. 4, 2003, from http://www.guardian.co.uk/print/0,3858,4678440-110837,00.html, 3 pages.

Allidex, "Frequently Asked Questions," retrieved Nov. 4, 2003, from http://www.allidex.com/faq.html, 4 pages.

UNISYS, "Web Service Marketplace," retrieved Nov. 4, 2003, from http://www.unisysfsp.com/default.aspx?catID+16, 2 pages.

Amazon.com, Inc., "Web Services FAQs," retrieved Nov. 4, 2003, from http://www.amazon.com/gp/browse.html/ref=sc_bb_1_0/104-7530911—9659969?no=3435361&me=A3.6.L, 11 pages.

Amazon.com, Inc., "Sellers and Vendors: Sell More Using Web Services," retrieved Nov. 4, 2003, from http://www.amazon.com/gp/browse.html/ref=sc_bb_1_1/104-7530911-9659969?no=3435361&me=A3.6.L, 1 page.

Amazon.com, Inc., "Associates: Enhance Your Site Using Web Services," retrieved Nov. 4, 2003, from http://www.amazon.com/gp/browse.html/ref=sc_bb_1_1/104-7530911-9659969?no=3435361&me=A3.6.L, 2 pages.

Amazon.com, Inc. "Developers: Build Solutions for Amazon Partners," retrieved Nov. 4, 2003, from http://www.amazon.com/gp/browse.html/ref=sc_bb_1_1/104-7530911-9659969?no=3435361&me=A3.6.L, 2 pages.

Amazon.com, Inc., "Web Services," retrieved Nov. 4, 2003, from http://www.amazon.com/gp/browse.html/104-7530911-9659969?node=3435361, 2 pages.

Web Services Architect, "Web Services Resources," retrieved Nov. 6, 2003, from http://www.webservicesarchitect.com/resources.asp, 6 pages.

XMETHODS website, retrieved Nov. 6, 2003, from http://www.xmethods.net/, 3 pages.

Waldspurger, C. A. et al., "Spawn: A Distributed Computational Economy," May 1989, Xerox Palo Alto Research Center, 32 pages.

E2OPEN™, "E2open Products," retrieved Nov. 7, 2003, from http://www.e2open.com/products/, 3 pages.

E2OPEN™, "The E2open Integration Platform," retrieved Nov. 7, 2003, from http://www.e2open.com/downloads/e2open_integration_platform_datasheet.pdf, 5 pages.

Westglobal, "Products—Overview," retrieved Nov. 7, 2003, from http://www.westglobal.com/products/mscape_overview.htm, 21 pages.

Westglobal, "Products—Revenue Management Module," retrieved Nov. 7, 2003, from http://www.westglobal.com/products/mscape_revman.htm, 3 pages.

Westglobal, "WestGlobal mScape™ Web Services Business Management System," retrieved Nov. 7, 2003, from http://www.westglobal.com/downloadable_media/mscape_literature.zip, 2 pages.

Actional, "The Web Services Management Platform," retrieved Nov. 7, 2003, from http://www.actional.com/products/web_services/index.asp, 3 pages.

Actional, "Web Services Management Platform: Managing the Impact of Change in an Enterprise Web Services Network," Mar. 2003, retrieved Nov. 7, 2003, from http://www.actional.com/downloads/products/managing.enterpriseweb.services.network.pdf 26 pages.

Grand Central™ Communications website, retrieved Nov. 6, 2003, from http://www.grandcentral.com/products/, 2 pages.

Grand Central™ Communications, Frequently Asked Questions, retrieved Nov. 6, 2003, from http://www.grandcentral.com/products/faqs/index_html, 5 pages.

ZapThink, LLC, ZapThink Briefing Note—Oct. 8, 2002, retrieved Nov. 7, 2003, from http://www.grandcentral.com/assets/docs/GC.zapthink_report.pdf, 5 pages.

ebizQ, "Product Quicktake—Grand Central Communications Web Services Network," ebizQ Insider, Summer 2003, retrieved Nov. 7, 2003, from http://www.ebizq.net/reports/1884.html?download=1, 2 pages.

Sterling Commerce, "Sterling Information Broker," retrieved Nov. 10, 2003, from http://www.sterlingcommerce.com/solutions/em/comerce/iibs.html, 3 pages.

Sterling Commerce, "Sterling Information Broker," retrieved Nov. 10, 2003, from http://www.sterlingcommerce.com/PDF/Solutions/Sterling/SC0040.InfoBrokerOver.6-02.pdf, 4 pages.

Smith, Rick, "Striking While the Iron is Red Hot: StrikeIron Unveils Its Web Network," *LocalTechWire*, Jun. 25, 2004, retrieved Sep. 22, 2005, from http://www.localtechwire.com/article.cfm?u=8509, 3 pages StrikeIron, Inc., "StrikeIron Launches the Web Services Business Network," Jun. 23, 2004, retrieved Sep. 8, 2005, from http://www.strikeiron.com/news/si_launches.aspx, 3 pages.

Lee, Yvonne L., "StrikeIron's Hot for Web Services," *SD Times*, Jun. 1, 2004, retrieved Sep. 12, 2005, from http://www.strikeiron.com/doc/SDTimes060104.pdf, 1 page.

StrikeIron, Inc., "StrikeIron Web Services Business Network™ Overview," retrieved Sep. 12, 2005, from http://www.strikeiron.com/doc/StrikeIronWebServicesBusinessNetworkOverview.pdf, 24 pages.

SalCentral, "WSDL, SOAP, Web Services Search Engine and Web Service Tracking," Oct. 11, 2003, retrieved Sep. 7, 2005, from http://web.archive.org/web/20031011101544/www.salcentral.com/salnet/webserviceswsdlne.asp, 1 page.

SalCentral, "WSDL, SOAP and Web Services and Quality Assurance and promotion," Oct. 4, 2003, retrieved Sep. 7, 2005, from http://web.archive.org/web/20031004143940/www.salcentral.com/salnet/webservicewhat.asp, 2 pages.

SalCentral, "The Napster of Web Services", Oct. 4, 2003, retrieved Sep. 7, 2005, from http://web.archive.org/web/20031004143406/www.salcentral.com/salnet/webservicesnapster.asp, 2 pages.

SalCentral, "Subscription of Web Services Using the 'Authorise' Web Service," Oct. 5, 2003, retrieved Sep. 7, 2005, from http://web.archive.org/web/20031005075820/www.salcentral.com/salnet/wpsubws.htm, 5 pages.

Taft, Darryl K., "Start-Up Presents ASP Opportunity For Java Developers," *CRN*, Jul. 31, 2000, retrieved Sep. 20, 2005, from http://www.crn.com/sections/breakingnews/breakingnews.jhtml?articleId=18834381, 3 pages.

SoftwareMarkets, inc, "Frequently Asked Questions from Developers," Sep. 18, 2000, retrieved Sep. 8, 2005, from http://web.archive.org/web/20000918003355/www.softwaremarkets.com/info/faqdevs.html, 3 pages.

Jamcracker, Inc., "Jamcracker announces Pivot Path: Fully integrated software suite for Identity Management," Nov. 11, 2003, retrieved Sep. 12, 2005, from http://web.archive.org/web/20040607054618/http://jamcracker.com/pivot_path_release.pdf, 2pages.

Sabre Travel Network, Sabre Travel Network Launches Web Services Capabilities for Agents, Jul. 28, 2003, retrieved Sep. 13, 2005, from http://phx.corporate-ir.net/phoenix.zhtml?c=73098&p=IROL-NewsText&t=Regular&id=435603&logo=logo03, 2 pages.

Business Wire, "Desktop.com Introduces Devtop, the First Integrated Platform for Building, Deploying, and Distributing Web-Based Applications," Jun. 26, 2000, retrieved Sep. 8, 2005, from http://www.findarticles.com/p/articles/mi_m0EIN/is_2000_June_26/ai_62915951/print, 2 pages.

CPA2Biz, Inc., "New Rivio™ Business Services Suite," Apr. 18, 2001, retrieved Sep. 22, 2005, from https://www.cpa2biz.com/Corp/Press+Releases/PR_WebTools_18APRO1.htm, 3 pages.

CPA2Biz, Inc., "Verizon Unveils Rivio™ Web Services Suite for Small Business Customers," May 29, 2001, retrieved Sep. 22, 2005, from https://www.cpa2biz.com/Corp/Press+Releases/PR_VERIZON_29MAY01.htm, 3 pages..

Oasis, UDDI.org, retrieved Sep. 8, 2005, from http://www.uddi.org/find.html, 2 pages.

W3C, "WS Choreography Model Overview," Mar. 24, 2004, retrieved Sep. 8, 2005, from http://www.w3.org/TR/2004/WD-ws-chor-model-20040324/, 35 pages.

Box, Don et al., "Web Services Policy Framework (WS-Policy)," Jun. 2, 2003, retrieved Sep. 12, 2005, from ftp://www6.software.ibm.com/software/developer/library/ws-policy2003.pdf, 21 pages.

Bunting, Doug et al., "Web Services Composite Application Framework (WS-CAF)," Jul. 28, 2003, retrieved Sep. 12, 2005, from http://www.oasis-open.org/committees/download.php/4343/WS-CAF%20Primer.pdf, 23 pages.

Leymann, F., "Web Services Flow Language (WSFL 1.0)," IBM Software Group, May 2001, 108 pages.

Sirin, E., et al., "Semi-automatic Composition of Web Services Using Semantic Descriptions," In *Web Services: Modeling, Architecture and Infrastructure workshop in ICEIS 2003*, Angers, France, Apr. 2003, from http://www.mindswap.org/papers/composition.pdf, 9 pages.

Andrews, T., et al., "Specification: Business Process Execution Language for Web Services Version 1.1," IBM developerWorks, May 5, 2003, retrieved Jan. 31, 2005, from http://www-106.ibm.com/developerworks/webservices/library/ws-bpel/, 124 pages.

\* cited by examiner

Example Customer Search Results From Web Store ZZZ

Search Results for "Map" in Item Type "Web Services"

| | 111 WS Category | 112 Item Name | 113 Item Source | 114 Item Price | 115 Item Conditions Of Use | 116 Item ID | 117 Item Description |
|---|---|---|---|---|---|---|---|
| 110 | Mapping Services: 15 matches | | | | | | |
| 110a | | AAA Street Maps By Street Address | WS Provider AAA | $0.05/use or $500/month | max uses/month=30000 | 0001342133 | Provides GIF images at up to 100M/inch |
| 110b | | AAA Street Maps By Latitude/Longitude | WS Provider AAA | $0.08/use | available to subscribers to AAA GPS service | 0009287341 | Provides GIF images at up to 100M/inch |
| 110c | | Driving Directions BBB | WS Provider BBB | $0.05/use | max uses/hour=1000; subject to other Terms at www.bbb7b.com/TC.htm | S072086133 | Textual driving directions between starting and ending zip codes ... |
| 110d | | Driving Directions ZZZ | Web Store ZZZ | $200/month | | 9874933245 | Textual driving directions and overview maps for U.S. street addresses |
| 110e | | Topographical Maps (high resolution) | WS Provider AAA | $0.10/use | | 2987238765 | High resolution JPEG images at up to 30M/inch |
| 110f | | Topographical Maps (low resolution) | WS Provider AAA | $0.02/use | subject to Terms at www.aaa7a.com/TC.htm | 2981234778 | 640x480 resolution JPEG images at 100M/inch |
| 110g | | see all matches in Mapping Services | | | | | |
| 110h | Scientific DBs: 3 matches | | | | | | |
| 110i | | Human Genome Maps see all matches in Scientific DBs | WS Provider CCC | $0.01/use | non-commercial use only | 7813292254 | Genetic map information |
| | Weather Services: 1 match | | | | | | |
| 110j | | Live Weather Maps | Web Store ZZZ | $1/100 uses | not for use in composite WSes | 4397234563 | Current weather service maps worldwide |
| ... | | | | | | | |

*Fig. 1A*

Example Customer Shopping Screen for a Web Service Item

Welcome, Customer ABC. If you purchase a multi-use subscription today, you'll receive an additional 5% discount!

Example Web Service Registration Screen

Welcome, Web Service Provider BBB! Provide the information below to register a new Web Service available to customers of Web Store ZZZ. ⎬ 131

1. Specify a name for your Web Service being registered. ⎬ 133

| Driving Directions BBB |

2. Optionally specify one or more terms related to the Web Service. ⎬ 134

| map, directions, driving, portable |

3. Specify one or more usage prices for the Web Service.

| Usage Type | Restrictions | Price | |
   | --- | --- | --- | --- |
   | per use | maximum 1000 uses/hour | $0.05 | - 135a |
   | per month | maximum 500 uses/day; ... | $500 | - 135b |
   | per 1000 uses | — | — | - 135c |

⎬ 135

4. Specify any non-default conditions of use for the Web Service. ⎬ 136

| link:www.bbb7b.com/TC.htm |

5. Specify a description of the Web Service for customers.

| Textual driving directions between starting and ending zip codes. May be useful for customers having portable devices with limited display capabilities. |

⎬ 137

6. Allow use as a constituent service for other composite services [X]   138

| Continue Web Service Registration |   ⎬ 139

*Fig. 1C*

Example WSDL for "Driving Directions BBB" Web Service

```
<definitions>
 <types>
   <complexType name="ArrayOf_xsd_string">
     <complexContent>
       <restriction base="soapenc:Array">
         <attribute ref="soapenc:arrayType" arrayType="xsd:string[]"/>
       </restriction> </complexContent> </complexType> </types>

<message name="getDirRequest">
     <part name="fromZipCode" type="xsd:int"/>  <part name="toZipCode" type="xsd:int"/>
   </message>
   <message name="DirResponse"> <part name="cities" type="impl:ArrayOf_xsd_string"/>
     <part name="directions" type="xsd:string"/> </message>

<portType name="DrivingDirectionsService">
     <operation name="getDirections" parameterOrder="fromZipCode toZipCode">
       <input name="getDirectionsRequest" message="impl:getDirRequest"/>
       <output name="DirectionsResponse" message="impl:DirResponse"/>
     </operation> </portType>

<binding name="DirectionsSoapBinding" type="impl:DrivingDirectionsService">
     <soap:binding style="rpc" ... />
     <operation name="getDirections"> <soap:operation soapAction=""/>
       <input name="getDirectionsRequest"> <soap:body use="encoded" .../> </input>
       <output name="DirectionsResponse"> <soap:body use="encoded" ... /> </output>
     </operation> </binding>

<service name="DrivingDirectionsService">
     <documentation> Provides driving directions given starting and ending zip codes. Returns
       the driving directions as well as a list of cities that will be encountered enroute. Visit
       http://www.bbb7b.com/dds/ for more information. </documentation>
     <price amount="0.05" currency="USD"/>
     <usage> max uses/hour=1000 </usage>
     <license>
       <term> Warranty: Data provided "AS IS." All warranties are disclaimed. </term>
       <term> Liability: Provider is not liable for any damages from use of this data. </term>
       <term> Termination: Provider may terminate access after 30 days notice. </term>
     </license>
     <port name="Directions" binding="impl:DirectionsSoapBinding">
       <soap:address location="http://bbb7b.com/Directions.asp"/> </port>
   </service>
   ...
</definitions>
```

*Fig. 1D*

Example Web Service Registration Screen (continued)   ⎫
                                                      ⎬ 155
Web Service Provider BBB, please continue to provide the information below to register your Web service.

Specify the indicated types of information for the parameters of your Web service.

155a - [ Continue ]    155b - [ Cancel ]

| | 183a | 183b | 183c | 183d | 183e | 183f |
|---|---|---|---|---|---|---|
| | WS Operations | Parameter Name | Data Flow Direction | Parameter Data Type | Parameter Representation Type | Parameter Representation Type Description |
| | GetDirections | | | | | |
| 183w | | fromZipCode | input | xsd:int | zipcodeInteger ▶ | integer as a 5-digit zipcode |
| 183x | | toZipCode | input | xsd:int | zipcodeInteger ▶ | integer as a 5-digit zipcode |
| 183y | | cities | output | impl:ArrayOf_xsd_string | list:cityName ▶ | list of text strings, each with a city name |
| 183z | | directions | output | xsd:string | <unknown> ▶ | |
| 184a | | | | | geographicDirection | - text string with 1 of "north", "south", … |
| 184b | | | | | list:geographicDirection | - list with multiple text strings, each with … |
| 184c | | | | | spatialDirection | - text string with 1 of "up", "down", … |
| 184d | | | | | list:spatialDirection | - list with multiple text strings, each with … |
| | | | | | —OR— | |
| 184e | | | | | Add new representation type | - No match to existing defined representation types? Define a new one! |

Fig. 1E

Example Composite Web Service Creation Screen

Welcome, Customer ABC! Provide the information below to create a new composite Web Service.

1. Select registered Web Services on which to base your new composite Web Service, and then select "Continue".

152a - [ Continue ]   152b - [ Cancel ]

| | 161 | 163 | 164 | 165 | 167 | 168 |
|---|---|---|---|---|---|---|
| 160 | WS Category | WS Name | WS Source | WS Price | WS Conditions Of Use | WS Textual Description |
| | Mapping Services: 15 matches | | | | | |
| 160c | | [X] Driving Directions BBB | WS Provider BBB | $0.05/use | max uses/hour=1000; ... | Textual driving directions ... |
| 160d | | [ ] Driving Directions ZZZ | Web Store ZZZ | $200/month | | Textual driving directions ... |
| | ... | | | | | |
| | Business Information Retrieval Services: 500+ matches | | | | | |
| 160n | | [X] Radio Station Finder | WS Provider RRR | - | max uses/hour=500; supplied advertisement must be presented to end-user; access may be terminated without notice; ... | Lists radio stations by zip code, and provides a local business textual advertisement |
| 160o | | [X] EEE Hotel Finder | WS Provider EEE | - | | Lists hotels by city |
| 160p | | [X] Hotel Quality Ratings | Web Store ZZZ | $1/100 uses | not for use for comparison/review | Provides hotel quality ratings |
| 160q | | DDD Hotel Ratings | WS Provider DDD | $0.02/use | non-commercial use only | DDD's Hotel Star Ratings |
| 160r | | Hotel Customer Ratings | Web Store ZZZ | - | not for use in composite WSes | Gives hotel customers' ratings |
| | ... | | | | | |

Example Composite Web Service Creation Screen (continued)

Customer ABC, please continue to provide the information below to create your new composite Web Service.

2. Select operations of the selected Web Services for your new composite Web Service, and then select "Continue".

153a - [Continue]    153b - [Cancel]

| Selected WSes | WS Operations | Parameter Name | Parameter Representation Type | Parameter Data Type | Data Flow Direction |
|---|---|---|---|---|---|
| Driving Directions BBB | | | | | |
| [X] | GetDirections | fromZipCode | zipcode | xsd:int | input |
| | | toZipCode | zipcode | xsd:int | input |
| | | cities | list:cityName | impl:ArrayOf_xsd_string | output |
| | | directions | list:textDirections | xsd:string | output |
| Radio Station Finder | | | | | |
| [X] | GetRSByZipCode | zipCode | zipcode | xsd:int | input |
| | | genre | musicGenre | xsd:string | input (opt) |
| | | rsList | list:radioStation | impl:xsd_string_array | output |
| | | advertisement | textAdvertisement | xsd:string | output |
| EEE Hotel Finder | | | | | |
| [X] | GetHotelsByCityName | cityName | cityName | xsd:string | input |
| | | hotelNameListC | hotelNameList | impl:Array_xsd_string | output |
| [ ] | GetHotelsByZipCode | zipcode | zipcode | xsd:string | input |
| | | hotelNameListZ | hotelNameList | impl:Array_xsd_string | output |
| Hotel Quality Ratings | | | | | |
| [X] | GetHotelStarRating | hotelName | hotelName | xsd:string | input |
| | | city | cityName | xsd:string | input |
| | | starRating | hotelStarRating | xsd:string | output |
| [X] | GetHotelSatisfactionPercent | hotelName | hotelName | xsd:string | input |
| | | city | cityName | xsd:string | input |
| | | satisfactionPercent | | xsd:int | output |

*Fig. 1H*

Example dynamically generated WSDL for new composite Web Service

```
    <definitions>
     <types>
       <complexType name="RadioStationCityHotelRatingArray">
         <complexContent> ... </complexContent> </complexType> </types>
5    <message name="ABCgetTripInfo"> <part name="ZZZfromZipCode" type="xsd:int"/>
         <part name="ZZZzipCode" type="xsd:int"/> </message>
     <message name="ABCtripInfo"> <part name="advertisement" type="xsd:string"/>
         <part name="tripInfo" type="impl:RadioStationCityHotelRatingArray"/> </message>
     <message name="getHSP"> <part name="hotelName" type="xsd:string"/>
10       <part name="city" type="xsd:string"/> </message>
     <message name="HSP"> <part name="ZZZsatisfactionPercent" type="xsd:int"/> </message>
     <portType name="ABCTripInformationService">
       <operation name="cityAndHotelQuality" parameterOrder="ZZZfromZipCode ZZZzipCode">
         <input name="tripInfoRequest" message="impl:ABCgetTripInfo"/>
15       <output name="tripInfoResponse" message="impl:ABCtripInfo"/> </operation>
       <operation name="hotelSatisfaction" parameterOrder="hotelName city">
         <input name="hInfo" message="impl:getHSP"/>
         <output name="HSP" message="impl:HSP"/> </operation> </portType>
     <binding name="TripInfoSoapBinding" type="impl:ABCTripInformationService">
20     <soap:binding style="rpc" ... />
       <operation name="cityAndHotelQuality"> <soap:operation soapAction=""/>
         <input name="tripInfoRequest"> <soap:body use="encoded" ... /> </input>
         <output name="tripInfoResponse"> <soap:body use="encoded" ... /> </output>
       </operation>   ...   </binding>
25   <service name="ABCTripInformationService">
       <documentation> Provides driving directions given starting and ending zip codes. Returns
         the driving directions as well as a list of cities that will be encountered enroute. Visit
         http://www.bbb7b.com/dds/ for more information. Also provides a list of hotels for
         each city. Also provides a quality rating for each hotel. ... </documentation>
30     <price amount="0.20" currency="USD"/>
       <usage> max uses/hour=500 </usage>
       <license>
         <term> Warranty: Data provided "AS IS." All warranties are disclaimed. </term>
         <term> Liability: Provider is not liable for any damages from use of this data. </term>
35       <term> Termination: Provider may terminate access at any time without notice. </term>
         ... </license>
       <port name="Directions" binding="impl:TripInfoSoapBinding">
         <soap:address location="http://zzz.com/ABCTripInformationService.asp"/> </port>
     </service>
40   ...
    </definitions>
```

GENERATING NEW INVOCABLE COMPOSITE NETWORK SERVICES BASED ON MULTIPLE OTHER INVOCABLE CONSTITUENT NETWORK SERVICES

CROSS REFERENCE TO RELATED APPLICATIONS

This application is related to co-pending U.S. patent application Ser. No. 10/766,697, filed Jan. 27, 2004 and entitled "Providing A Marketplace For Web Services," and is related to co-pending U.S. patent application Ser. No. 10/894,347, filed Jul. 19, 2004 and entitled "Automatic Authorization Of Programmatic Transactions," each of which is hereby incorporated by reference in its entirety. This application is also related to U.S. patent application Ser. No. 11/207,179, filed concurrently and entitled "Execution Of Composite Services," which is also hereby incorporated by reference in its entirety.

TECHNICAL FIELD

The following disclosure relates generally to techniques for dynamically creating and using composite services that are based on other services.

BACKGROUND

Various mechanisms exist to allow computers and executing software applications to interact. For example, remote procedure call ("RPC") protocols have long existed that allow a program on one computer to cause a program on another computer to be executed, and various object-oriented and other architectures such as CORBA ("Common Object Request Broker Architecture"), DCOM ("Distributed Component Object Model"), Java RMI ("Remote Method Invocation"), JavaSpaces, Jini, JXTA, and UPnP ("Universal Plug-n-Play") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the World Wide Web ("Web") has provided additional opportunities for computers to inter-communicate. For example, much current Web use involves users interactively requesting Web pages from Web servers (e.g., via executing Web browser applications of the users) and receiving the requested information in response. In addition to such interactive user specification of requested information, there is also growing use of the Web to support the programmatic interaction of remote applications to exchange information via defined APIs ("application program interfaces"), such as via Web services. Web services allow heterogeneous applications and computers to interact, and can be defined and implemented using a variety of underlying protocols and techniques. For example, some Web service implementations return data in computer-readable XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocation interfaces (e.g., using XML format), and UDDI ("Universal Description, Discovery, and Integration service") for discovery of available services.

Although Web services allow various applications and computers to interact, the current implementations and uses of Web services have various limitations. For example, while Web services are increasingly being provided from various companies and other entities for various purposes, such available Web services are typically focused on very limited functionality related to the entity providing the service. Thus, for example, a company that generates driving directions information might provide a Web service that enables programmatic access to such information, but would not typically provide Web services that use the driving directions information (or other types of information) to enable a variety of other types of functionality for potential consumers, such as to provide the driving directions in alternative formats (e.g., in spoken form or in various languages) or to provide various additional types of location-based information (e.g., corresponding to locations in the driving directions). While available Web services from various providers may each provide useful functionality of a limited type, it may often be the case that a potential consumer desires a combination of various functionalities that are not provided by a single available Web service, and the potential consumer may lack the resources or capabilities to manually invoke and combine those various Web services in the proper manner to achieve the desired results.

BRIEF DESCRIPTION OF THE DRAWINGS

FIGS. 1A-1L illustrate examples of a user interface for Web service provider users and Web service consumer users to interact with an embodiment of a Web Services Marketplace ("WSM") system, and of corresponding information related to the interactions.

DETAILED DESCRIPTION

Figure 1B:
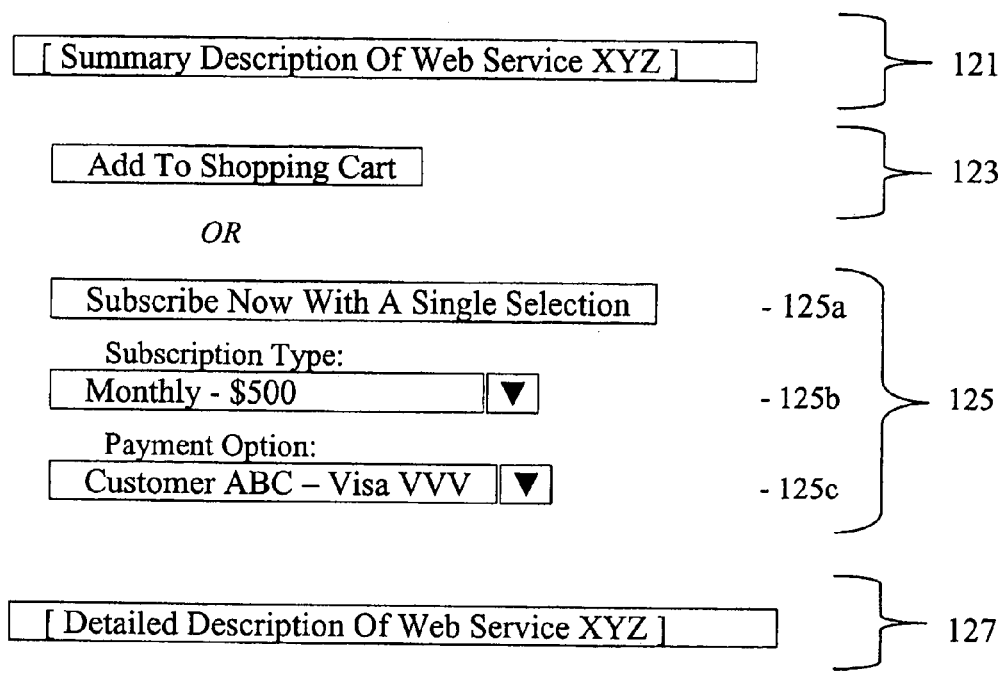

A software facility is described below that assists in dynamically creating and using composite services that are based on other constituent services. In at least some embodiments, the constituent services are each Web services (e.g., Web services provided by multiple unrelated Web service providers), and each composite service is a new Web service ("WS") whose execution involves invoking multiple specified constituent WSes in a specified manner. The creation of a composite service based on one or more other constituent services may be performed in various manners in various embodiments. As discussed in greater detail below, in some embodiments a user may specify various information regarding how to combine capabilities of various constituent services in order to provide a composite service, such as in an iterative manner by responding to automatically generated suggestions or other prompts that are presented to the user. Such composite service provision information may then be stored for later use when providing the composite service, whether in the form it was specified or after having been manipulated (e.g., to allow for execution or other evaluation at the time of composite service provision). Furthermore, in some embodiments the composite service provision information is associated with information to be used in accessing the composite service, such as a unique identifier generated for the composite service and/or unique invocation information provided for the composite service (e.g., a unique network endpoint for a composite WS that can be accessed from a remote computing device using a specified network protocol and message format, such as a network endpoint specified by a WSDL interface or other network address that is dynamically defined or generated for the composite WS).

The composite service provision information regarding how to combine and use the capabilities of constituent services for a composite service may be specified in various ways in various embodiments, as discussed in greater detail below. For example, indications of relationships between input and output parameters for the constituent services may be specified, such as to indicate that an output parameter for a first constituent service is to be mapped to an input parameter for a second constituent service in such a manner that an output value from the output parameter will be used as an input value for the input parameter (whether without modification, or instead after a specified type of processing is first performed on the output parameter value, such as to change the data format or to modify the data value in a specified manner). Furthermore, in at least some embodiments such parameter mapping may be facilitated by storing and using information about the types of information that the various parameters represent, which may be obtained for the parameters of a constituent service in various ways (e.g., when the constituent service is initially registered as an available service). For example, such parameter representation type information may indicate that illustrative first and second parameters each have values that are integers representing a zip code, and that a third parameter's values are strings representing a city name—in such a situation, it may be appropriate to map the first and second parameters together in various ways, but it would not typically be appropriate to map the first parameter and the third parameter since they represent different types of information. In some embodiments, the composite service provision information may also specify information about an order in which to execute or otherwise access constituent services in other ways, such as to indicate groups of constituent services to be accessed in parallel and/or in a serial manner. More generally, in some embodiments the composite service provision information may include various user-specified logic to be executed or evaluated as part of providing the composite service (e.g., using programming constructs such as conditional logic, loops, etc.), such as to indicate processing to be performed on information before it is to be provided to one or more of the constituent services and/or after it is received from accessing one or more of the constituent services. In addition, in an least some embodiments various additional capabilities may be provided to facilitate interactions between constituent services with differing capabilities, such as protocol mapping or translation capabilities to facilitate interactions or other relationships between services using different communication protocols or communication models, and/or such as data transformation capabilities to manipulate data values in various ways.

In at least some embodiments, the creation of a composite service based on one or more constituent services includes dynamically generating various types of interface description information for the composite service, such as in an automatic manner based at least in part on interface description information for the constituent services. Such interface description information may include a definition of an interface (e.g., an API) for accessing the composite service, with the interface definition information available for later use in accessing the composite service by the software facility and/or by a third-party consumer of the composite service (e.g., in an automatic manner when the interface description information is specified in a computer-readable format). For example, when creating a composite WS based on one or more constituent WSes, a WSDL interface definition document may be dynamically generated for the composite WS in order to describe in a computer-readable format how to access one or more interfaces of the composite WS, such as by combining information from WSDL documents or other interface definitions for the constituent WSes. Additional details regarding WSDL documents are available in the "Web Services Description Language (WSDL) Version 2.0 Part1: Core Language, W3C Working Draft 10 May 2005" document, dated May 10, 2005 and available at http://www.w3.org/TR/2005/WD-wsdl20-20050510, and in the "Web Services Description Language (WSDL) Version 2.0 Part 2: Adjuncts, W3C Working Draft May 2005" document, dated May 10, 2005 and available at http://www.w3.org/TR/2005/WD-wsdl20-adjuncts-20050510, each of which is incorporated herein by reference in its entirety.

As part of creating a composite service and defining appropriate interface(s) for the composite service, a user performing such composite service creation may in at least some embodiments further define various aspects of the input to and/or output from the composite service, as discussed in greater detail below. For example, the user may specify one or more input parameters to be used with the composite service, such as by naming each input parameter, providing information regarding the type of information that each parameter represents, and defining how values provided for each input parameter during an invocation will be used by the composite service (e.g., by mapping a composite service input parameter to one or more input parameters of one or more constituent services used by the composite service, such as after the composite service input parameter value is modified or manipulated in a specified manner). Similarly, the user may specify how output or other response information from execution of the composite service will be provided to a program that invokes the composite service, such as values of one or more specified output parameters (e.g., specified in a manner similar to the input parameters, such as with each composite service output parameter value based on values from one or more output parameters of one or more of the constituent services), or instead a more complex output document (e.g., generated as output based on specified processing to be performed, such as the output from an XSLT (or "eXtensible Stylesheet Language Transformations") stylesheet or from another type of user-specified information processing).

Furthermore, in some embodiments multiple alternative mechanisms may be provided for invoking a composite service or otherwise providing input information to the composite service, and similarly multiple alternative mechanisms may be provided for receiving output information from a composite service. For example, in at least some embodiments access to a composite service may be provided via multiple alternative protocols, which in some situations may include defining multiple interfaces and/or network endpoints or other addresses for use with the alternative protocols. As one illustrative example, in some embodiments a new composite WS may be accessible via each of an interface using SOAP messages, an interface that uses network-addressable resources (e.g., as part of the REpresentational State Transfer, or "REST", distributed interaction model), and an interface based on simple XML documents sent over HTTP (e.g., using an RPC interaction model that focuses on available operations), with a user of the composite WS able to select and use one or more of the interfaces as desired. Similarly, output information may be provided using various protocols and in various manners, including using a different protocol for output than was used for input, such as selected by a user of the composite WS. Thus, the alternative mechanisms provide greater availability of the composite service to potential users using a variety of communication or other interaction capabilities. In addition, such multiple alternative mechanisms may be generated in various ways, including automatically by the software facility and/or based on interactions with a user creating the composite service to define the alternative mechanisms. Additional details regarding SOAP are available in the "SOAP Version 1.2 Part1: Messaging Framework, W3C Recommendation 24 Jun. 2003" document, dated Jun. 24, 2003 and available at http://www.w3.org/TR/2003/REC-soap12-part1-20030624, and in the "SOAP Version 1.2 Part 2: Adjuncts, W3C Recommendation 24 Jun. 2003" document, dated Jun. 24, 2003 and available at http://www.w3.org/TR/2003/REC-soap12-part2-20030624, each of which is incorporated herein by reference in its entirety. Additional details regarding XSLT and other processing of XML documents are available from the "XSL Transformations (XSLT) Version 2.0, W3C Working Draft 4 Apr. 2005" document, dated Apr. 4, 2005 and available at "http://www.w3.org/TR/2005/WD-xslt20-20050404", and the "XML Path Language (XPath) 2.0, W3C Working Draft 4 Apr. 2005" document, dated Apr. 4, 2005 and available at "http://www.w3.org/TR/2005/WD-xpath20-20050404", each of which is incorporated herein by reference.

Moreover, in some embodiments a variety of other types of interface description information may be dynamically generated for a composite service, such as by combining related information that is available for the constituent services. For example, as discussed in greater detail below, each composite service may optionally have one or more associated use prices, documentation regarding the composite service, various other administrative information (e.g., contact personnel and/or other contact information), and one or more of various types of use conditions that may restrict use of the composite service. Such use conditions may include, for example, various access rights or other security-related information that limit who can gain access to the composite service, such as by identifying who may obtain information about the service and under what conditions (e.g., the existence of the service, associated interface description information for the service, etc.), by identifying who may use the composite service and under what conditions (e.g., by defining specific allowed and/or disallowed users, by defining characteristics of allowed and/or disallowed users, by defining details of a subscription needed by a user to use the composite service, etc.), and/or by identifying who may modify information about the composite service and under what conditions. Similarly, such use conditions may include various other types of information, such as access quotas that limit how much access to a service is permitted (whether for a specific user and/or for all users), and contractual licensing terms governing use of the composite service. These various types of information for a composite or constituent service may be enforced by the WSM in various ways, such as by utilizing use conditions for a service to control its use with other services, its use by specific users and/or types of users (e.g., users meeting specified criteria), its use with specific programs and/or types of programs, and/or its use based on a variety of types of other criteria (e.g., geographic location, time-related constraints, etc.).

The disclosed techniques for dynamically creating and using composite services that are based on other constituent services may be used in a variety of settings. For example, in some embodiments the techniques may be provided by a computing system and/or entity that does not provide any of the constituent services, while in other embodiments some or all of the constituent services may be provided by or via the computing system and/or entity providing the composite service creation and/or use capabilities. In some embodiments, an organization may provide such composite service creation and/or use capabilities for internal use based on constituent services that are available internally, such as in a corporate environment using an intranet. Alternatively, the disclosed techniques may instead be used in some embodiments in a manner that is not limited to use by a single organization or group of affiliated users, such as when used in a marketplace setting that is available to large numbers of unrelated or unaffiliated providers and consumers of services. Furthermore, in some embodiments multiple marketplaces may exist (e.g., marketplaces operated by distinct entities, such as with the marketplaces unaffiliated with each other and/or the entities unaffiliated with each other) to provide access to Web services and/or other types of services, and if so the techniques may be provided for use with one of the marketplaces in such a manner as to allow use of services from another marketplace (e.g., to allow a composite service to be created at the one marketplace that uses one or more other services from other marketplaces as constituent services, such as if references to at least some of those other services have been registered at the one marketplace).

As one example, the disclosed techniques may be used in conjunction with an electronic WS marketplace ("WSM"), such as a marketplace that allows third-party WS providers to register their WSes with the electronic marketplace so as to make those WSes available to some or all third-party WSM users who are potential consumers of the WSes. In particular, in some embodiments a WS provider may specify pricing information for the use of their WS and/or other WS use conditions at the time of WS registration. The WS providers may also specify the manner(s) in which their WSes are to be invoked, as well as various description information about their WSes that may be provided to potential consumers to assist in their determination of whether to use the WS. Once WSes have been registered at the WSM, they can be made available to potential WS consumers in various ways, as discussed in greater detail below. In some embodiments, a WS provider may also need to first register with the WSM as a user before registering their WSes (e.g., to provide contact information, information on how payments to the WS provider are to be made, etc.). Such a WSM may, for example, be provided by an embodiment of the software facility, or a WSM may instead employ the software facility to provide capabilities related to the creation and/or use of composite services.

In such embodiments, composite WSes may also be registered with the WSM and used by WS consumers, with each composite WS invoking one or more other WSes when used (e.g., other registered WSes, including other previously registered composite WSes). As previously noted, a composite WS may include logic specified by the creator of the composite WS (e.g., in an executable form, such as based on a scripting language, or in a declarative format to be processed by other software, such as in XML to be processed using XSLT and/or XPath or another format) that is related to how and when to invoke the other WSes, such as to provide conditional invocation of one WS based on the response information received from another WS. As one example, a composite WS may invoke two or more other WSes (e.g., WSes from WS providers unrelated to the creator of the composite WS) in order to obtain response information that is then aggregated to provide the response information for the composite WS. As another example, some or all of the constituent WSes specified for the composite WS may be provided by the composite WS creator, and the composite WS specifies logic such that one of the specified constituent WSes is invoked only if appropriate information is received from earlier invocation of another of the WSes (e.g., if that received information is to be used as part of that later invocation). As yet another example, a composite WS may invoke a single constituent WS (e.g., from a WS provider other than the composite WS creator) in order to encapsulate that single constituent WS using additional information and/or logic specified as part of the composite WS (e.g., to perform additional input and/or output processing and/or to hide details of the underlying constituent WS from entities that invoke the composite WS). In addition to using specified logic for a composite service to determine how and when to invoke other constituent services, in at least some embodiments such specified logic may instead or additionally provide or generate additional information for use in providing the response information for the composite service (e.g., by retrieving stored information and/or generating new information), such as in addition to response information from one or more of the constituent services. In some embodiments, any third party can create and register composite WSes that invoke other WSes provided by other WS providers, while in other embodiments various restrictions may be imposed on the creation of such composite WSes (e.g., to limit composite WS creation to WS providers that provide at least one of or all of the constituent WSes used by the composite WS). In addition, in some embodiments such composite WSes may have their own specified pricing information and other use conditions, while in other embodiments such pricing and use conditions may instead be automatically determined based on the pricing and use conditions of the underlying constituent WSes invoked by the composite WS.

For illustrative purposes, some embodiments of the software facility are described below in which a specific WSM embodiment provides various specific types of capabilities and functionalities with respect to various specific types of WSes, including creating and using composite WSes based on constituent WSes, and in which a specific WSM embodiment uses various specific types of user interfaces and other interactions to provide those functionalities and capabilities. However, those skilled in the art will appreciate that the techniques of the invention can be used in a wide variety of other situations, including with services and items other than Web services, and that the invention is not limited to the exemplary details provided.

FIGS. 1A-1C, 1E-1J and 1L illustrate examples of a user interface provided by an embodiment of the WSM to assist WS provider users and WS consumer users in interacting with the WSM, including example interactions illustrated in FIGS. 1G-1J regarding creating a new composite WS based on previously registered constituent WSes. In this example embodiment, the WSM is part of a Web store that provides access to registered WSes and to a variety of other types of items, such as products, services or information for purchase, rent, lease, license, trade, evaluation, sampling, subscription to, etc., and including items for physical delivery (e.g., shipment via a governmental postal service or private common carrier) and/or electronic delivery (e.g., download or other electronic provision of software and/or non-executable digital media or content), while in other embodiments the WSM may provide access only to WSes and/or other invocable network services.

In particular, FIG. 1A illustrates a user interface screen that provides information 110 about various registered WSes available via the WSM, which in this example is displayed to a user as search results in response to search criteria (not shown) specified by the user in order to locate Web services related to the search term "map." The user may, for example, be a potential WS consumer who would like to invoke one or more map-related WSes (e.g., on a one-time basis, or by incorporating its functionality in a program that the WS consumer is creating), or may instead be a user who would like to create a new composite WS that uses one or more such map-related WSes as constituent WSes. In at least some embodiments, searches for registered WSes may be based on a variety of other types of information about the registered WSes (e.g., any attribute or criteria associated with a registered WS, whether alone or in combination, such as name, category, source or provider, price, use conditions, identifier, description, input and/or output parameter name, input and/or output parameter data type information, input and/or output parameter representation type information, etc.). In addition, in some embodiments information about available WSes can be provided to users in a variety of other ways, such as by browsing within categories, by providing recommendations of WSes to users, etc.

In this example embodiment, various information about a number of available WSes 110a-110f, 110h and 110j is displayed to the user, with the WSes divided into several WS categories 111 as shown, and with user-selectable options 110g and 110i available for displaying information about additional WSes. A variety of information is provided for each indicated WS, including a name 112, an indication of the WS provider 113 that is the source for the WS, one or more prices 114 corresponding to use of the WS, any specified use conditions 115 for the WS, and a textual description 117 of the WS. In this example, these types of information are provided by a WS provider when registering a WS, and each WS further has a unique item identifier ("ID") 116 that is automatically generated by the WSM, although in other embodiments such unique item IDs may not be used. In addition, various other information may be available for some or all of the WSes but not currently shown, such as a WSDL interface definition and representation type information for input and output parameters to indicate the type of information that the parameters represent (e.g., if provided by the WS provider when registering the WS), while in other embodiments such information may be displayed. As is shown, a variety of types of pricing models and use conditions are illustrated in this example. In addition, in this example, use conditions of various types are illustrated together, including contractual licensing terms (e.g., for "non-commercial use only", or restrictions on the WS provider's liability or ability to terminate the service, not shown) and use restrictions (e.g., "max uses/month=30000"), although in other embodiments such types of use conditions may instead be specified and displayed separately.

FIG. 1B illustrates an example user interface screen via which a potential WS consumer user can review more detailed information about a specific WS and select to subscribe to the WS, such as based on a selection of one of the WSes displayed in FIG. 1A or after the WS is identified in another manner. In particular, the illustrated user interface includes a section 121 that provides a summary description (not shown) of a particular WS and a section 127 that provides additional details (not shown) about the WS. The user interface screen also includes a user-selectable control 123 via which the consumer user can indicate to save an indication of the WS in a shopping cart of the user for possible later subscription. In addition, the user interface screen includes a section 125 via which the user can select to request a subscription to the WS, including a user-selectable control 125a to make the subscription request using the current information in user-modifiable fields 125b and 125c. In particular, field 125b may be provided for WSes that have multiple associated subscription types, such as a single-use subscription and a monthly subscription, and the user-modifiable field 125c corresponds to situations in which the user has multiple predefined sources of payment that they can select for use. Thus, in this example, before selecting the control 125a, the user may select a type of subscription (e.g., with a corresponding subscription price) and a payment option to be used for the payment. After the user selects the control 125a, the WSM determines whether to approve the subscription request, and if so takes appropriate steps to implement the subscription. While not illustrated here, the WS consumer will also be provided in the illustrated embodiment with information regarding how to invoke or otherwise access the WSes to which the WS consumer subscribes, such as by providing WSDL interface definitions and item identifiers for those WSes to the WS consumer.

As previously described with respect to FIG. 1A, information about registered WSes may be obtained by users in various ways that include performing a search for such WSes and/or reviewing detail information about a particular registered WS. While not illustrated here, various types of information about registered WSes can also be provided to potential WS consumers in a variety of other ways in at least some embodiments. For example, various information about each of several top-ranked WSes available via the WSM may be presented to users, such as to illustrate a current rank, a rating, indications of similar WSes, and indications of other WSes that may be of interest based on preferences or actions of other users. Such WS ratings may be user-specified, for example, and the rankings may be automatically calculated in one of a variety of ways (e.g., cumulative sales volume, recent sales volume, recent trends in sales volume, accuracy or other performance measure for the WS, total usage based on the number of access requests or other usage measure, breadth of invocations based on the number of different WS consumers and/or applications making the access requests, number of access requests per second, etc.), although ratings and/or rankings could be determined in other ways in other embodiments.

In addition, in some embodiments various personalized recommendations of registered WSes may be presented to a user, such as based on previously specified interests of the user and/or other automatic determinations of WSes of potential interest (e.g., based on usage history for the user). In such a situation, each of the recommended WSes may be illustrated with various associated information, and each may have an associated user-selectable control with which the WS can be added to the user's shopping cart and a user-selectable control with which the user can request to immediately subscribe to the WS. As one specific example, a user may be searching for or otherwise interested in identifying a registered service for use as a constituent service for a composite service being created, such as for use in combination with one or more other designated constituent services, and if so information may be presented to the user based at least in part on actions of other prior users, such as to indicate registered services that other users have previously used in conjunction with some or all of the other designated constituent services. Similarly, if a user is searching for or otherwise interested in identifying a registered service having one or more parameters of interest (e.g., parameters associated with a specified representation type, with a specified data type, with a specified category of representation types, etc.), information may be presented to the user to indicate registered services having such parameters that were previously selected by other users and/or to indicate other registered services used by prior users in conjunction with services having such parameters. Moreover, other types of recommendations may similarly be made based on prior user actions, such as recommendations of other parameter representation types to use based on users having used those representation types with one or more types of information specified by the user (e.g., specified services, types of services, specified representation types, representation types used with other specified services, etc.). Furthermore, various information related to user reviews of one or more WSes may also be presented to users (e.g., reviews of a WS that is selected or described in another portion of the screen, or of a particular WS indicated to the user), such as various review and rating information for the WS provided by one or more other users, and users may further be provided with a user-selectable control with which the user can select to provide their own review and rating of a WS (e.g., after use of the WS). While all of these various additional types of WS-related information may in some embodiments be provided to a user together (e.g., as part of a single screen), in other embodiments some or all of the information could instead be provided at other times and in other manners (e.g., by providing review and rating information for a WS on a detail screen for that WS, such as the screen illustrated in FIG. 1B).

In addition, in some embodiments the user interface may include one or more screens that allow the user to specify security and/or privacy information as desired. For example, a WS consumer may be able to prohibit or otherwise restrict access to WSes on their behalf (e.g., for all or a specified subset of their subscriptions) based on various user-configurable settings, including based on IP addresses associated with WSes, on developer tokens associated with users making WS access requests, on referring URLs, on subscriber ID, via cookies, etc. A WS provider may similarly be able to prohibit or otherwise restrict access to WSes that they provide in a variety of ways, and WS providers and WS consumers may in some embodiments be able to specify various security and/or privacy information for use in accessing information about their accounts and provided and/or accessed WSes. Information regarding subscriber ID and/or other user identity information may further be used to facilitate billing and other payment-related actions, as discussed in greater detail elsewhere.

In the illustrated embodiment, in order to make a WS available for use with the WSM (including the availability to be searched for and subscribed to, as well as to used as a constituent service in other composite services), the WS is first registered with the WSM. FIG. 1C illustrates an example user interface screen with which a WS provider user can initiate registration of a WS from the WS provider so as to make it available to consumer users via the WSM, with the illustrated information in this example corresponding to the prior registration of WS 110c of FIG. 1A by a user representative of WS Provider BBB. In particular, the example WS registration screen includes instructional information 131, and sections 133-138 in which the WS provider user can specify various types of information for the WS being registered, including a name, pricing information, use conditions, a textual description, one or more optional related keywords or terms (e.g., to assist in automatic categorization of the WS and/or to assist in identification of the WS as relevant to a potential consumer's search or other expression of interest about WSes), and an indication as to whether the WS may be used as a constituent service for other composite services, although in other embodiments various additional types of information may be specified (e.g., a category and/or type of the WS) and/or some of the illustrated types of information may not be used (e.g., not including pricing information, such as for free WSes, or not providing an option regarding whether the WS may be used as a constituent service).

In this illustrated example, the pricing information section 135 allows the WS provider to specify one or more use prices for different types of subscriptions or other uses of the WS (e.g., on a per-use basis, for a subscription that is valid for a specified length of time and/or number of uses, etc.), although in other embodiments only a single type of pricing may be allowed. In addition, in this example the WS provider may further specify restrictions on when, how and who may use a particular pricing option—for example, one or more of the restrictions regarding the monthly subscription pricing 135b may limit that pricing option to only certain types of WS consumers (e.g., customers with specified attributes, or preferred customers of WS Provider BBB), and if so information about that pricing option may not be made available to customers who do not satisfy those restrictions (e.g., the customer to whom the search results are provided in FIG. 1A). In addition, in some embodiments after a WS provider specifies one or more use prices for a WS that they have registered, the WSM then sets one or more consumer access prices for those WSes that are each based on one or more of the specified use prices (e.g., access prices that are the same as the use prices, or instead that include additional fees charged by the WSM or a reduction in fees provided by the WSM).

Various non-price use conditions may similarly be specified by the WS provider in some embodiments, such as restrictions on types of consumers allowed to use the WS, restrictions on types of uses allowed for the WS and/or for any information provided by its use, restrictions on how frequently the WS can be used by a particular consumer or by all consumers, various contractual licensing terms, etc. such use conditions may then be enforced in various ways, including automatically by the WSM and/or the WS provider (e.g., at the time of WS subscription and/or execution), or by legal enforcement (e.g., judicially, via binding arbitration, or via other contractual enforcement mechanisms) related to contractual violations by a consumer from his/her use of the WS (e.g., after the consumer has agreed to the use conditions in a contractual manner, such as part of a click-wrap agreement at the time that the consumer subscribes to the WS). In this example embodiment, the WS provider may enter one or more use conditions in the input area 136 in a free-form manner, although in other embodiments the use conditions may be specified in other manners. In particular, in this example the WS provider has provided information regarding terms and conditions by referencing an indicated Web page that contains that information. Alternatively, in some embodiments various types of use conditions may be predefined and selectable by the WS provider (e.g., from a drop-down list, not shown), such as to allow selection and/or customization of a selected use condition type (e.g., by selecting options or specifying parameter values). In addition, various default use conditions may be predefined in some embodiments (whether the same set of default use conditions for all WSes, or instead with different sets of default use conditions for different WSes, such as based on category of WS and/or specific to the WS provider), and if so may be displayed or otherwise available to the WS provider, although in other embodiments such default use conditions may not be used.

The illustrated WS registration screen in FIG. 1C also includes a user-selectable control 139 via which the WS provider can indicate to continue the WS registration after appropriate information has been supplied in sections 133-138. After the control has been selected, the WSM determines whether to approve the registration, and if so takes appropriate action to notify the WS provider of the acceptance and to make the registered WS available to consumers via the WSM. In addition, in the illustrated embodiment the WS provider is further prompted to provide invocation details for the WS being registered, such as by supplying a WSDL interface description for the WS and by providing representation type information for the parameters of the WS. In other embodiments, the registration of a WS may instead involve providing information in a different order and/or manner, such as to initially provide the WSDL interface description and the representation type information for the parameters of the WS, and to then provide some or all of types of information discussed with respect to FIG. 1C. In addition, while not illustrated here, in at least some embodiments various information about a service being registered may be added by the WSM, whether automatically or in a manner based on interactions with the user registering the service, such as to add input and/or output parameters to the interface for the service (e.g., for use by the WSM, such as an input parameter to obtain a subscription identifier for the service or a subscriber identifier for a user), to add use conditions (e.g., use conditions required by the WSM for some or all services), etc. Similarly, in at least some embodiments various information about a service being registered may be changed or removed by the WSM, whether automatically or in a manner based on interactions with the user registering the service, such as to obfuscate information about the provider of the service and/or to allow the WSM to control the invocation of the service (e.g., by changing the names of input and/or output parameters to the interface for the service, by using a network endpoint or other access information provided by the WSM rather than corresponding information from the provider of the service, etc.).

In the illustrated embodiment, FIG. 1D illustrates portions of an example XML-based WSDL interface description for WS 110c (with some WSDL document details not illustrated for the sake of brevity), such as from a WSDL interface description that was previously provided by WS Provider BBB when registering the WS. In this example, the WS takes as input starting and ending zip codes, and returns textual driving directions between those zip codes and a list of cities along those driving directions. Lines 2-7 of the example WSDL first define a new data type for use in the WSDL, which in this example uses SOAP and XSD ("XML Schema Definition") capabilities to define an array of strings. Lines 8-12 next define input and output messages for use with the WS, with the input message "getDirRequest" having two input integer parameters for the starting and ending zip codes, and with the output message "DirResponse" having an output string parameter to return the textual directions and an output array of strings to hold the list of cities. In lines 13-17 the single "getDirections" operation for the WS is defined, indicating use of the input and output messages, and in lines 18-23 a SOAP binding for the messages and operation is specified. Lines 24-37 then specify various additional information for the WS, including specifying a particular network endpoint for the WS in lines 35-36 (which in this example is a specific network-accessible URL under the control of WS Provider BBB), a use price in line 28, various contractual licensing terms in lines 30-34, textual description documentation for the WS in lines 25-27, and use conditions in line 29. In other embodiments, various other types of information may additionally be specified, and some or all of the illustrated types of information in lines 25-34 may instead be specified in other manners or not at all.

Figure 1F:
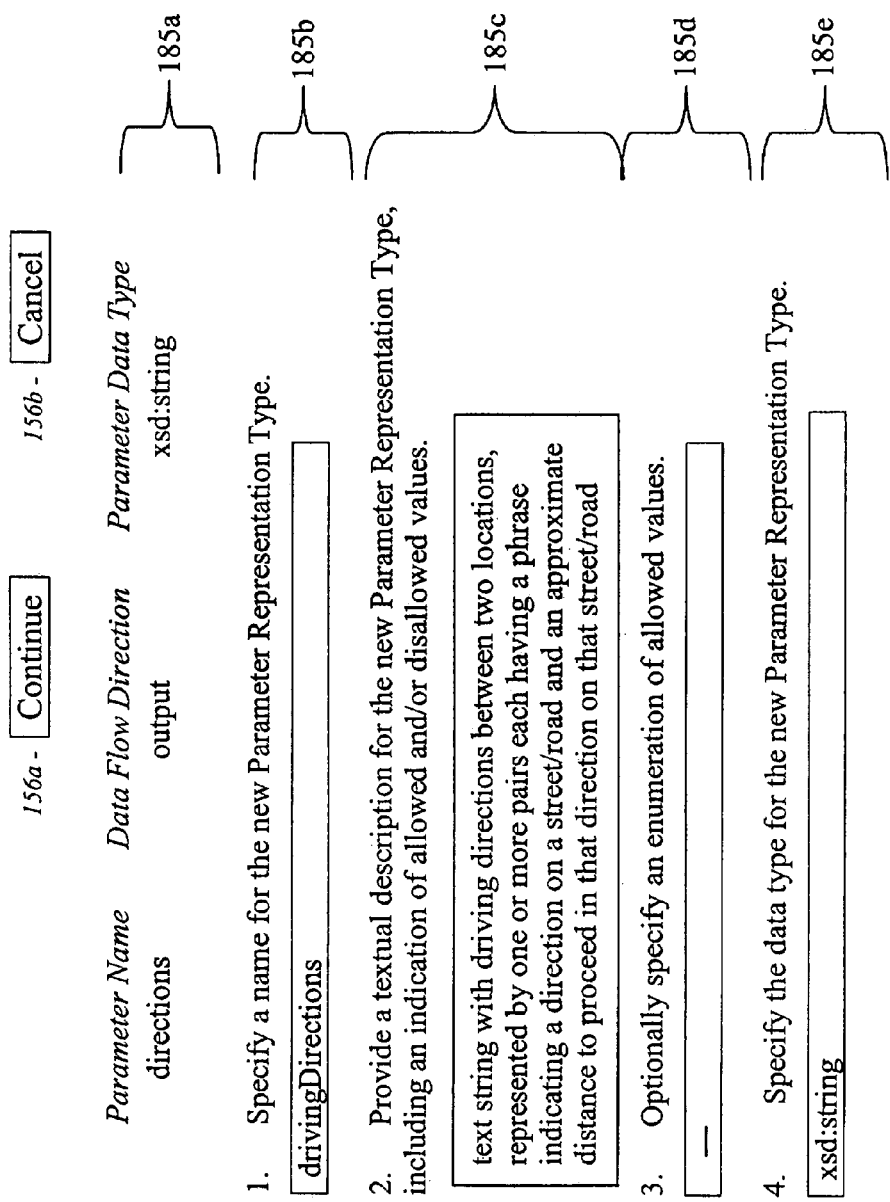

As noted, the example WSDL interface description for WS 110c is provided in this example embodiment by WS Provider BBB when previously registering the WS, such as in response to prompts (not shown) after selecting control 139 from the registration screen shown in FIG. 1C. Furthermore, in this illustrated embodiment, an additional part of the registration process for WSes includes providing representation type information for the input and output parameters of a WS being registered, and FIGS. 1E and 1F illustrate an example of a portion of the continuing registration process for WS 110c by WS Provider BBB. In particular, after the WSDL interface description is provided, it is automatically processed in the illustrated embodiment to identify the operations of WS 110c and to identify the input and output parameters for each of the identified operations. The user is then prompted to provide appropriate representation type information for the parameters to indicate the type of information that the each of the parameters represents. In at least some embodiments, various other types of information may similarly be provided for parameters (e.g., to facilitate their later use with other services), such as whether a parameter is optional.

In at least some embodiments, the identifying of appropriate representation type information for parameters is facilitated by use of a set of standard parameter representation type specifications that may be initially provided and/or incrementally developed during registration of services. By identifying a type of information represented by each service parameter, as well as by optionally identifying various types of relationships between parameter representation types, parameters of different services that represent the same or related types of information may be identified. For example, some services that use zip code values may use integer numbers to represent 5-digit zip codes, while other services that use zip code values may use text strings to represent 9-digit zip codes—thus, each type of differing zip code representation may be given a distinct representation type, allowing them to be distinguished from each other as well as from other types of information represented using integers or text strings. Such representation types allow easy determination of whether a zip code value that is appropriate for one service parameter may be used with another service parameter that also represents zip codes, such as to facilitate automated mapping of parameters for distinct services. Furthermore, in at least some embodiments, such different representation types for zip code information may be identified as being related, such as to allow automated translation of a zip code value for one such representation type to a zip code value of another such representation type. Such representation types may also be interrelated in various ways, such as by having a hierarchy of representation types (e.g., to indicate that a zip code representation type is one form of location area identifier representation type, with a phone area code representation type being another form of location area identifier representation type), and/or by having groupings of related representation types (e.g., to indicate that representation types corresponding to a city name, a state name and a zip code can be used together as part of an address representation type). Thus, for example, when a new service is later identified as having parameters corresponding to a city name and to a zip code and as having another parameter whose associated representation type has not been identified, the address grouping may be used to identify the state name representation type as a possible representation type for the other parameter (whether based solely on the address grouping or further based on other information, such as the other parameter having a name of "st"). In addition, in at least some embodiments such groupings and/or hierarchies of representation types may automatically be identified based on analysis of use of the representation types, such as by identifying the relationship between the representation types corresponding to city name, state name and zip code due to frequent use together, or by identifying the relationship between the zip code and area code representation types based on frequent use of them as alternatives (whether as actual alternatives within a particular service, or based on some related services using one parameter type and other of the related services using the other parameter type).

Accordingly, FIG. 1E illustrates an example user interface screen with which a WS provider user can continue registration of a WS, and in particular can provide appropriate representation information for the input and output parameters for the WS. In this example, FIG. 1E shows information for WS 110C based on the example WSDL interface description illustrated in FIG. 1D. In particular, the automated processing of the WSDL interface description has identified the "GetDirections" operation 183a, and entries 183w-183z identify the four parameters defined for use with the operation. The automated processing has identified various information for each of the parameters, including a parameter name 183b, an indication of the direction of data flow 183c for the parameter (e.g., input or output), and a data type 183d for the parameter—in some embodiments, the user may be able to override these automatically identified values if so desired, while in other embodiments this information may not be modifiable (e.g., if provided here only for reference purposes).

In addition, as noted above, in the illustrated embodiment each parameter will be assigned a representation type 183e—in some embodiments such assignments will be specified only by a user, while in other embodiments the WSM may attempt to automatically identify default or suggested representation types for at least some parameters (e.g., based on parameter name, data flow direction, data type, type or category of WS, etc.). For example, in the illustrated embodiment the WSM system has tentatively assigned an integer-based zip code representation type to each of the "fromZipCode" and "toZipCode" input parameters shown in 183w and 183x (such as based on the parameter names and their data types), but did not tentatively assign representation types to either of the output parameters shown in 183y and 183z. The user may then modify the default selections for the input parameters if they are not correct, such as by using dropdown lists in the illustrated embodiment for those parameters' representation types to select another more appropriate representation type such lists may include all defined representation types in some embodiments, while in other embodiments may include only a subset of types identified as being the most relevant (e.g., based on similar factors to those previously discussed, on common or typical usage of representation types, etc.). Alternatively, in other embodiments information about representation types may be displayed and selected in other manners (e.g., by allowing the user to search for representation types based on various criteria, by organizing and displaying information about representation types in an organized manner, such as hierarchically or by using categories, by providing recommendations of one or more representation types for a parameter based at least in part on previous actions by other users, etc.). For example, if other users have previously used the integer-based zip code representation type for parameters with names similar to or matching the "fromZipCode" name, that information may further be used in suggesting that representation type for that parameter. Similarly, the information that the current user specifies for the parameters (e.g., the representation types selected by the user for the output parameters shown in 183y and 183z) will be stored and used to assist in future recommendations for similar and/or matching parameters, such as based on parameter name and/or type. In addition, in the illustrated embodiment each representation type has associated description information 183f that is displayed to the user to provide information that assists in identifying an appropriate representation type, although in other embodiments such information may instead not be used or may by available and provided in other manners. In this example, a representation type was not automatically selected for the "cities" output parameter shown in 183y, but the user has manually selected (not shown) a previously defined "list:cityName" representation type for the parameter—as shown in the description information 183f for the "list:cityName" representation type, the representation type corresponds to values that are lists of multiple textual names (e.g., implemented as a single-dimension array), such as based on one or more previously registered services that used lists of city names as input values and/or output values. Thus, as previously noted, in at least some embodiments such user specification of a matching representation type for a parameter may further be used to assist in future automated matching of representation types, such as to store an indication that information regarding the parameter corresponds to the matching representation type (e.g., that the name "cities" in a parameter name may reflect the "list:cityName" representation type)—thus, a later parameter with the same parameter-related information 183b-183d as shown in 183y may be automatically matched to the "list:cityName" representation type based on the stored indication from this user-specified match. In this example, a representation type was also not automatically selected for the "directions" output parameter shown in 183z, and a dropdown list is currently displayed for the representation type selection 183e for the output parameter (e.g., based on user selection of the dropdown list control). As is illustrated, a variety of types of previously defined representation types may be shown, such as those corresponding to options 184a-184d, along with at least basic description information in this example for those representation types. In addition, in this example embodiment the user may further indicate to define a new representation type for use with the "directions" parameter, such as is reflected with respect to option 184e, and FIG. 1F illustrates an example screen for use in defining such a new representation type. After all of the parameter-related information has been specified, the user may select the "Continue" control 155a to continue, or instead may select the "Cancel" control 155b to instead cancel the registration of WS 110c.

As noted, FIG. 1F illustrates an example screen for use in defining a new representation type for the "directions" output parameter shown in 183z of FIG. 1E. In particular, the screen includes summary information 185a regarding the parameter, and provides sections 185b-185e via which the user can provide a variety of types of information about the new representation type being defined. For example, in the illustrated embodiment the user is prompted to provide a name 185b, a textual description 185c for the representation type, a data type 185e for values corresponding to the representation type, and optionally an enumeration 185d of allowed values for the representation type (e.g., for use by WS provider users in determine whether the representation type is appropriate for a parameter of a service being registered, for use by the WSM system in automatically performing verification or other validation for values being used during execution, etc.). In other embodiments, a variety of other types of information may similarly be provided, such as keywords and/or categories associated with the representation type (e.g., for use in searching for the representation type and/or automatically matching the representation type to appropriate parameters), indications of relationships of the representation type to other defined representation types (e.g., one or more categories, hierarchical relationships, or other groupings), criteria for allowed types of values for parameters of the representation type, etc. In addition, in other embodiments various information for a new representation type being defined may be provided in manners other than interactive user specification, such as by instead allowing a user to submit a document containing a description of the new representation type. After the new representation type is defined, the user may select control 156a to continue, such as to complete the registration of the WS 110c or to return to the screen illustrated in FIG. 1E. In the illustrated embodiment, the defined representation type will then be available for use in subsequent registrations of WSes (whether for WS Provider BBB or for other WS providers), such as to facilitate the use of a single representation type for any parameters that represent that type of information, although in other embodiments the user may be allowed to specify how and to what degree the new representation type may be used by others (e.g., to limit the use of the representation type based on specified access rights).

While not illustrated here, a variety of other types of information may similarly be obtained from the WS provider for a WS being registered in other embodiments (e.g., information about communication protocols to be used when supplying input to and/or receiving output from the WS; information about input parameter value pre-processing to be performed for the WS, such as a script or other executable logic to use in manipulating input information that is provided before it is used as input values for one or more input parameters of constituent services; information about output parameter value post-processing to be performed for the WS, such as an XSLT stylesheet to use to produce output for the WS based on one or more output parameters values; etc.), such as for use in executing the WS and/or in using the WS as a constituent WS for composite WSes.

After one or more WSes have been registered with the WSM, a composite WS based on using those registered WSes as constituent WSes may be created and used in the illustrated embodiment, although in other embodiments composite services may instead be based on other constituent services that have not been registered. FIGS. 1G-1J illustrate examples of a user interface provided by an embodiment of the WSM to assist users in creating a new composite WS based on one or more previously registered constituent WSes, and FIG. 1K illustrates an example of a WSDL interface description for the new composite WS that is dynamically generated based at least in part on WSDL information for the constituent WSes. FIG. 1L then illustrates an example user interface screen via which a potential WS consumer can review information about the composite WS and select to subscribe to the composite WS in a manner similar to FIG. 1B, although in this example the composite WS has only a single access option that corresponds to purchasing single-use access (rather than a multi-use subscription or other type of multi-use access), as indicated in section 195. While illustrated here as an interactive process with a user (e.g., via a Web site), in other embodiments the composite WS creation process may instead be performed in other manners, such as by one or more programmatic invocations of appropriate WSM functionality in which the various described types of information for a composite WS are provided.

In particular, FIG. 1G illustrates a user interface screen via which an example user may begin to specify a new composite WS, such as in response to a previous indication by the user to perform this activity. In the illustrated embodiment, any user may interact with the WSM to create a composite WS based on one or more constituent WSes, regardless of whether the user provides any of the constituent WSes (or more generally is the provider of any WS), although in other embodiments the composite service creation capabilities may be limited in various ways (e.g., to users who provide and/or are authorized to use the relevant constituent WSes, to users who pay a specified fee to receive the ability to create composite services, etc.). In this example, the initial composite WS creation screen includes instructional information sections 151 and 152, and a section 160 in which the user can select one or more registered constituent WSes for use with the composite WS being created.

In this illustrated example, various potential constituent WSes 160c-160d and 160n-160r are initially displayed in section 160, with various types of information 161 and 163-168 displayed for each of the WSes in a manner similar to section 110 of FIG. 1A. Potential constituent WSes may be selected and displayed to the user in various ways, including by presenting all registered WSes (e.g., in a scrollable list and/or in a series of smaller groups), by presenting all WSes that belong to one or more specified WS categories (not shown) and/or that match any user-specified search criteria (not shown), by presenting WSes that are automatically selected for the user and/or for the composite WS being created (e.g., based on history information from past interactions with the user, or based on high-level information that is specified for the composite WS, not shown, such as a category or type of the composite WS), etc. Furthermore, as previously noted, potential constituent WSes may further be selected for the user based on prior actions of that user and/or other users, such as to indicate constituent WSes previously used together and/or constituent WSes previously used by others to provide types of output information (e.g., based on associated representation type information) and/or to use types of input information (e.g., based on associated representation type information). In addition, while not illustrated here, in other embodiments the user may be able to further specify one or more other services that are not registered with the WSM for use as constituent services (e.g., a service registered with another marketplace, or a service provided by the user but not registered), such as by providing information for those services similar to that previously described with respect to FIG. 1C.

In this illustrated example, the user has selected four registered WSes 160c (previously shown as WS 110c in FIG. 1A), 160n, 160o, and 160p by selecting appropriate selection boxes in column 162. In some embodiments, some potential constituent WSes may not be displayed to the user or may be displayed in a non-selectable manner, such as if those potential constituent WSes are not available or compatible for use with the composite WS being created and/or are not available or compatible for use with other currently selected constituent WSes. For example, in this illustrative embodiment, registered WSes 160q and 160r have been automatically determined to be non-selectable for the composite WS creation based on specified conditions of use for those WSes, including a specification for WS 160r that it is not for use in composite WSes and for WS 160q that it is for non-commercial use only, and thus are displayed in an altered visual manner and without corresponding selection boxes. Alternatively, in some embodiments other information may be used to restrict which potential constituent WSes are made available for selection, such as based on the user being allowed to use those WSes (e.g., based on access rights specified for those WSes and/or based on the user having a current subscription to those WSes). In other embodiments, such determinations of allowable constituent WSes may be made in other ways, including by relying on the user to verify that some or all conditions of use for the selected constituent WSes are satisfied by their use in the composite WS rather than by performing an automated verification that the use conditions are satisfied. Furthermore, in some embodiments a determination of whether a condition of use is satisfied may not be immediately determinable, such as when waiting to see whether the composite WS being created is given a specified use price before determining whether a "non-commercial use only" condition is satisfied, or by instead disallowing any use price to be specified for the composite WS while such a non-commercial use condition applies for any of the selected constituent WSes.

After the user selects the user-selectable "Continue" control 152a in FIG. 1G, the composite WS creation process continues with the example user interface screen illustrated in FIG. 1H, although in other embodiments the illustrated functionality of FIGS. 1G and 1H may instead be part of a single user interface screen. In this example, the user is provided with an instructional information section 153 that instructs the user to select one or more operations 173 of the selected constituent WSes for use with the composite WS, as well as a section 170 in which the user can make the constituent WS operation selections. In this illustrated example, various potential constituent WS operations 170a-170f are initially displayed in section 170, with displayed information including indications 171 of the corresponding selected constituent WSes and indications of corresponding information 174-177 regarding parameters of the operations. As with the selection of potential constituent WSes, the potential constituent WS operations may be selected and displayed to the user in various ways, including by presenting all operations of the selected constituent WSes, presenting all constituent WS operations that match any user-specified search criteria (not shown) and/or that belong to one or more specified operation categories or types (not shown), presenting constituent WS operations that are automatically selected for the user and/or for the composite WS being created, etc. In addition, while not illustrated here, in other embodiments the user may be able to further specify or select one or more other types of operations or capabilities that are not from the selected constituent services, such as operations or capabilities provided by the WSM to facilitate composite WS creation and execution. Furthermore, in some embodiments some potential constituent WS operations may not be displayed to the user or may be displayed in a non-selectable manner, such as if those potential constituent WS operations are not available for use with the composite WS being created and/or are not available for use with other currently selected constituent WS operations. As with the selection and display of potential constituent WSes, various types of information may be used to determine which potential constituent WS operations to make available to the user.

In this illustrated example, the user has selected five constituent WS operations 170a, 170b, 170c, 170e and 170f for use with the composite WS being created by selecting appropriate selection boxes in column 172. After the user selects the user-selectable "Continue" control 153a in FIG. 1H, the composite WS creation process continues with the example user interface screen illustrated in FIG. 1I, although in other embodiments the illustrated functionality of FIG. 1I may instead be part of a single user interface screen with the illustrated information of FIGS. 1G and/or 1H.

Figure 1I:
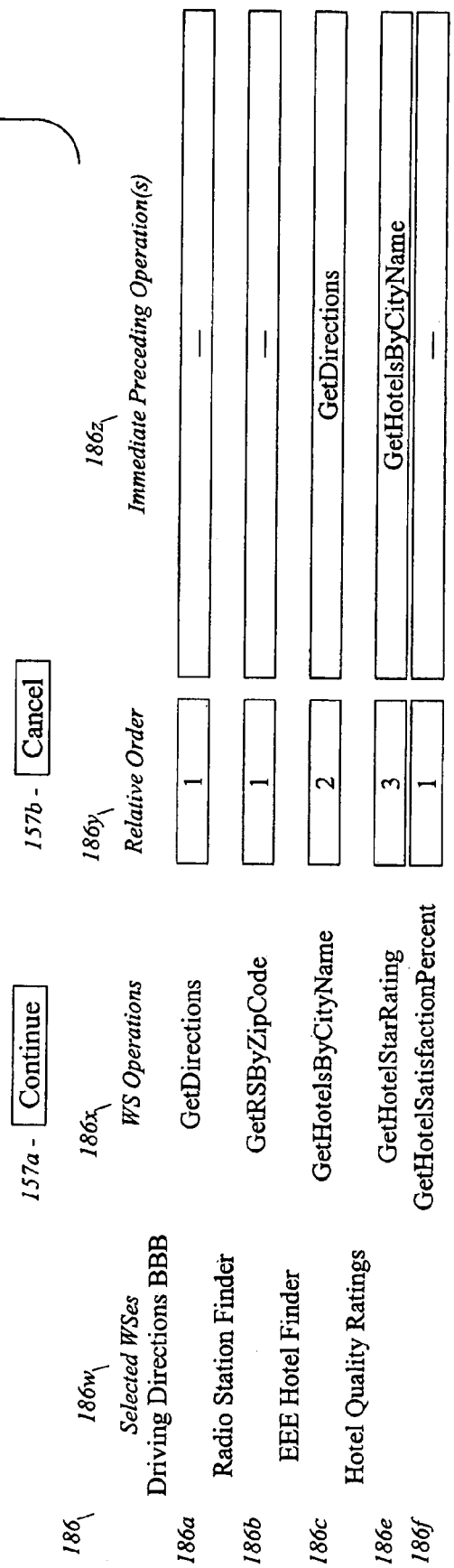

In this illustrated example, the user is next prompted in FIG. 1I to provide information about the order and inter-relationships of the selected WS operations. In particular, the constituent WS operations 186a-186e that were selected in FIG. 1H are displayed in section 186 in the illustrated embodiment, along with user-specifiable fields 186y via which the user can specify a relative order in which to execute the WS operations and user-specifiable fields 186z via which the user can specify inter-relationships between the selected WS operations. In this example embodiment, the user indicates a first group of one or more WS operations that can be executed in parallel based on input information to the composite WS (by giving those WS operations a value of "1" for their relative order), and optionally specifies one or more subsequent groups that each have one or more WS operations that can be executed in parallel relative to each other but that are to be executed subsequent to one or more of the WS operation(s) in the prior group. The user also indicates specific inter-relationships between WS operations by indicating for WS operations in subsequent groups which one or more WS operations from a prior group will be used to provide input information for the WS operation. After the user is finished, he/she can use the "Continue" control 157a to continue the creation process for the composite WS, or can instead use the "Cancel" control 157b to cancel the creation process.

While not illustrated here, in some embodiments the user may further be prompted or allowed to provide additional information to further define inter-relationships between the selected WS operations and/or other aspects of the composite service. For example, the user may be allowed to specify various logic to define in greater detail how parameters of WS operations are to be mapped together, such as to manipulate a value of an output parameter before the manipulated value is provided as an input value to an input parameter to which the output parameter is mapped, to provide conditional logic to determine whether and/or how to invoke one or more subsequent WS operations based on available information (e.g., one or more output values from prior WS operations), to provide looping logic to indicate whether and how one or more WS operations are to invoked multiple times in order to handle multiple related pieces of information, or to accommodate different protocols and/or messaging models used by two constituent WSes that will interact. For example, one constituent WS may exchange information using SOAP messages while another uses XML documents sent over HTTP, and if so execution of the composite WS may include providing output received from one of the services using one protocol to the other service using the other protocol, with the protocol translation accommodated based on the specified logic and/or automatically by the WSM. Similarly, the execution of a composite service may include accommodating different types of models for returning response information, such as synchronous and asynchronous models (e.g., by delaying invocation of later constituent services that depend on output information from an asynchronous constituent service until that output information is received). Furthermore, the user may be allowed to specify various logic for a composite service to define in greater detail how values for input parameters of the composite service will be handled, such as to perform specified processing on an input parameter value before using it (e.g., providing it as input to one or more constituent services), or to eliminate a constituent service input parameter as an input parameter for the composite service (e.g., to obfuscate its use) by specifying a programmatic manner of determining input for that constituent service input parameter that is not based on received input or on the output of another constituent service (e.g., by specifying that a constant value be used or that a value be determined in a specified programmatic manner). In addition, the user may be able to specify a variety of other types of information, such as the following: names and other information for use as input parameters and/or output parameters for the composite service (e.g., to encapsulate a single constituent service of a composite service, such as to hide details regarding the constituent service and its interfaces); information about communication protocols to be used when supplying input to and/or receiving output from the WS; information about input parameter value pre-processing to be performed for the WS, such as a script or other executable logic to use in manipulating input information that is provided before it is used as input values for one or more input parameters; information about output parameter value post-processing to be performed for the WS, such as an XSLT stylesheet to use to produce output for the WS based on one or more output parameters values; etc.

Figure 1J:
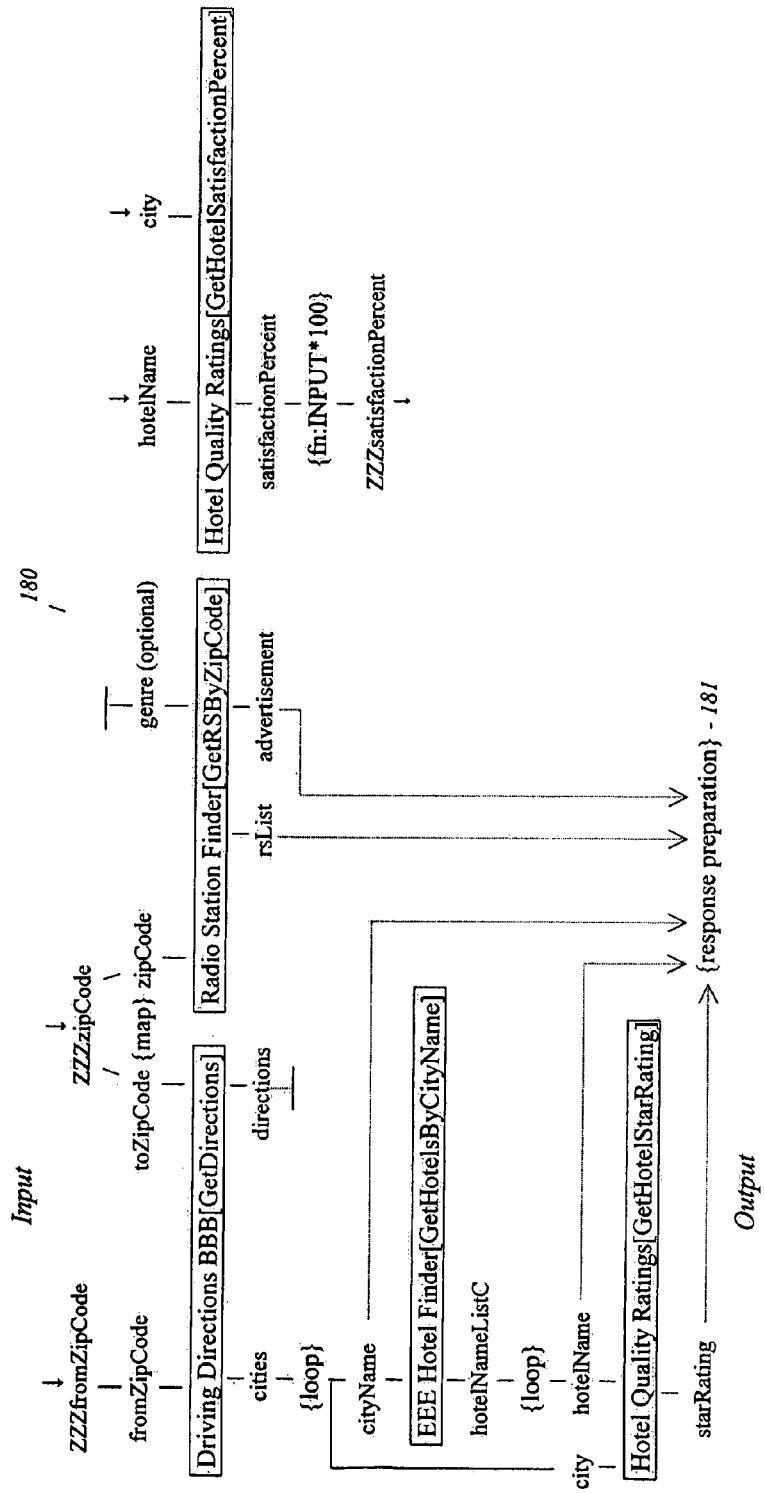
Figure 1L:
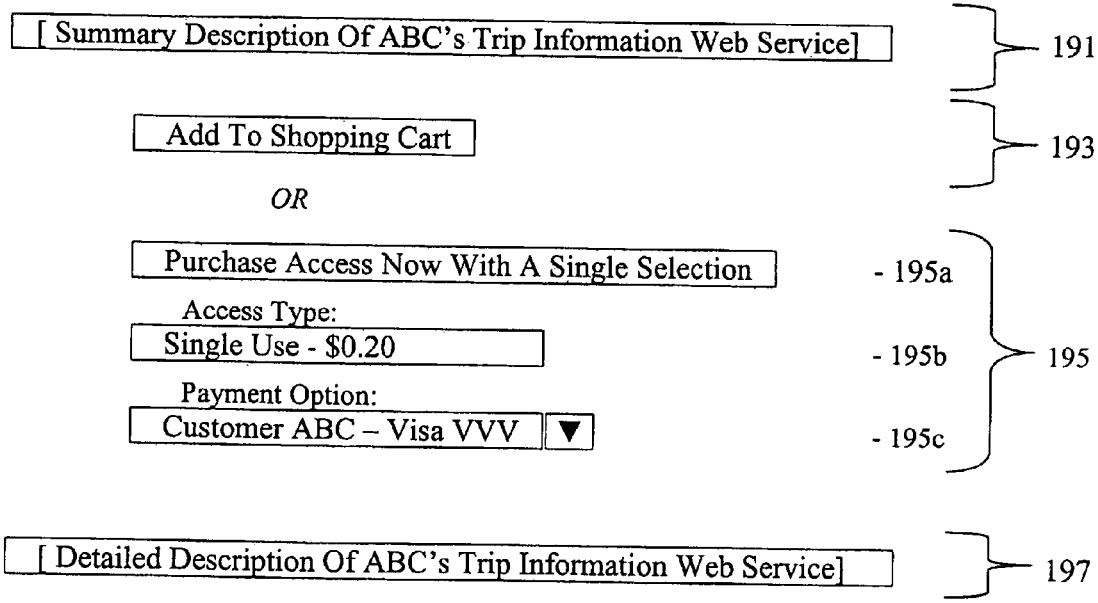

In this example, after the user selects the "Continue" control 157a in FIG. 1I, the user is provided with information in. FIG. 1J regarding details of a proposed execution strategy for the constituent WSes of the composite WS, which the user can modify as appropriate in this example. In particular, in this example the WSM system attempts to automatically map input and output parameters of the selected WS operations based on the specified execution order and inter-relationships and on the representation type information for the parameters. FIG. 1J includes an instructional information section 154 that instructs the user to review and modify proposed composite service provision information indicating how the selected constituent WS operations are to be combined and used in order to provide one or more operations or other capabilities of the composite WS being created, as well as a section 180 with at least some of that composite service provision information. In particular, in this illustrated example each of the five selected constituent WS operations is displayed in a box, with the input parameter(s) for the operation displayed above the box and the output parameter(s) for the operation displayed below the box. The user can then graphically manipulate the displayed operations and parameters in this illustrated embodiment to specify a data flow inter-relationship between the selected constituent WS operations, with the input data entering the specified data flow at the top and flowing down until an output response preparation process 181 is indicated at the bottom—in other embodiments, such information may be specified and/or displayed in other manners (e.g., by using different visual representations, by displaying the information in tabular form, by instead specifying textual logic that indicates the flow of processing that is to occur between the various selected operations, etc.).

In this example embodiment, the composite WS being created will combine the functionality of the selected operations to produce two operations. A "city-and-hotel-quality" operation (name not shown) of the composite WS will take as input a starting and ending zip code, will identify various cities along a typical driving path between the zip codes, and will provide various output information in a specified form that includes a list of hotels ranked by hotel rating for each city as well as a list of radio stations in the ending zip code area in this example embodiment, this city-and-hotel-quality operation of the composite WS is based on the constituent WS operations "GetDirections", "GetHotelsByCityName", "GetHotelStarRating", and "GetRSByZipCode", as discussed in greater detail below. A second "hotel-satisfaction" operation (name not shown) of the composite WS will take as input a city name and hotel name, and will provide output that is an integer between 0 and 100 representing the percent of respondents who have stayed at that hotel who found the hotel to be satisfactory—in this example embodiment, this hotel-satisfaction operation of the composite WS is based on the constituent WS operation "GetHotelSatisfactionPercent". In this illustrated embodiment, the composite service provision information indicates that the ending zip code input parameter for the "GetDirections" operation has been mapped to the input parameter for the "GetRSByZipCode" operation in such a manner that these two parameters represent the same data value, and a new input parameter "ZZZzipCode" has correspondingly been created for the first operation of the composite WS (whether manually or in an automatic manner to represent the indicated mapping) to represent the ending zip code value. At the time of execution of the city-and-hotel-quality operation of the composite WS, the ending zip code value supplied for the ZZZzipCode input parameter will then be provided to each of GetDirections and GetRSByZipCode operations based on their toZipCode and zipCode input parameters being mapped together (as indicated with the "{map}" notation) and to the ZZZzipCode parameter, thus allowing them to be executed in parallel. A new "ZZZfromZipCode" input parameter of the city-and-hotel-quality operation will similarly be supplied to the GetDirections operation to represent the starting zip code. Moreover, while the constituent WS GetRSByZipCode operation can receive an optional "genre" input parameter to limit the types of radio stations supplied, in this example embodiment that parameter is not used as part of the composite WS, and thus does not have any corresponding input parameter for the composite WS's city-and-hotel-quality operation.

The response output parameters from the GetRSByZipCode operation are then forwarded to an indicated "response preparation" procedure 181 for processing to produce the response for the city-and-hotel-quality operation of the composite WS, such as to be supplied via one or more output parameters (not shown) of the composite WS operation. While the details of the response preparation are not illustrated here, the preparation procedure can be performed in a variety of ways in various embodiments (e.g., by mapping each such constituent WS operation output parameter to a corresponding output parameter of the composite WS operation, by using an XSLT style sheet or other specification to indicate a manipulation that is to be performed on the output parameter values before a response is generated, such as to generate a Web page for display to a user of an application program that called the composite WS operation, etc.).

The response output parameters from the GetDirections operation are not forwarded to the response preparation procedure, however. Instead, as indicated, the value of the textual driving directions output parameter "directions" is not used as part of the composite WS operation in this example embodiment. The array of city names that is the value of the "cities" output parameter is used further, however, and in particular the city names are sent one at a time to the "GetHotelsByCityName" operation (whether via synchronous serial executions of the operation, or instead via multiple executions using different "cityName" input parameter values that occur asynchronously and/or in parallel), which is indicated in this example embodiment by the indication of the "{loop}" scripting capability. Each city name is also forwarded to the response preparation procedure 181 for use in generating the composite WS operation response, and is further sent as input to the "GetHotelStarRating" operation in conjunction with each hotel name that is output from the GetHotelsByCityName operation for that city. In particular, the hotel names from the "hotelNameListC" output parameter array are each sent to the "GetHotelStarRating" operation (whether in a synchronous or asynchronous manner and whether in serial or in parallel), which is similarly indicated in this example embodiment by the indication of the "{loop}" scripting capability. Each hotel name value is also forwarded to the response preparation procedure, as is each value of the "starRating" output parameter from the GetHotelStarRating operation.

In addition to the information regarding the city-and-hotel-quality operation of the composite WS, the composite service provision information in this illustrated embodiment also indicates information regarding the execution of the hotel-satisfaction operation of the composite WS. In particular, in this embodiment the hotel-satisfaction operation is based on a single encapsulated constituent WS operation, that being the GetHotelSatisfactionPercent operation. In particular, the two input parameters to the GetHotelSatisfactionPercent operation remain identical for the hotel-satisfaction operation, and the output parameter of the GetHotelSatisfactionPercent operation is arithmetically manipulated before being returned as a response output parameter value (in this example by multiplying the value of the "satisfactionPercent" output parameter by 100 to convert it from a numerical percentage between 0 and 1 to an integer value between 0 and 100). In some embodiments, new input parameters and/or output parameter may be created for the hotel-satisfaction operation, in a manner similar to the creation of the ZZZfromZipCode input parameter of the city-and-hotel-quality operation, while in other embodiments the existing input and/or output parameters of the constituent WS operation may instead be used. This composite WS operation may be executed, for example, after a caller has obtained information about hotel(s) from the city-and-hotel-quality composite WS operation and would like additional details regarding a specified hotel.

After the composite service provision information is specified in FIG. 1J, the composite service creation process continues, such as based on a user selection of an appropriate user-selectable control (not shown). In some embodiments, the composite WS creation may be completed at this point, while in other embodiments a variety of additional information may be specified for the composite WS by the user. After the new composite WS creation is complete, the composite WS may in some embodiments be treated as being registered with the WSM in the same manner as other registered WSes (e.g., so that it is transparent to a consumer whether a registered WS is a composite WS or is not a composite WS, or is provided directly by the WSM or by a WS provider separate from the WSM). For example, after the creation of the new composite WS, FIG. 1L illustrates an example user interface screen via which a potential WS consumer user can review more detailed information about the composite WS and select to subscribe to the WS, in a manner similar to that previously described with respect to FIG. 1B.

If additional information is to be specified for the composite WS, the user may be prompted to specify some or all of various types of information for the composite WS (not shown), such as in a manner similar to that displayed in FIG.

1C with respect to registering an existing WS. Such user specification of additional information may occur before or after providing other information for the composite WS such as the composite service provision information, and may include a variety of types of additional information (e.g., a name, one or more related terms, one or more use prices, any use conditions, and a textual description). In addition, in some embodiments the user may further specify access rights or other use conditions to restrict the other users (if any) to whom the composite service will be available.

Alternatively, in some embodiments some or all of these types of additional information may instead be automatically generated for the composite WS (e.g., based on corresponding information from the constituent WSes), such as to provide automatically generated defaults for those types of information to the user as suggestions for approval or modification. For example, various use conditions may be combined in order to generate an intersection or union of the conditions, or corresponding terms may instead be combined so as to select the most or least restrictive of the terms (e.g., if one constituent service allows a maximum of 100 uses per hour and another allows a maximum of 1000 uses per hour, the term selected for the composite service could be 100 or 1000 uses per hour, and the WSM could then automatically enforce the selected term). Similarly, a use price may be determined in various ways, such as to determine a single-use price by summing single-use prices of all of the constituent services, or instead by using a probabilistic determination or other weighting based on expected use (e.g., when the composite service provision information includes conditional logic). In addition, in a manner similar to the registration of non-composite services, in at least some embodiments various information about a composite service being created may be added by the WSM (whether automatically or in a manner based on interactions with the user registering the service), such as to add input and/or output parameters to the interface for the service (e.g., for use by the WSM, such as an input parameter to obtain a subscription identifier for the service or a subscriber identifier), to add use conditions (e.g., use conditions required by the WSM for some or all services), to set one or more consumer access prices for the composite service based at least in part on one or more specified or determined use prices for the composite service (e.g., access prices that are the same as the use prices, or instead that include additional fees charged by the WSM or a reduction in fees provided by the WSM), etc. Similarly, in at least some embodiments various information about a composite service being created may be changed or removed by the WSM (whether automatically or in a manner based on interactions with the user creating the composite service), such as to obfuscate information about the creator of the service and/or the underlying constituent services, as well as to allow the WSM to control the invocation of the composite service (e.g., by changing the names of input and/or output parameters to the interface for the service, by using a network endpoint or other access information provided by the WSM, etc.).

After information for the composite WS has been obtained, a WSDL interface description for the new composite WS is dynamically generated in the illustrated embodiment by the software facility, with portions of an example WSDL interface description for the new composite WS being illustrated in FIG. 1K. In some embodiments this new WSDL may be automatically generated and made available for use without any additional input by the user, while in other embodiments the automatically generated WSDL may instead be provided to the user for review and/or modification. By dynamically generating the new WSDL interface description in this manner, the new composite WS may be put into use substantially immediately.

In this example, the dynamically generated WSDL interface description is based at least in part on WSDL information for the constituent WSes, including the example WSDL interface description for the "Driving Directions BBB" constituent WS that is illustrated in FIG. 1D. Lines 2-4 of the example composite WS WSDL first define a new data type for use in the WSDL, which in this example will be an array of various types of information produced by the response preparation process 181 indicated in FIG. 1J. Lines 5-11 next define input and output messages for use with each of the operations of the composite WS. For example, the input message "ABCgetTripInfo" for the city-and-hotel-quality operation (here named "cityAndHotelQuality") has the two input starting and ending zip code integer parameters "ZZZfromZipCode" and "ZZZzipCode", and the city-and-hotel-quality operation output message "ABCTripInfo" has in this example a "tripinfo" output parameter whose value is an array holding a variety of types of information. Input and output messages for the hotel-satisfaction operation are similarly defined. In lines 12-18 the two operations for the composite WS are defined, indicating use of the input and output messages, and in lines 19-24 SOAP bindings for the operations and their messages are specified (although details for the host-satisfaction operation are not shown).

Lines 25-39 then specify various additional information for the composite WS, including specifying a newly generated network endpoint for the composite WS in lines 37-38 (which in this example is a specific network-accessible URL that is created by the Web Store ZZZ operator of the WSM for use with this new composite WS). In addition, a use price is specified in line 30, such as based on the use prices for the two constituent WSes with use fees (e.g., 5 cents per use for the "Driving Directions BBB" service, and $1 per 100 uses for the "Hotel Quality Ratings" service)—in this example, the number of calls to the "Hotel Quality Ratings" service may vary with each call to the composite WS, and thus the specified composite WS use price may be estimated based on an expected average number of calls to the "Hotel Quality Ratings" service, or the composite service provision information may instead be altered to limit the number of calls to the "Hotel Quality Ratings" service (e.g., to be less than 15 per call to the composite WS). Moreover, even if an exact or maximum price of using the constituent WSes can be determined, the use price for the composite WS may be set higher than that determined price, such as to cover a fee charged by the WSM and/or to provide revenue to the creator of the composite WS.

The example composite WS WSDL also includes various contractual licensing terms in lines 32-36, textual description documentation for the composite WS in lines 26-29, and use conditions in line 31. In this example, the example license terms are similar to those illustrated in FIG. 1D, although the termination clause is more restrictive (e.g., based on another of the constituent WSes having this more restrictive clause, such as from the use condition information 167 for the "Radio Station Finder" service in FIG. 1G), the textual documentation is a combination of the documentation from each of the constituent WSes, and the use conditions reflect the conditions specified for the "Radio Station Finder" service (as illustrated in FIG. 1G). In addition, one of the use conditions for the composite WS from the "Radio Station Finder" service is of a form that in this example is not automatically enforced by the WSM, that being that the supplied advertisement from the service must be displayed to the end user (which is not shown in FIG. 1K for the sake of brevity), although in some embodiments the WSM could verify at least that the advertisement is sent along with the composite WS response information to the caller. In other embodiments, various other types of information may additionally be specified, and some or all of the illustrated types of information may instead be specified in other manners or not at all.

Thus, FIGS. 1G-1J illustrate one example of creating a composite service based on user input, and FIG. 1K illustrates one example of a dynamically generated WSDL interface description for a composite WS. However, the specification of composite service provision information may instead be performed in a variety of other manners in other embodiments. For example, in some embodiments at least some mappings of output parameters of constituent WSes to input parameters of other constituent WSes may be performed in an automated manner, such as based on metadata for the parameter values (e.g., representation types associated with the parameters). In the illustrative example of FIG. 1J, such automated mapping may be used, for example, to automatically identify a possible association of the city array output parameter of the GetDirections operation and the cityName input parameter of the GetHotelsByCityName operation (in combination with a looping function or other mechanism of extracting a single city name from the array at a time).

In addition, in some embodiments the software facility may further assist in the composite service provision information specification by ensuring that all parameter names in use within the composite service are unique, such as in an automated manner (e.g., adding service-specific information to each parameter of a service or only to parameters having a name conflict, such as the name of the service if the name is specific). Alternatively, in some embodiments at least some parameter names may be re-used (or the name displayed to a user may be re-used), such as the two "hotelName" input parameters in FIG. 1J for the GetHotelSatisfactionPercent and GetHotelsByCityName operations. In addition, in embodiments in which the software facility provides capabilities to automatically map together or otherwise associate input and output parameters and/or to automatically rename parameters (e.g., to ensure uniqueness), such activities may be performed automatically without user review (e.g., as part of an automatic generation of composite service provision information for a composite WS), or instead may be performed under user review and/or based on user approval (e.g., to generate recommendations or defaults).

Furthermore, in some embodiments the software facility operates to obfuscate or eliminate information that is available to consumers of a composite WS regarding the one or more constituent WSes used by the composite WS and/or other details regarding how the composite WS is provided. For example, as previously noted, in some embodiments a new network endpoint that is associated with the WSM or software facility is created and used for the composite WS, thus preventing a consumer from identifying any other WS provider who may be contacted as part of invoking one or more constituent WSes—in such embodiments, the new network endpoint may be provided to a user as a last step in the creation process for a new composite WS. In addition, the information in the dynamically generated WSDL interface description for the composite WS may similarly be generated so as to prevent easy determination of underlying constituent WSes, such as by generating new names for any input and output parameters of the composite WS rather than using the same names as used by any constituent WSes. Furthermore, other information accessible to a consumer (e.g., the types of information displayed for services that are illustrated in FIGS. 1A, 1B and 1L) may similarly be modified so as to minimize or eliminate any references to underlying constituent WSes or the providers of those WSes.

In addition, while not illustrated here, various additional types of processing could be performed on any piece of data in the data flow process. For example, before executing the GetDirections operation, another constituent WS operation (not shown) could be called to verify that the supplied starting and/or ending zip codes are valid zip codes (e.g., based on a service provided for free from the United States Postal Service), with conditional logic indicating to only execute the GetDirections operation if the zip codes are confirmed valid (e.g., to save money if the GetDirections operation is not free). As another example, in some embodiments the format of an output parameter value or the value itself may be modified before it is provided as a value to another input parameter, such as if each city value for the "cities" output parameter includes a string having a city and state name (e.g., "Seattle, Wash."), while the cityName input parameter expects only a city name (e.g., "Seattle"). A variety of types of value translation and transformation functions may be provided to facilitate such value manipulations, including to transfer data between data types (e.g., to transform a zip code value stored as a string to a zip code value stored as an integer).

In addition, as discussed in greater detail below, a variety of additional types of capabilities may be provided to assist in the creation and execution of composite services. For example, execution-time error handling may be performed in various ways, such as to identify invalid data before it is supplied as input to a WS operation and/or to handle an error response from an invalid attempted execution of a WS operation. In addition, various capabilities to facilitate the creation of composite services may also be provided, such as automated validation/verification to check specified composite service provision information (e.g., to ensure that data types match), interactive debugging capabilities to identify problems (e.g., by treating one or more WSes being debugged as constituent WSes to a composite WS that provides the debugging capabilities), test execution capabilities (e.g., for free, even if the test involves use of one or more fee-based constituent services), simulation capabilities to test multiple invocations of the composite service over time or other specified use cases, error tolerance calculation capabilities, sensitivity analysis capabilities, etc. Moreover, in at least some embodiments the composite service provision information specified for at least some composite services (e.g., for frequently used composite services) is stored in a manner to facilitate rapid retrieval of the composite service provision information at execution time, such as by caching the composite service provision information.

Moreover, in some embodiments various of the types of capabilities discussed, whether capabilities for creating composite WSes (e.g., mapping or otherwise associating multiple constituent WS parameters, determining a standard parameter name or parameter type for a constituent WS parameter, identifying parameter name conflicts and/or renaming parameter names, performing validation or verification functions for composite service provision information, providing debugging capabilities, providing test execution capabilities, etc.) and/or for executing composite WSes (e.g., to provide programming constructs such as conditional logic or looping, modifying or manipulating parameter values or value formats, execution-time error handling, etc.), may themselves be implemented as constituent services within the composite service, such as based on services provided by the WSM or software facility. In addition, in some embodiments the composite WS creation and/or execution capabilities of the software facility may be designed in such a manner as to be extensible, such as to allow new capabilities to be added (e.g., using invocable constituent and/or composite services, or in other manners such as executable code modules or objects).

Once WSes are available at the WSM, whether WSes registered by the WS providers who provide them and/or registered composite WSes that are created by users, potential WS consumers can identify available WSes of interest in various ways, such as previously discussed with respect to FIGS. 1A and 1B. The potential WS consumers can then interact with the WSM to obtain access to a selected WS, such as by providing an access fee payment based on an access price (if any) for the WS and by satisfying any other specified use conditions for the WS. In some embodiments, some or all consumers obtain access to registered WSes by purchasing subscriptions to those WSes for later use, and in some embodiments non-subscription use of registered WSes is provided. For example, one-time or limited non-subscription uses of a WS may be provided for a variety of reasons, such as to allow an evaluation or test use of a WS in order to determine whether to purchase additional uses, for use of registered WSes that are free, to allow anonymous access without a defined subscription, etc. As discussed in greater detail below, various types of subscriptions can be provided in various embodiments, including one-time use subscriptions, subscriptions for a specified length of time and/or number of uses, etc. In addition, in some embodiments a WS consumer may need to first register with the WSM as a user before obtaining access to registered WSes (e.g., to provide contact information, payment source information, formatting and protocol preferences for WS invocation response information, etc.).

When a consumer's access to a WS is authorized by the WSM but not provided immediately (e.g., by purchasing a subscription), the consumer will in some embodiments receive authorization information for use with later requests for the authorized access (e.g., a unique subscription ID for a purchased subscription, or a transaction ID for later-occurring non-subscription transactions). If so, the later requests from the consumer to provide the authorized access may include providing the previously received authorization information, and may further be supplied or specified in a manner indicated to the consumer at the time of original access authorization.

After receiving an access request from a consumer for current use of a registered WS, the WSM determines whether the use of the WS by the consumer is authorized, such as based on any authorization information supplied with the request. In addition, in some embodiments the WSM may further determine at the time of requested WS use whether any payment obligations and specified use conditions are currently satisfied for an invocation of the WS. If the WSM determines that the WS use is authorized, the WSM causes the WS to be provided, and then provides some or all of any response information from the WS invocation to the consumer. For example, for a registered WS provided by a WS provider, the WSM causes the WS to be provided by interacting with the WS provider to invoke the WS and to obtain any response information, such as by using invocation information from a WSDL interface description for the WS. For a composite WS, the WSM causes the WS to be provided by using the composite service provision information for the WS to cause one or more constituent WSes to be invoked in the manner indicated, such as by performing each such constituent WS invocation in a manner similar to that described for a registered WS provided by a WS provider.

In some embodiments, the WSM performs additional formatting of the response information before providing it to the consumer. The information formatting can be performed in various ways and for various purposes, such as to act as a translator/adapter that accommodates previously specified preferences of the WS consumer (e.g., information format and/or protocol preferences requested from the WS consumer when they previously registered with the WSM), to combine the response information with other information (e.g., response information from other invoked WSes), and to obfuscate information related to the invocation of the WS (e.g., the specific invocation request, information about the WS provider, information about the time of invocation of the WS, etc.). In addition, in some embodiments the WSM and/or software facility may automatically provide access to a composite service via multiple alternative protocols, which in some situations may include defining multiple interfaces and/or network endpoints or other addresses for use with the alternative protocols. As one illustrative example, in some embodiments a new composite WS may be accessible via each of an interface using SOAP messages, an interface that uses network-addressable resources (e.g., as part of the REpresentational State Transfer, or "REST", distributed interaction model), and an interface based on simple XML documents sent over HTTP (e.g., using an RPC interaction model that focuses on available operations). Similarly, output information may be provided using various protocols and in various manners, including using a different protocol for output than was used for input.

In addition, in some embodiments the WSM may maintain one or more caches or other storage mechanisms to store response information from WS invocations, and if so may in some situations provide such stored response information to consumers rather than invoking the WSes to obtain additional response information (e.g., when the stored data was recently received and is of a type that is not time-sensitive and/or subject to rapid change)—such response information may in some embodiments include not only information provided by the WS as the product of the invocation, but also status or other response messages (e.g., for a WS that does not otherwise provide information in response to its invocation) or instead an indication that the WS does not provide any response. Similarly, in some embodiments the provision of a composite WS may include using stored response information for one or more of the constituent WSes of the composite WS rather than dynamically invoking the constituent WS. Such caching may provide benefits to both WS consumers (e.g., by providing response information even if a WS provider is not currently available, by providing response information more rapidly than if the WS was dynamically invoked, etc.) and to WS providers (e.g., by providing to WS consumers a service invocation volume higher than the WS provider can actually handle, by providing service to WS consumers even if the WS provider has temporarily throttled some or all requests to its WS, etc.), as well as potentially providing cost savings from not invoking fee-based WSes.

As previously noted, potential WS consumers can identify WSes of interest in a variety of ways. In some embodiments, the WSM allows potential WS consumers to search the registered WSes in various ways, such as based on the type of service and/or type of data provided, on the use price, on the WS provider or other source of the WS (e.g., by treating the source of a composite WS as the WSM or as the user who created the composite WS), on the WS description, etc. In addition, in some embodiments the registered WSes may be categorized into groups of related WSes (e.g., in a hierarchical manner with one or more levels of sub-categories), and if so potential WS consumers may be able to browse within specified categories and sub-categories and/or may be able to limit their search to specified categories and sub-categories. Furthermore, in some embodiments composite WSes may be identifiable by consumers, and if so potential WS consumers may be able to search or browse only among composite WSes and/or by excluding composite WSes. Moreover, a variety of other types of WS-related information may be provided to potential WS consumers, such as by providing lists or other indications of top-ranked and/or top-rated WSes, indications of recommended WSes (e.g., personalized to the current potential WS consumer based on information known about that consumer), etc.

In addition, after identifying one or more WSes of potential interest, a potential WS consumer may be able to review additional information about each WS, such as by receiving a Web page specific to a WS that includes description information for the WS (e.g., such as previously discussed with respect to FIGS. 1B and 1L) and that optionally includes various other information about the WS (e.g., pricing information, information about the WS provider, etc.). In some embodiments, such WS-specific information may also include a variety of other types of information; including reviews of the WS by other WS consumers that have used the WS and/or summaries of such reviews, indications of rankings and/or ratings of the WS relative to other WSes based on various criteria (e.g., number of uses, a recent trend in use, consumer-specified ratings, etc.), indications of similar WSes (e.g., based on category) and/or otherwise related WSes (e.g., other WSes by the same WS provider, other WSes that have been used by other WS consumers that have previously used this WS, etc.). In some embodiments, some or all of such reviews, rankings and ratings of composite WSes may be gathered and used independently of related information for the constituent WSes for the composite WS, while in other embodiments some or all such additional information may instead be automatically generated for a composite WS based on the related information for its constituent WSes.

In some embodiments, some or all of the described actions by WS providers and/or WS consumers are performed via user interactions with a Web site for the WSM, such as a Web site dedicated to providing a marketplace for Web services or instead a Web site of a more general Web store that provides various types of items (e.g., products and/or services) that include the Web services. Alternatively, in some embodiments, some or all interactions by the WS providers and/or WS consumers are instead performed by programs acting on behalf of the WS providers or consumers programmatically interacting with one or more computing systems of the WSM, such as via defined APIs (e.g., via Web services provided by the WSM to implement the underlying functionalities for the WSM)—in some embodiments, such APIs are based on the use of XML over HTTP (e.g., using the REST distributed interaction model), while in other embodiments the APIs may be based on the use of SOAP and/or other protocols related to Web services.

In some embodiments, the WSM further provides a capability for WS providers and/or WS consumers to monitor and manage their interactions with the WSM, such as via a portal. For example, a registered WS provider and/or creator of a composite WS may in some embodiments monitor their registered WSes, such as to determine the current level and/or a historical level of the use of those WSes by WS consumers, or instead to determine a current status of their WSes (e.g., to verify that their WSes are currently operating properly). In addition, WS providers and composite WS creators may be able to manage various aspects of their registered WSes, such as to modify pricing information and other use condition information, or to dynamically specify current throttling conditions for the use of their WSes (e.g., to limit volume and/or type of use of the WSes for a specified period of time or until specified conditions are satisfied or until further notice). WS providers may also review and/or manage their user account information, such as to change their current contact information or to review payment amounts currently owed to the WS provider by the WSM. In a similar manner, registered WS consumers may monitor and manage their WS subscriptions or other WS access authorizations (e.g., to review recent use of their subscriptions and the amount of previously purchased or otherwise approved subscription use remaining, to dynamically specify current throttling or other restriction conditions for the use of their subscriptions, etc.), as well as review and manage their user account (e.g., to modify payment source information, or to authorize additional WS subscriptions or other WS use, such as by purchasing WSM-provided "points" that can later be used to pay for or authorize WS use).

As one example of another type of information that can be specified by WS providers and/or WS consumers in some embodiments (e.g., via the WSM portal or during registration), various types of notification requests may be specified for various types of information. For example, a WS provider may want to receive a standard email notification when the average volume of invocations of their WSes over a specified period of time exceeds a specified threshold, and may further wish to receive an urgent alert notification when one of their WSes goes offline or otherwise generates an error condition. Similarly, WS consumers may wish to receive notifications based on use or current status of their subscriptions, on the current availability of specified WSes and/or specified categories of WSes, on the current status of their user account information (e.g., the amount of WSM points remaining), etc. Such notification requests may include specifications of how to perform the notification, as well as the conditions that trigger the notification when they are satisfied. As the WSM operates in such embodiments, it monitors defined notification conditions in order to determine when notifications are appropriate, and performs the requested notifications in the manner specified.

In addition, while a WS subscription is in some embodiments limited to the particular WS consumer that created the subscription, in other embodiments a WS subscription may be shared among multiple different users. For example, in some embodiments a WS consumer may specify one or more affiliate users for one or more of their WS subscriptions, with each affiliate user given specified rights to use those WS subscriptions (e.g., authorization to make a specified total number of WS invocation requests based on the subscription or a specified limit on the volume of such WS invocation requests, a specification of conditions under which use of the subscription by an affiliate is allowed or disallowed, etc.). In addition, in some situations a WS consumer may create a WS subscription on behalf of an indicated application (or a specified copy or instance of such an application), such as an application developed and/or distributed by the WS consumer, and may specify that some or all users of that application are authorized to use that WS subscription in some or all situations. Conversely, in some embodiments such an application developer or distributor may instead incorporate one or more WS invocation requests as part of their application (whether or not in conjunction with a subscription by that WS consumer), but may instead limit some or all uses of those WS invocation requests by the application users such that those users may instead need to provide their own payment and/or subscriptions to those WSes in order to use that functionality of the application.

Moreover, in some embodiments various third parties can interact with the WSM to obtain various additional functionality for themselves and/or to provide such additional functionality to other users. For example, in some embodiments external computing systems may provide WS coordination services to other users, with the computing systems defining WS coordination requests and interacting with the WSM to request satisfaction of those requests. Such coordination requests may in some embodiments specify other registered WSes to be invoked and/or specify various logic to be executed, thus providing capabilities similar to those of registered composite WSes without having to register those WS coordinations. The coordination requests may be supplied to the WSM for execution (e.g., for a fee charged by the WSM, or instead based on the specified pricing information for the WSes invoked by the coordination), such as in a manner similar to execute composite service provision information, and may be represented in various ways in various embodiments (e.g., as data structures, code modules, templates, mappings, portable code, etc.). In other embodiments, such third-party coordination services may instead execute the coordination logic for coordinations, such as by interacting with the WSM to individually invoke each WS for the coordination as specified by the logic for the coordination and then combining any resulting response information to be provided to the requester of the coordination (e.g., a user of the coordination service, such as for a fee).

In addition to coordination services, third parties can obtain and provide a variety of other types of functionality by interacting with the WSM. For example, in some embodiments some third parties may provide WSM agents that interact with the WSM to provide additional functionality to users, such as to monitor various aspects of the operation of the WSM in order to provide information or notifications to the user (e.g., in situations in which the WSM does not provide corresponding notification capabilities for the type of information being monitored by the agent, or instead to replicate a capability available from the WSM for a user who is not eligible to receive the information from the WSM). A variety of other types of interactions with the WSM can similarly be provided to enable various other types of additional functionality and capabilities. For example, in at least some embodiments such agents may be able to search for and discover registered services and other types of information (e.g., defined representation types), to register existing services and/or to create composite services, to provide or otherwise enable links to databases and other external information sources, to enable others to search for or otherwise identify additional functionality provided via the agent, etc.

As previously noted, in some embodiments some or all of the registered WSes may have specified pricing information such that WS consumers provide payment to use those WSes. In some embodiments, a variety of types of billing mechanisms are provided for WS consumers. For example, as previously noted, in some embodiments WS consumers may be able to purchase WS subscriptions that can then be used at later times, and in some embodiments the WSM may sell non-subscription WS access. In addition, in some embodiments billing occurrences are based on prior specified Service Level Agreements ("SLAs") with certain WS consumers and/or based on the Quality of Service ("QoS") requested by and/or actually provided to the consumer. For example, a provider of a WS may specify a use price for that WS that is based on one or more specified QoS levels provided by that WS provider in conjunction with the access to that WS (e.g., a maximum response time, a minimum level of accuracy of response information, etc.), such as the only use price for that WS or instead one of multiple use prices (e.g., with one or more of the other use prices having other specified QoS levels and/or no QoS levels), and if so access to that WS that is purchased based on that use price (e.g., a subscription purchased for an access fee based on that use price) is performed in accordance with those specified QoS levels when possible. Similarly, an operator of the WSM may in some embodiments specify an access price for each of one or more of the registered WSes that is based on one or more specified QoS levels provided by the WSM in conjunction with access to those WSes (e.g., a maximum response time, a minimum level of accuracy of response information, etc.), such as the only access price for a WS or instead one of multiple access prices for the WS (e.g., based on one or more specified use prices for the WS, with one or more of the other access prices having other specified QoS levels provided by the WSM and/or no QoS levels), and if so access to that WS that is purchased based on that access price is performed in accordance with those specified QoS levels when possible. In some embodiments, if access to a WS is not provided to a consumer in accordance with specified QoS levels purchased by that consumer and/or is not provided in accordance with any previously specified SLAs for that consumer, various additional actions may be taken to compensate the consumer (e.g., by providing a payment credit, by not counting that access as part of the paid access for the consumer, etc.) and/or to correct any problems (e.g., to correct any internal mechanisms of the electronic marketplace, such as by notifying appropriate personnel associated with the electronic marketplace; to correct performance of the provider of the WS, such as by notifying appropriate personnel associated with the WS provider and/or by providing a financial incentive to the WS provider, such as by delaying or reducing payment to that WS provider; etc.). Moreover, in some embodiments WS consumers can obtain WSM-provided points that can be later used to purchase subscriptions and other WS access for various WSes—such points may be a WS payment option that WS consumers can purchase or otherwise earn (e.g., as a reward) for later use with a specified group of WSes and/or WS providers (e.g., all WSes and WS providers). The points for a WS may be identified to a potential WS consumer in various ways in various embodiments (e.g., displayed or otherwise accessible as a subscription or access price for some or all WSes, whether in addition to or instead of one or more prices in governmental currencies), and the determination of how many points are needed to purchase access to a WS subscription or other WS access may similarly be determined in various ways in various embodiments (e.g., by specifying and using a standard exchange rate for all WSes; by allowing each WS and/or WS provider to have an individualized specified exchange rate, such as one specified at registration time for the WS and/or WS provider; or by dynamically determining appropriate WSM points for a WS based on a variety of factors when the price is provided to a potential WS consumer, such as a current usage rate of the WS, other current conditions such as a current day/time, information about the WS consumer, etc.). Similarly, in other embodiments the WSM may accumulate the costs of some or all of the WS uses for a consumer over a specified period of time, such as to provide a single monthly bill for all use of a specified WS or of all WSes.

In addition, in some embodiments the WSM provides various security and/or privacy mechanisms to ensure that only authorized WS providers can register and provide WSes, that only authorized users can create and register composite WSes, and/or that only authorized WS consumers can subscribe to and/or access registered WSes. Such security and/or privacy can be provided in a variety of ways, including the use of passwords, public key encryption, digital certificates, etc. In addition, the WSM may use various security and/or privacy mechanisms with respect to management/monitoring interactions by WS consumers, WS providers and/or other users, such as to provide information to users only when they are authorized to receive it and to allow modification of WS-related information and of subscriptions only when authorized. Similarly, in embodiments in which affiliates of WS consumers or other users are allowed at least some access to subscriptions of the WS consumer, various security and/or privacy mechanisms may be employed to ensure that the affiliates are authorized to receive any benefits and information provided to them.

Furthermore, in addition to having WSes provided by third-party WS providers and to providing access to registered WSes for third-party WS consumers, in some embodiments the WSM itself may act as a WS provider and/or WS consumer for one or more WSes, such as an alternative to other third-party provided WSes, to provide WSes that are not otherwise available to WS consumers, and/or as part of providing capabilities related to composite services. In addition, various other capabilities provided and used by the WSM may also be implemented as WSes, such as a WSM API available to WS providers and/or WS consumers, as well as internal capabilities used by the WSM (e.g., determining whether a specific subscription request for a WS satisfies the specified use conditions for that WS by invoking an internal WS that provides the service of comparing the specified use conditions and requested use information to determine whether the specified use conditions are satisfied).

In addition, as discussed in greater detail below, the WSM can also provide a variety of other types of functionalities and capabilities as described.

Figure 2:
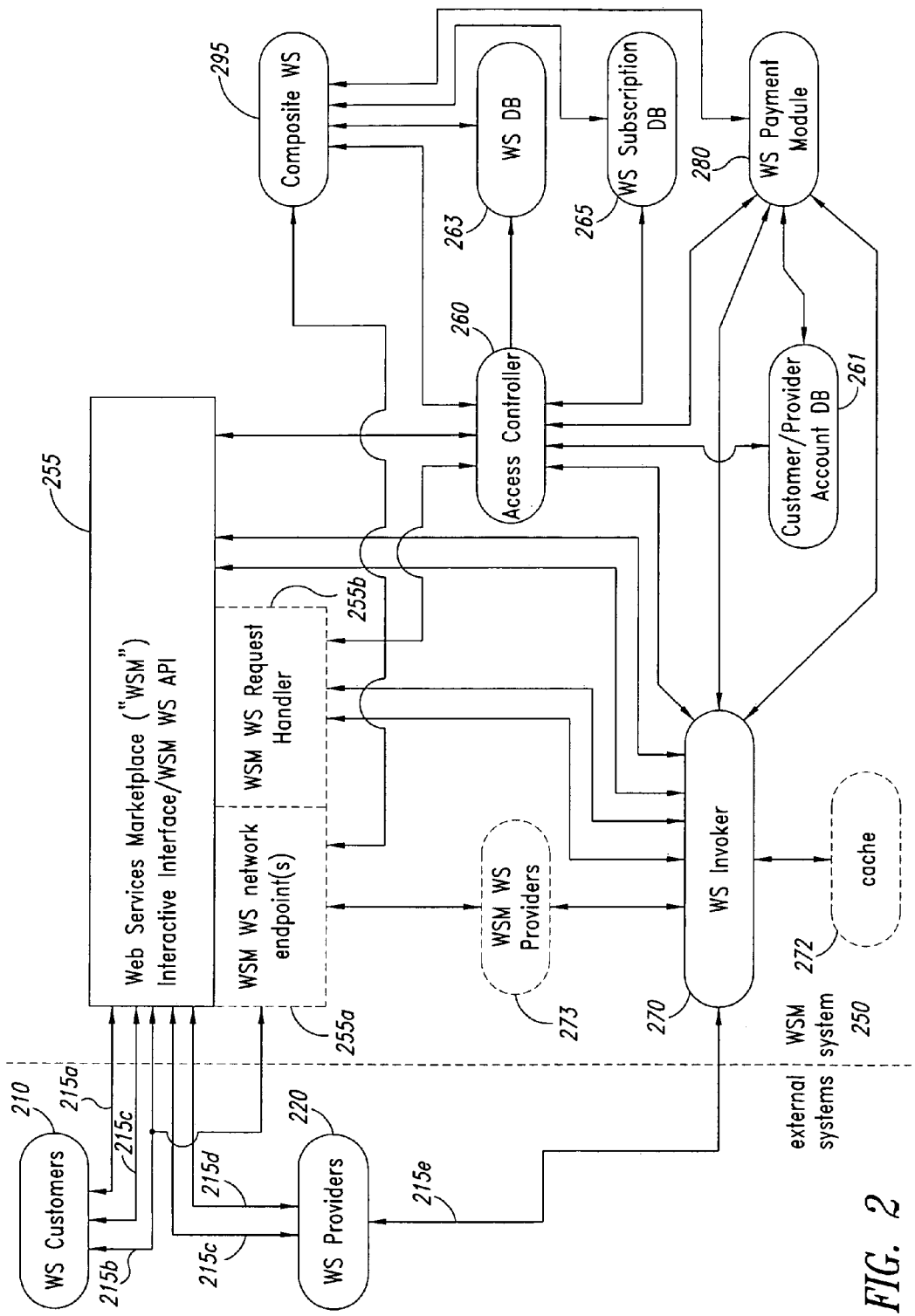
FIG. 2 is a network diagram illustrating components and information flow of an example embodiment of the WSM system.

FIG. 2 is a network diagram illustrating components and information flow of an example embodiment of the WSM system and of various external computing systems and users interacting with the WSM system. In particular, in the illustrated embodiment various WS consumers 210 and WS providers 220 external to the illustrated WSM system 250 interact with the WSM system to register WSes from WS providers and to register composite WSes created by WS consumers and/or WS providers, as well as to identify, subscribe to, and obtain access to registered WSes. While not illustrated in this example embodiment, various optional third parties (not shown) external to the WSM system may also interact with the system to receive or provide various enhanced or alternative capabilities and functionalities.

In particular, WS providers interact 215d with a front-end interface 255 of the WSM system to register existing WSes and/or interact 215c with the front-end interface in order to create new composite WSes—in the illustrated embodiment, the front-end interface 255 may be a Web site with which the user interacts and/or an API (e.g., a WS API) with which external computing systems and executing applications interact, although in other embodiments other types of front-end interfaces may alternatively be used. The WS providers may also in some embodiments interact 215d with the front-end interface to initially register themselves as users of the WSM system (e.g., as WS provider users).

In this illustrated embodiment, after the front end 255 receives a user registration request for a WS provider or a registration or creation request for a WS, corresponding information is forwarded to an Access Controller component 260 of the WSM system to determine whether to approve the request (e.g., based on whether sufficient appropriate information was provided, and/or on whether other predefined criteria have been satisfied), and indicates to the front end whether the request was approved. With respect to composite service creation, for example, an access request may be sent when the creation process is initiated and/or when the creation process has been completed and the composite service is ready to be put into use. In addition, the Access Controller component stores information about the created composite WS or registered WS in a WS database 263 for later use, or stores information about the registered WS provider in a Consumer/Provider User Account database 261.

In a similar manner, WS consumers interact 215a with the front end to obtain information about available WSes, to subscribe to available WSes, and in some embodiments to initially register with the WSM as a user (e.g., a WS consumer user) prior to such subscription requests. Also, in a manner similar to WS providers, WS consumers may interact 215c with the front-end interface in order to create new composite WSes. As with requests from WS providers, the front end forwards information regarding WS consumer user registration, subscription, and WS creation requests to the Access Controller for determination of whether to approve the requests, and the Access Controller responds to the front end in an appropriate manner. The Access Controller also stores information about registered consumers in the Account database 261, about registered subscriptions to WSes and other WS access authorizations in the WS subscription database 265, and about created composite WSes in the WS database 263 for later use.

After a request to create a new composite WS is received and approved, in the illustrated embodiment a Composite WS component 295 then operates to facilitate the creation of the composite WS, such as based on information received with the request and/or by obtaining corresponding information (not shown) from the user who indicated to perform the composite WS creation (e.g., in an interactive manner). The Composite WS component may also obtain and use various information as part of the creation process, such as information about registered WSes from the WS database, and information about the user's subscriptions (if any) to registered WSes from the WS Subscription database. After a composite WS is created, the Composite WS component then stores information about the new composite WS in the WS database, such as a dynamically generated WSDL or other interface definition for the composite WS and/or other associated information (e.g., one or more use prices, access control information, etc.). Furthermore, in some embodiments the Composite WS component may operate to create a new WSM WS network endpoint 255a for use in invoking the composite WS (or may associate an existing such network endpoint with the composite WS).

In other embodiments, some or all of the various types of information could instead be stored in other manners, such as to maintain separate account database information for WS consumers and WS providers, or to instead maintain subscription information along with other user information in the Account database. In addition, in embodiments in which WS providers and/or WS consumers can specify notification requests (e.g., at the time of user registration), such information is also forwarded to the Access Controller, which stores the information as appropriate for later use.

While not illustrated here, in some embodiments the WSM system further includes a WSM Portal component (not shown) with which WS consumers and WS providers can interact to obtain information about their accounts and to perform other interactions with the WSM system, such as to monitor and/or manage WS-related information. In some embodiments, the WSM Portal interacts with the front-end interface to perform requested retrieval and modification of information, while in other embodiments instead interacts directly with the various databases as appropriate.

WS consumers may also interact 215*b* with the front end to invoke or otherwise request access to WSes (e.g., WSes to which the consumers have subscriptions). In some embodiments, all such requests may be forwarded using the same access point of the front end API, such as if a WS to be invoked is identified in the request with a unique identifier. Alternatively, in some embodiments some or all registered and/or created composite WSes may instead each have a unique WSM WS network endpoint 255*a*, and if so a request to such a WS may instead be sent to the unique network endpoint for that WS. Requests for access to registered non-composite WSes are then forwarded to the Access Controller component to determine whether to approve the requests, such as to verify that the requester is authorized to access the WS (e.g., has a subscription) and that other specified use conditions are satisfied. In the illustrated embodiment, requests for access to composite WSes, however, are first forwarded to a WSM WS Request Handler component 255*b*, such as to assist in the determining of whether to approve the WS access request, whether alone or in conjunction with the Access Controller component. In other embodiments, invocations of at least some WSes via corresponding network endpoints 255*a* may instead invoke those WSes without interacting with the WSM WS Request Handler component or Access Controller component, whether directly (e.g., from a WSM WS Provider 273) or via the WS Invoker component 270. When a WS access request for a non-composite WS is received from a WS consumer and the Access Controller approves the request, the front end interacts with a WS Invoker component 270 to perform invocation of one or more WSes as appropriate, such as based on information retrieved from the WS database and/or received from the front end. The WS Invoker component then interacts 215*e* with one or more WS providers as appropriate to invoke the appropriate WSes and to receive response information. In some embodiments, the WS Invoker stores received response information in an optional cache 272 for later use, such as to use in lieu of a WS invocation in certain situations as appropriate. In addition, in some embodiments one or more of the WS providers from which the WS Invoker may invoke WSes can be one or more optional internal WSM WS providers 273. After obtaining the appropriate response information, whether from a WS provider or from the cache, the WS Invoker component returns the response information to the front end. In some embodiments, the front-end interface performs additional processing on the received response information before providing it to the requesting WS consumer, such as to aggregate information from multiple invoked WSes and/or to format the response information in accordance with previously specified preferences for the WS consumer.

When a WS access request for a composite WS is received from a WS consumer and the Access Controller approves the request, in the illustrated embodiment the WSM WS Request Handler component of the front end interacts with the WS Invoker component 270, such as to perform composite WS invocation in a manner specific to composite WSes. For example, in situations in which a composite WS allows executing multiple constituent WSes in parallel, the WSM WS Request Handler may send multiple invocation requests for those multiple constituent WSes to one or more instances of the WS Invoker, with the WS Invoker then causing those constituent WSes to be provided in a manner to that previously described. After obtaining constituent WS response information from the WS Invoker, the WSM WS Request Handler may perform various types of processing on the response information before providing it to the requesting WS consumer via the front end, such as to evaluate the response information as part of determining additional processing to be performed as part of the composite WS (e.g., as part of evaluating conditional logic specified for the composite WS). Moreover, after execution of the composite WS is complete, the WSM WS Request Handler and/or front end may further perform other activities, such as to aggregate information from multiple invoked WSes and/or to format the response information in accordance with previously specified preferences for the WS consumer. The WSM WS Request Handler may obtain composite service provision information and other related information for a composite WS in various ways, such as via the Access Controller, or instead via a direct connection (not shown).

While not illustrated here, in some embodiments the WS Invoker component may also provide information to a WS Transaction Monitor component (not shown) regarding some or all processed WS invocation requests, such as for all requests whether satisfied from the cache or from a WS provider, or instead only for successful requests to an external WS provider, with the WS Transaction Monitor component in turn storing information about the transactions in a WS Transaction database as appropriate. The WS Transaction Monitor component may also review information regarding requested notifications to determine whether transactions and/or other status information have triggered one or more specified notification conditions, such as after each transaction or instead on a periodic basis. When the WS Transaction Monitor component determines that one or more notifications have been triggered, the component may then forward corresponding information to a Customer/Provider Notifier component (not shown) to perform notifications to WS consumers and/or WS providers as appropriate.

When a received request by the Access Controller and/or WS Invoker corresponds to payment that needs to be obtained (e.g., for subscription requests or other WS access requests), one or more of the components interact with a WS Payment Module component 280 in the illustrated embodiment to provide information about the corresponding request or transaction, although in other embodiments the front end could instead interact directly with the Payment Module. The Payment Module then determines appropriate payment that is needed (e.g., by receiving the information from another component and/or by retrieving appropriate information from one or more of the databases, such as the WS Subscription database, WS database and/or Account database), and performs the necessary functions to obtain the payment, such as in accordance with previously provided payment source information and any specified preferences. The Payment Module also stores information about the payments obtained from WS consumers and any corresponding payments owed to WS providers in a WS Payments database (not shown). In some embodiments, the Composite WS component may also interact with the Payment Module, such as to obtain payment for providing services related to creating composite WSes, and/or to determine payment information related to constituent WSes specified for a composite WS.

As previously noted, in some embodiments one or more third-party systems or users (not shown) may additionally be present to interact with the WSM system, such as via the front-end interface. As discussed in greater detail elsewhere, such third-party systems may provide a variety of types of services and functionalities, including coordination, agent-based monitoring, etc.

Figure 3:
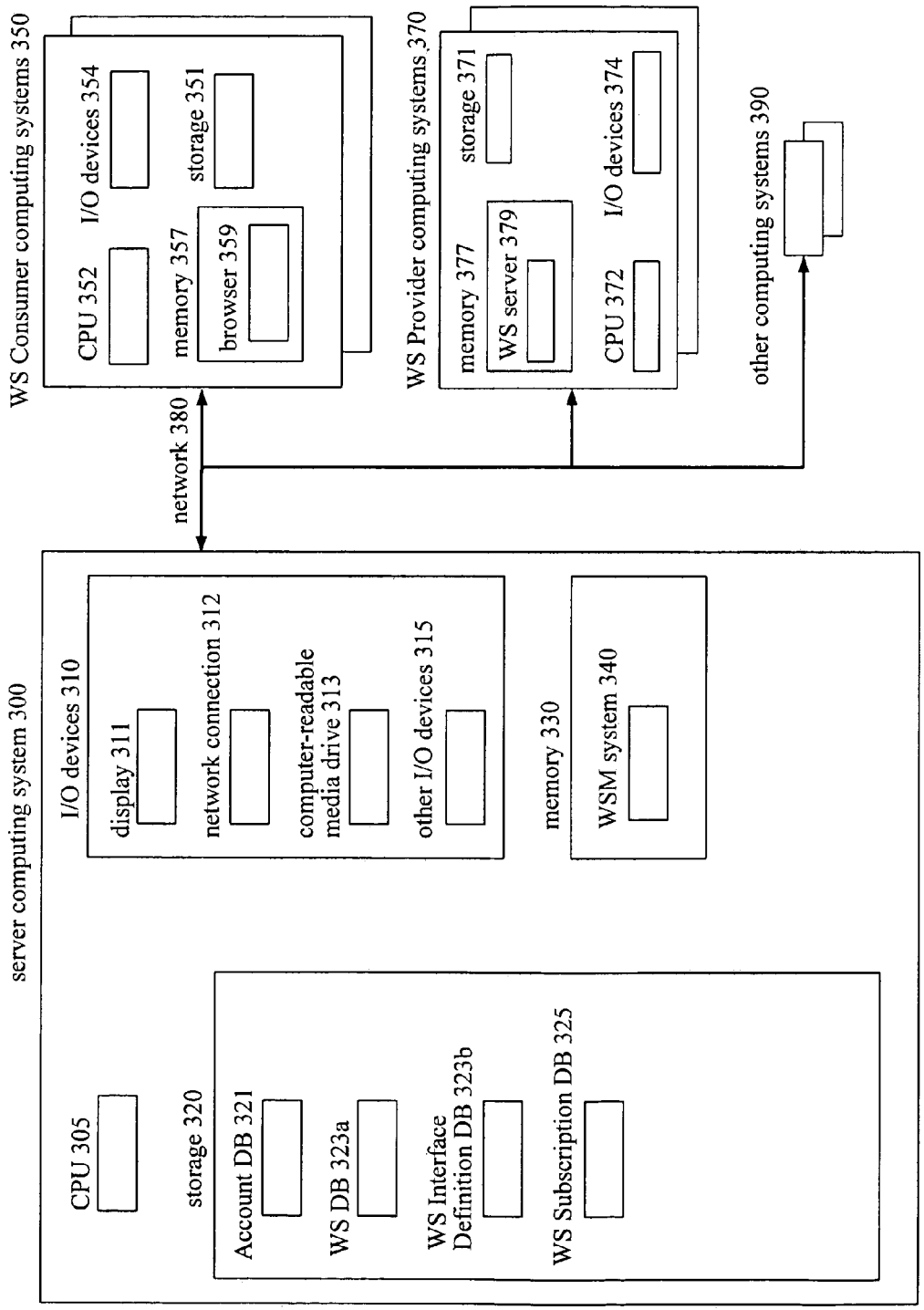
FIG. 3 is a block diagram illustrating an embodiment of a computing system suitable for executing an embodiment of the WSM system.

FIG. 3 illustrates a server computing system 300 suitable for executing an embodiment of the Web Services Marketplace ("WSM") system, as well as various WS consumer computing systems 350, WS provider computing systems 370, and other computing systems 390. In the illustrated embodiment, the server computing system includes a CPU 305, various I/O devices 310, storage 320, and memory 330. The I/O devices include a display 311, a network connection 312, a computer-readable media drive 313, and other I/O devices 315.

An embodiment of the WSM system 340 is executing in memory, and it interacts with the other computing systems over the network 380 using the network connection 312 (e.g., via the Internet and/or the World Wide Web). The other computing systems can similarly execute various information as part of the interactions, such as a Web browser 359 executing in memory 357 of the WS consumer computing systems to allow users of the systems to interact with the WSM system, and such as a WS server 379 executing in memory 377 of the WS provider computing systems to provide Web service functionality. Such other computing systems also include a variety of I/O devices in the illustrated embodiment, including network connections to communicate with each other and the server computing system over the network. In addition, in the illustrated embodiment a variety of datastores (e.g., databases) 321, 323a, 323b, and 325 are present on the storage 320 for use by the WSM system, although in other embodiments some or all such databases may instead be located elsewhere and/or be organized in other manners, and various other additional data may be accessed and used (e.g., information regarding previous transactions, regarding previously made and/or owed payments, regarding notification requests, etc.).

In the illustrated embodiment, a Composite WS component (not shown) and WSM WS Request Handler component (not shown) execute as part of the WSM system in order to provide functionality related to composite WSes, although in other embodiments one or both such components may instead execute separately from the WSM system (e.g., separately in memory 330, or instead on a remote computing system). In this illustrated embodiment, the Composite WS component may access various information as part of the composite WS creation process, such as information about users from the Account database 321 and/or information about constituent WSes from the databases 323a and 323b having WS-related information. When a composite WS is ready for completion (or a modification of an existing composite WS is ready for completion), the Composite WS component then dynamically generates a WSDL and/or other interface definition for the composite WS and stores that definition in the WS Interface Definition database 323b, and stores other information about the composite WS in the WS DB 323a database (e.g., composite service provision information, additional information associated with the composite service such as use price(s) and access controls, etc.).

Those skilled in the art will appreciate that the illustrated computing systems are merely illustrative and are not intended to limit the scope of the present invention. Computing system 300 may instead be comprised of multiple interacting computing systems or devices, and may be connected to other devices that are not illustrated, including through one or more networks such as the Internet or via the Web. More generally, the "server" and other computing systems may comprise any combination of hardware or software that can interact in the manners described, including without limitation desktop and other computers, network devices, internet appliances, PDAs, cellphones and cordless phones and other wireless phones, devices with walkie-talkie and other push-to-talk capabilities, pagers, electronic organizers, television-based systems (e.g., using set-top boxes and/or personal/digital video recorders) and various other consumer products that include inter-communication capabilities. In addition, the functionality provided by the WSM system components illustrated in FIG. 2 may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing system or device via inter-computer communication. Some or all of the WSM system components or data structures may also be stored (e.g., as software instructions or structured data) on a computer-readable medium, such as a hard disk, a memory, a computer network or other transmission medium, or a portable media article (e.g., a DVD or flash memory device) to be read by an appropriate drive or via an appropriate connection. Some or all of the WSM system components and data structures can also be transmitted via generated data signals (e.g., by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
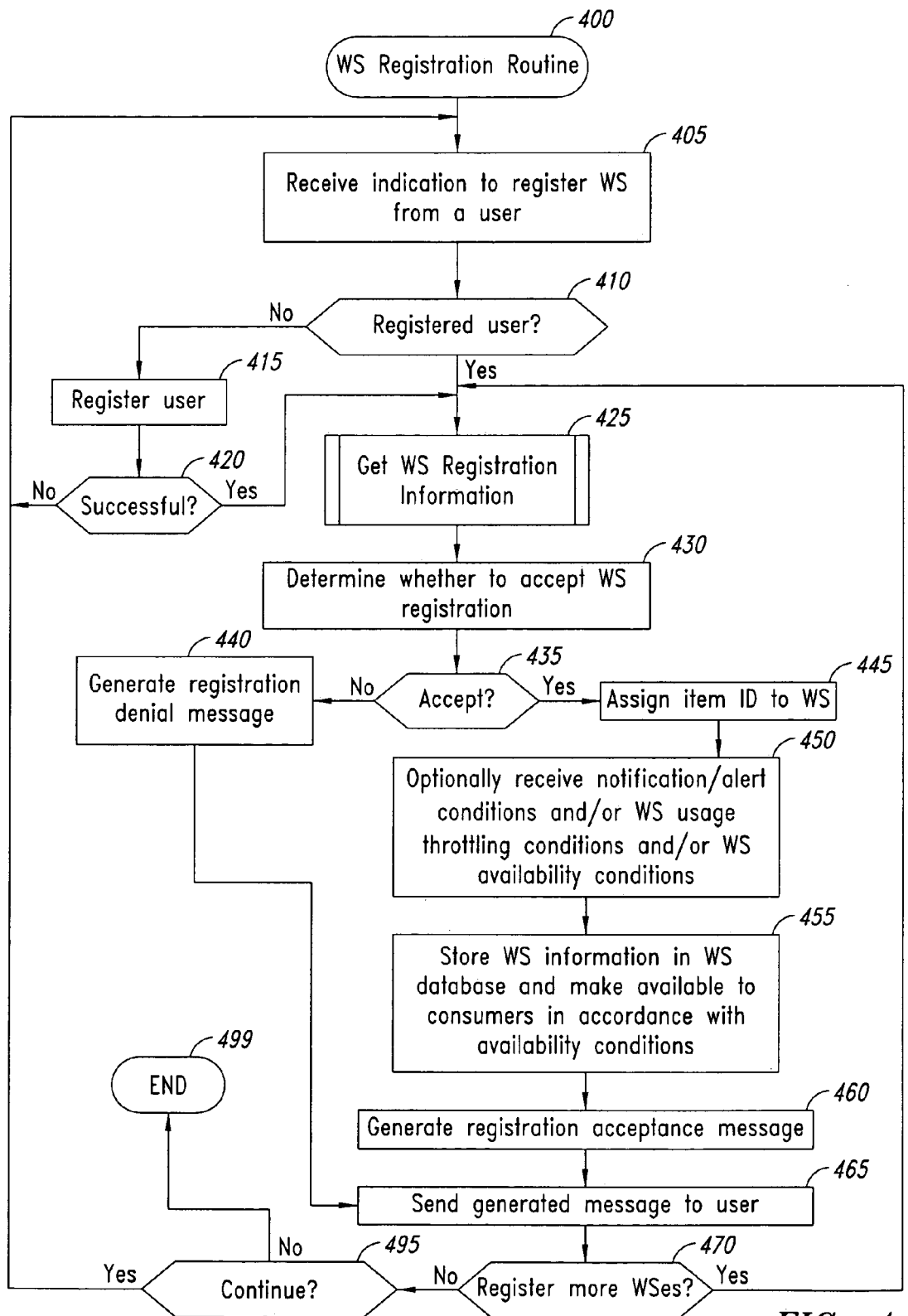
FIG. 4 is a flow diagram of an embodiment of a WS Registration routine.

FIG. 4 is a flow diagram of an embodiment of the WS Registration routine 400. The routine may, for example, be provided by an embodiment of the WSM and/or of the software facility. The routine processes requests from users to register WSes at the WSM for use by WS consumers, including from WS provider users and/or WS consumer users to create composite WSes to be registered. The routine begins at step 405 where an indication is received from a user to register a WS. The routine continues in the illustrated embodiment to step 410 to determine whether the user is registered at the WSM, and if not continues to step 415 to attempt to register the user (e.g., by obtaining contact information for the user, information about how to provide payment to the user based on use of the user's registered WSes, etc.). After step 415, the routine continues to step 420 to determine whether the registration of the user was successful. If so, or if it was instead determined in step 410 that the user was already registered (or did not need to be registered), the routine continues to step 425 to execute a subroutine that obtains various information corresponding to the WS being registered for use in performing the registering, as described in greater detail with respect to FIG. 5, although in some embodiments at least some of such information may instead be received as part of step 405.

After step 425, the routine continues to step 430 to determine whether to accept the WS registration, such as based on an automated determination (e.g., on whether appropriate information has been supplied and any predefined criteria had been satisfied) and/or a manual determination (e.g., by a user representing the WSM based on whether the WS is appropriate for the WSM). In step 435, the routine determines whether the registration was accepted, and if not continues to step 440 to generate a registration denial message for the user. If it was instead determined in step 435 that the registration was accepted, the routine continues instead to step 445 to assign a unique item ID to the WS for use by the WSM system in tracking various information related to the WS. The routine then continues to step 450 to optionally receive one or more of various types of additional information related to the WS, such as any use throttling conditions (e.g., limits on how many invocation requests to allow for the service), availability conditions (e.g., times at which the WS is not available or other conditions under which the WS is available or not available), notification conditions related to the WS, etc. The routine then continues to step 455 to store the various received information related to the WS in one or more databases as appropriate, and then makes the registered WS available to potential consumers in accordance with any availability conditions. In step 460, the routine then generates a registration acceptance message for the user.

After steps 440 or 460, the routine continues to step 465 to send the generated message to the user, and optionally provides additional information related to the registration (e.g., the assigned item ID). In step 470, the routine then determines whether to register more WSes for this user, and if so returns to step 425. If not, the routine continues to step 495 to determine whether to continue. If so, or if it was instead determined in step 420 that the WS provider registration was not successful, the routine returns to step 405. If the routine instead determines not to continue, the routine continues to step 499 and ends. While not illustrated here, in some embodiments the routine could additionally use various security information and/or mechanisms, such as to ensure that only authorized users can register new WSes. In addition, as previously described, in some embodiments the routine may be provided as part of a user's interaction with a Web site or other interactive interface, while in other embodiments the routine may be performed as part of a programmatically accessed API. Moreover, in some embodiments this or a related routine may further be used to modify information about a previously registered WS, such as to treat the modified registered WS as a new WS (e.g., with a new associated item ID) or instead as a new version of the same WS.

Figure 5:
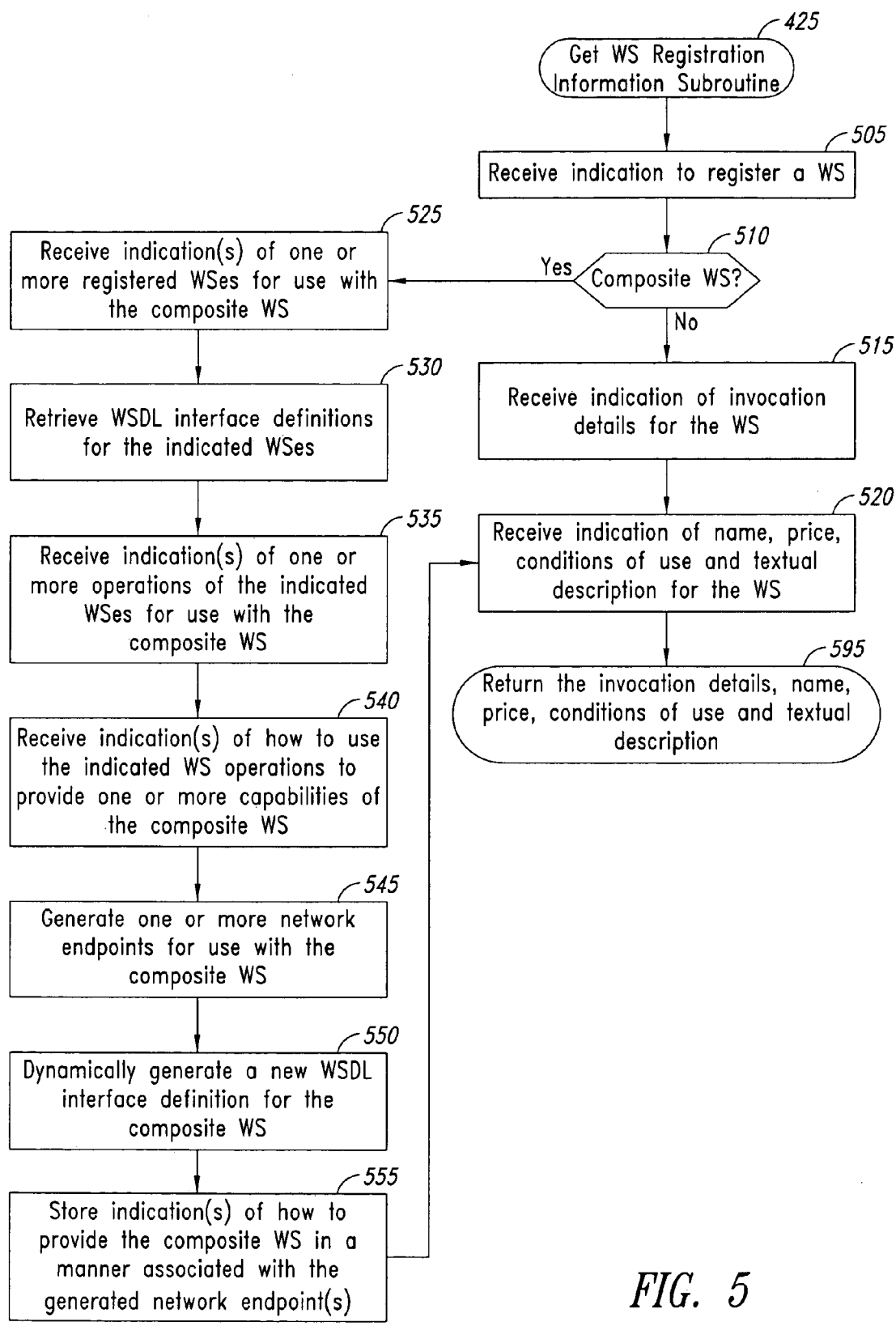
FIG. 5 is a flow diagram of an embodiment of a Get WS Registration Information subroutine.

FIG. 5 is a flow diagram of an embodiment of a Get WS Registration Information subroutine 425. The subroutine may, for example, be provided by an embodiment of the WSM and/or of the software facility. The subroutine obtains information from a user related to a WS to be registered, whether for a composite WS or a non-composite WS, and returns that information. When a composite WS is to be registered, the subroutine further performs additional operations, such as to dynamically generate WSDL or other interface definition information for the composite WS, and optionally to generate one or more new network endpoints for use with the composite WS.

The subroutine begins at step 505, where an indication is received from a user to register a WS. It is then determined in step 510 whether the registration is for a composite WS, and if not the subroutine continues to step 515 to obtain invocation details for the WS being registered (e.g., as part of a WSDL interface description for the WS), such as from information received in step 505 or instead interactively from the user, and stores the invocation details for later use (e.g., use by the WSM system in invoking the WS and/or to be provided to WS consumers for use by them in requesting invocations of the WS). In step 520, various other information corresponding to the WS being registered is also obtained (whether interactively from the user or from information received in step 505), such as a name, one or more use prices, a description for use by potential consumers, other non-price use conditions, etc.

If it was instead determined in step 510 that the WS to be registered is a composite WS, the subroutine proceeds in the illustrated embodiment to interactively gather composite service provision information from the user for the composite WS, although in other embodiments such information may be gathered in other ways (e.g., by being received in step 505). In particular, the subroutine continues to step 525 to obtain indications from the user of one or more registered WSes for use as constituent WSes with the composite WS (e.g., selections by the user in response to information presented or otherwise provided to the user regarding possible constituent WSes, not shown, and/or indications by the user of non-registered WSes, such as other WSes available from the user or affiliated entities). In step 530, the subroutine then retrieves WSDL interface definitions for the indicated WSes, although in other embodiments other types of interface definitions may instead be used. In step 535, the subroutine then receives indications from the user of one or more operations of the indicated WSes to be used in providing capabilities of the composite WS being created (e.g., selections by the user in response to information provided to the user regarding the indicated WSes' operations from the retrieved WSDL interface definitions, not shown).

The subroutine then continues to step 540 to obtain one or more indications of how to use the indicated WS operations to provide one or more capabilities of the composite WS. Such information may be specified in various ways in various embodiments, such as by obtaining executable instructions from the user that use that indicated WS operations (e.g., based on a scripting logic, an executable applet or other piece of code, etc.) and/or by receiving selections from the user of inter-operation relationship options provided to the user by the subroutine (not shown). As one example, the received information may specify one or more operations of the composite WS that are to be provided by using one or more of the indicated operations in a specified manner. Moreover, while not illustrated here, in some embodiments the subroutine may further perform automated processing to facilitate identification of possible inter-operation relationships (e.g., by automatically identifying output parameters of operations that are available to be used as input parameters of other operations) or other options for using the indicated WS operations in various ways, and may provide that automatically identified information to the user (e.g., as defaults or as suggestions).

The subroutine in the illustrated embodiment then continues to step 545 to generate one or more network endpoints for use with the composite WS, although in other embodiments one or more network endpoints for the composite WS may be determined in other manners (e.g., by using a previously defined network endpoint in a shared manner by multiple WSes, or by obtaining indications of one or more network endpoints from the user, such as network endpoints provided by the user). In step 550, the subroutine then dynamically generates a new WSDL interface definition for the composite WS, such as based on the retrieved WSDL interface definitions corresponding to the indicated operations of the indicated WSes and based on any received information related to operations or other interface information for the composite WS. The subroutine then stores composite service provision information in step 555 for later use in providing the composite WS when invoked.

After step 555, the subroutine continues to step 520 to obtain the various other information corresponding to the WS being registered. While not illustrated here, in some embodiments the subroutine may further provide various automated processing to facilitate identification of at least some such other information in various ways (e.g., by generating a suggested use price for the composite WS by combining use price information for identified WSes and WS operations to be used, and/or by similarly combining various other types of information for the constituent WSes to generate corresponding aggregate information for the composite WS), and may provide that automatically identified information to the user (e.g., as defaults or as suggestions).

After step 520, the subroutine continues to step 595 to return the various information obtained in step 520, as well as optionally to return various other information for the WS being registered (e.g., invocation details for the WS). While not illustrated here, a variety of other types of additional functionality may further be provided in other embodiments, such as to allow the user to interactively debug a new composite WS that has been created, to automatically validate information provided by the user for the new composite WS (e.g., to verify that inter-operation relationships are proper and/or that the indicated composite WS does not actually or potentially violate any use conditions specified for the constituent WSes and/or the WSM), etc.

As with the WS registration routine, the illustrated subroutine can be provided in various ways in various embodiments, including as part of an interactive Web site with which a user interacts and/or as part of a programmatically accessed API. In addition, while not illustrated here, in some embodiments various security information and/or mechanisms may be used, such as to ensure that only authorized users are allowed to perform some or all of the indicated types of activities.

Figure 6A:
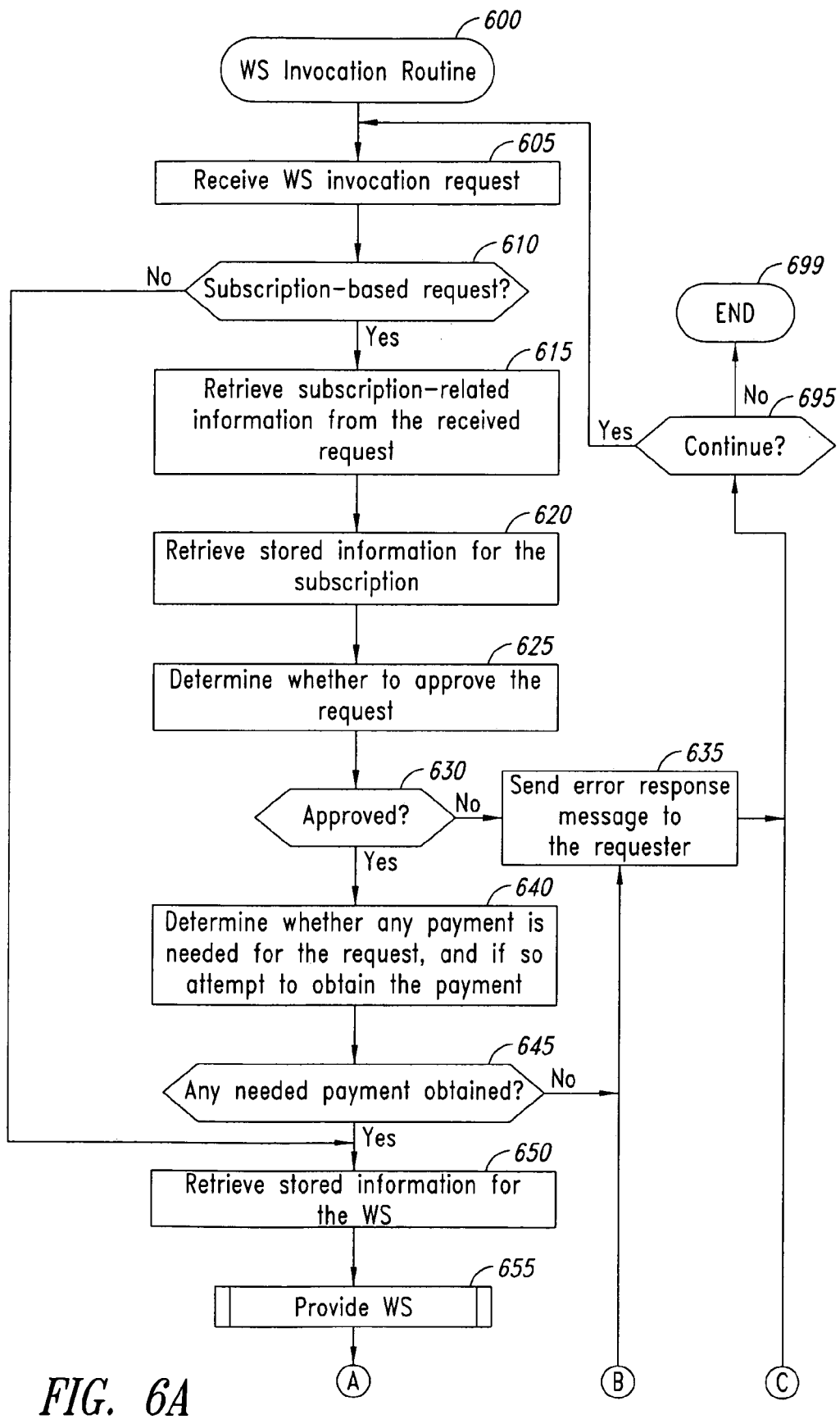
FIG. 6 is a flow diagram of an embodiment of a WS Invocation routine.
Figure 6B:
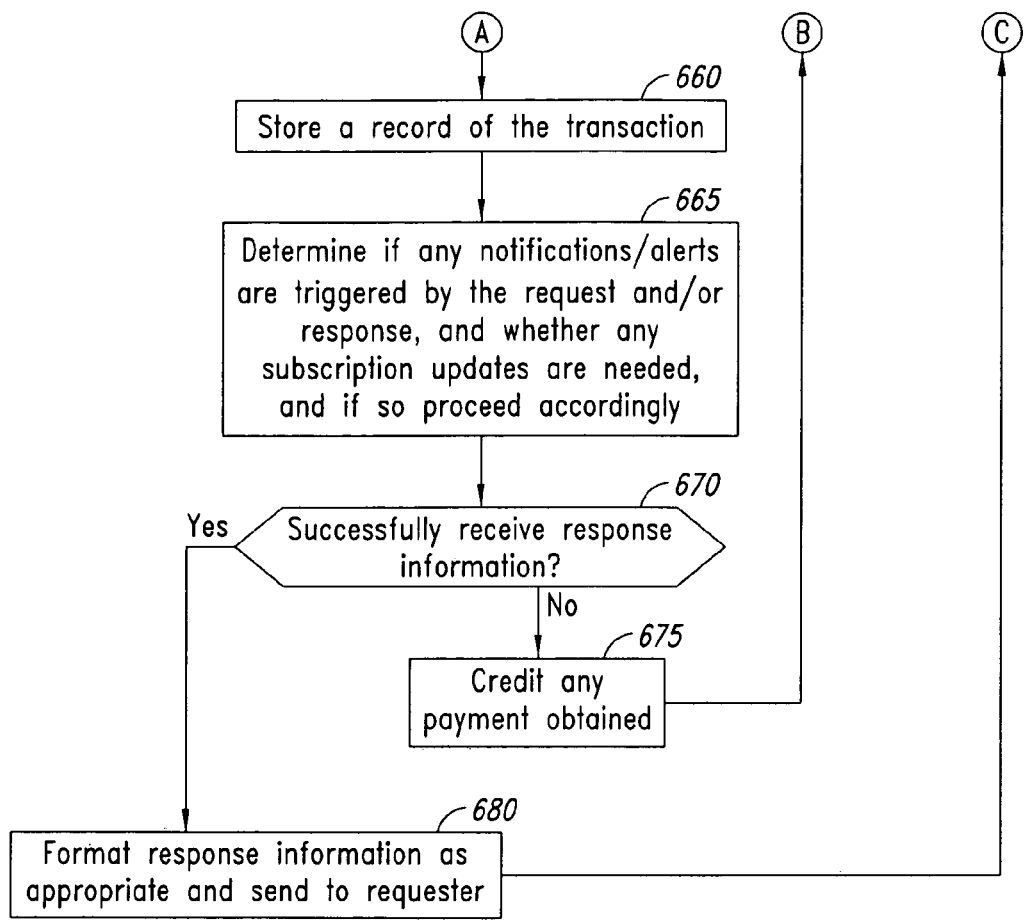

FIG. 6 is a flow diagram of an embodiment of a WS Invocation routine 600. The routine may, for example, be provided by an embodiment of the WSM and/or of the software facility. The routine receives access requests for WSes from consumers, and responds by providing access to the WSes via invocations of the WSes on behalf of the consumers when appropriate. In some embodiments, the invocation requests are received via one or more network endpoints or other access mechanisms that each correspond to multiple WSes, while in other embodiments multiple network endpoints may each be associated with a single WS and invocation requests received via those endpoints may each be provided to one or more instances of the routine (e.g., one instance for each network endpoint).

The illustrated routine begins at step 605 where a WS access request is received, such as based on a previously created subscription for a composite WS or for a non-composite WS. The routine continues to step 610 to determine whether the access request is a subscription-based request (e.g., based on whether a subscription ID is received as part of the request) or instead if an indication is received that the access request is for immediate invocation without a subscription.

If it is determined in step 610 that the WS invocation request is a subscription-based request, the routine continues to step 615 to retrieve subscription-related information from the received request, such as an indication of the subscription ID for the subscription and of the identity of the WS consumer. In step 620, the routine then retrieves stored information for the subscription, and in step 625 determines whether to approve the request, such as based on whether the subscription is valid, whether any current subscription-based throttling conditions and/or WS-based throttling conditions are satisfied, whether the requesting user is authorized to use the subscription in the requested manner (e.g., is an authorized affiliate for the subscription), etc. If it is determined in step 630 that the request is not approved, the routine continues to step 635 to send an error response message to the requester and to store information about the error. Otherwise, or if it is instead determined in step 610 that the received request was not a subscription-based request, the routine continues to step 640 to determine whether any payment is needed for the request, and if so to attempt to obtain the payment (e.g., for purchased subscriptions in which an additional per-access charge applies, or for subscriptions that a WS consumer has established such that affiliates or end users using the subscription provide their own payment for their use). As discussed elsewhere, payment can be obtained in various ways in various embodiments, including by dynamically purchasing a subscription or other access (e.g., as a credit card transaction), via use of previously acquired WSM points, etc. If it is determined in step 645 that needed payment is not obtained, the routine continues to step 635.

If it is instead determined in step 645 that any needed payment is obtained, the routine continues instead to step 650 to retrieve stored information for the WS that includes information about how to invoke the WS, such as a WSDL or other interface definition. The routine then continues to step 655 to execute a subroutine to provide the WS in an appropriate manner as discussed in greater detail with respect to FIG. 7, such as to use retrieved WS invocation information for a non-composite WS from a WS provider to invoke the WS from the WS provider as necessary to obtain response information. In addition, in some embodiments step 655 may be performed regardless of the validation actions in step 625 as to whether to approve the request and in step 645 whether any needed payment was obtained, such as to perform step 655 in parallel with such validation steps and to handle any failure of those steps by not providing to the requester any response information and/or other benefits resulting from the WS invocation. After step 655, the routine continues to step 660 to store a record of the WS access transaction.

In step 665, the routine then determines if any notification conditions have been triggered by the request and/or response, as well as whether any other subscription updates are needed (e.g., to update a subscription after the last authorized use has been made so that any next attempt to use a subscription would fail), and if so the routine proceeds accordingly to provide such notifications and/or perform such subscription updates. After step 665, the routine continues to step 670 to determine whether response information was successfully received from the providing of the WS service in step 655, and if not continues to 675 to credit any payment obtained in step 640 before continuing to step 635 (in other embodiments, payment may not be obtained until after successful invocation to prevent such payment credits, or instead payment may be retained even if the invocation fails). If it is determined in step 670 that response information was successfully received, the routine continues to step 680 to format the response information as appropriate for the requester (e.g., based on previously specified preferences), and then sends the formatted response information to the requester. After steps 635 or 680, the routine continues to step 695 to determine whether to continue. If so, the routine returns to step 605, and if not the routine continues to step 699 and ends.

As with the registration and subscription routines, the WS Invocation routine can be performed in various ways in various embodiments, such as part of an interactive Web site in response to an explicit user request or instead as part of a programmatically accessed API. In addition, in some embodiments various security information and/or mechanisms may be employed, such as to ensure that only authorized WS consumers are able to invoke WSes and that any WS to be invoked is from an authorized WS provider. In addition, in some embodiments the information provided to a WS consumer about how to request a WS invocation and any invocation response information returned to the WS consumer is formatted in such a way as to obfuscate or mask various types of information, such as the details about how to perform the actual invocation request to the WS provider and/or identity or other information about the WS provider in this way, the WSM system is able to ensure that any invocation request to WS providers come from the WSM system and are thus authorized. Alternatively, in other embodiments, the WSM system may not serve as an intermediary for the invocation of some or all WSes, such as by providing to WS consumers the details about how to directly interact with a WS provider to invoke a subscribed-to or otherwise access-approved WS. For example, in some embodiments, when a WS consumer has purchased or otherwise acquired access to a WS, the WSM system could provide access authorization information to the consumer to allow the consumer to obtain access to the WS directly from the provider of the WS, such as details about how to access the WS and/or a token or other indication that the WS provider can identify (and optionally verify) as having being supplied by the WSM system when the provider receives the information from the WS consumer (e.g., a digital signature; information indicating vending payment to the WSM, such as transferable WSM points that can be used by the WS provider to receive compensation from the WSM system; etc.).

Figure 7:
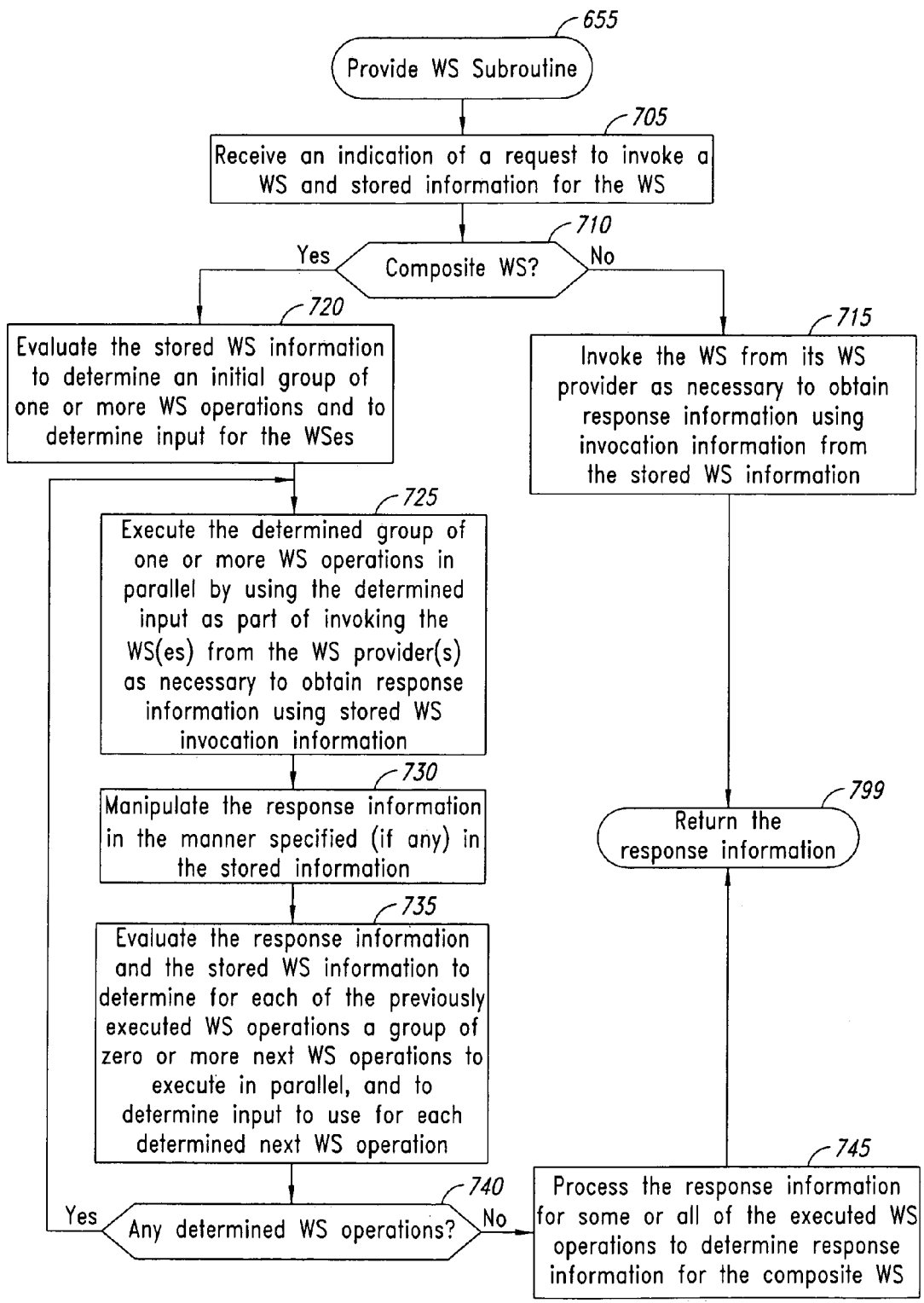
FIG. 7 is a flow diagram of an embodiment of a Provide WS subroutine.

FIG. 7 is a flow diagram of an embodiment of a Provide WS subroutine 655. The subroutine may, for example, be provided by an embodiment of the WSM and/or of the software facility, such as to act as an intermediary when invoking one or more WSes from one or more WS providers on behalf of a WS consumer. In particular, the subroutine provides an indicated WS to a WS consumer, whether for a composite WS or a non-composite WS, by obtaining and returning response information for the WS. When a non-composite WS is to be provided, the subroutine invokes that WS from the provider of that WS in an appropriate manner. When a composite WS is to be provided, the subroutine further performs additional operations, such as to coordinate the invocation of one or more constituent WSes in a manner specified in composite service provision information for the composite WS. While not illustrated here, in some embodiments information from prior WS invocations may be stored in a cache or other storage mechanism, and such cached/stored information may be considered for use rather than invoking a non-composite WS and/or a constituent WS from a corresponding WS provider.

The subroutine begins at step 705, where one or more indications are received of a request to invoke or otherwise provide a specified WS and of stored information for the specified WS, although in other embodiments the subroutine could instead retrieve stored information for a specified WS as needed. The subroutine then continues to step 710 to determine whether the specified WS is a composite WS, and if not continues to step 715 to invoke the specified WS from its WS provider using WS invocation information received in step 705, and then obtains response information from the invocation. The subroutine then continues to step 799 and returns the response information.

If it is instead determined in step 710 that the specified WS is a composite WS, the subroutine continues instead to step 720 to evaluate composite service provision information received in step 705 for the composite WS in order to determine an initial group of one or more operations of constituent WSes that are to be executed and to determine input (if any) for use in executing those operations (e.g., based on information received in step 705 from the WS consumer who requested the invocation of the composite WS). The determining of the constituent WS operations and/or input may further in some situations involve executing conditional logic and/or manipulating received input data in various ways. Moreover, in some embodiments other types of capabilities may be executed or otherwise accessed (e.g., various types of capabilities provided by the WSM), including by identifying other types of accessible services to be invoked.

The subroutine then continues to step 725 to execute the determined group of constituent WS operations in parallel using the determined input by invoking the constituent WSes from their providers, and obtains response information from the operations—in other embodiments, the execution of the determined constituent WS operations may instead be performed in other manners, such as in a serial but asynchronous manner such that execution of a second operation may be initiated before completion of execution of a first operation. In step 730, the subroutine then optionally manipulates the received response information in a manner (if any) specified in the composite service provision information, such as to assist in providing input for a next group of one or more constituent WS operations to be executed. In step 735, the manipulated response information and the composite service provision information is then evaluated to determine the next group of one or more constituent WS operations to be executed and to determine input (if any) for use in executing those operations. If it is determined in step 740 that any next constituent WS operations are determined, the subroutine returns to step 725 to continue the execution of those operations.

Otherwise, the subroutine continues to step 745 to generate response information for the composite WS by processing response information received for some or all of the executed constituent WS operations in a manner specified in the composite service provision information, such to as aggregate response information from the invocation of multiple constituent WSes in various ways and/or to select response information from one or more such constituent WSes. The subroutine then continues to step 799 to return the generated response information.

As discussed above, composite services may be dynamically created and used in various ways. In addition, in some embodiments a variety of additional types of functionality may be provided. For example, as discussed above, in some embodiments the WSM provides a variety of types of functionality related to registered WSes, such as to allow potential consumers to obtain (e.g., based on a search) and review detailed information about such WSes, to allow users to provide reviews for such WSes, to generate recommendations for such WSes and/or to include such WSes as recommendations, etc. In at least some such embodiments, each composite WS is treated in the same manner as other non-composite WSes, such as to allow the various types of functionality to similarly be provided for composite WSes.

In addition, as noted above, in some embodiments the WSM and/or software facility may act as an intermediary when invoking one or more WSes from one or more WS providers on behalf of a WS consumer, such as one or more constituent WSes of a composite WS, although in other embodiments a composite WS may be invoked in other manners (e.g., by providing composite service provision information for a composite WS to a WS consumer for execution or other evaluation by the consumer, or instead via a third-party that provides the composite WS execution, such as a WS provider for a fee). In some embodiments, various of the constituent WSes of a composite WS may differ in various ways, such as by using different types of communication protocols (e.g., HTTP-based versus SOAP-based) and/or by using different types of interaction or communication models, such as request-response versus publish-subscribe ("pub-sub"), object-based versus procedure-based, synchronous versus asynchronous, etc. In at least some such embodiments, the WSM and/or software facility intermediary may further operate to accommodate such differences by using different communication and interaction techniques with different constituent WSes, such as by using different communication protocols, and by caching response information from one constituent WS until another constituent WS is ready for the information.

In addition, in some embodiments the WSM and/or software facility provides various functionality to support different versions of WSes, whether for non-composite WSes and/or for composite WSes. For example, a WS provider who has registered a WS that they provide may decide to modify the WS, such as to modify the invocation details (e.g., the interface definition) and/or to modify associated information for the WS (e.g., a use price or use conditions) if so, the modified WS may in some situations replace the prior WS (e.g., if the WS provider no longer supports the invocation details of the original version of the WS), while in other embodiments both versions may be provided for at least a specified period of time. In situations where a WS has been modified (or removed or otherwise suspended from use), WS consumers who use that WS (e.g., WS consumers with subscriptions to that WS) may be notified of the modification in various ways, such as to provide the opportunity to alter their use of the WS if appropriate—this can be particularly important in situations in which the original WS is no longer being offered (e.g., if the prior invocation details used by the WS consumer will no longer work, or if the prior types of use by the WS consumer would no longer be allowed under new use conditions).

In a similar manner, in some embodiments composite WSes may be modified by the creator of the composite WS (or other users provided such modification access rights), with the modified version of the composite WS replacing or supplementing the prior version of the composite WS. Moreover, composite WSes may in some embodiments be modified in other circumstances, such as when a constituent WS of the composite WS has been modified. In some embodiments, a creator of such a composite WS may be automatically notified of the modification of the constituent WS, such as to allow the creator to modify the composite WS accordingly if appropriate. Alternatively, in some embodiments at least some such constituent WS modifications may automatically be incorporated in the composite WS, such as to automatically change how the composite WS invokes the constituent WS to reflect modified invocation details, to automatically update a use price for the composite WS based on changes to a use price of the constituent WS, etc. In addition, in situations in which a constituent WS has been modified (e.g., when a use price has increased or use conditions have become more restrictive) and/or removed, the software facility may further attempt to automatically identify potential alternative or replacement constituent WSes (e.g., based on similarities in types of capabilities provided, such as by belonging to a shared category), such as to notify the composite WS creator and/or to automatically suggest or make changes to the composite WS to use an alternative or replacement WS. Moreover, in situations in which only internal aspects of a composite WS have changed (e.g., for changes made without changing the input or output data for the composite WS or changing associated information such as use price or use conditions, such as changes involving scripting logic used as part of the composite service provision information, or such as replacing one or more constituent WSes with one or more other constituent WSes that provide equivalent aggregate functionality), however, the modified composite WS may not in some embodiments be treated as a new version, such as if the changes have no affect on WS consumers that use the composite WS.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for assisting users in generating new invocable composite network services that are based on multiple other invocable constituent network services, the computer-implemented method comprising:

provining a group of defined representation types for use in describing input and output parameters of network services, each of the defined representation types indicating a data type and corresponding to a distinct type of information;

for each input and output parameter of a plurality of registered network services, associating one of the defined representation types with the parameter so as to indicate that values of that parameter are of the indicated data type for that one defined representation type and represent the type of information to which that one defined representation type corresponds, each of the registered network services being provided by a provider and having been registered as being available for use by others based on information received from a representative of the provider; and for each of multiple new invocable composite network services, creating the new composite network service by,
receiving one or more indications from a user of multiple of the registered network services to be used as constituent network services for the new composite network service;
automatically determining suggested inter-relationships between multiple of the indicated network services when used as the constituent network services of the new composite network service, the automatic determining being based at least in part on matching the defined representation types associated with input and output parameters of the indicated network services and being performed by one or more programmed computing systems;
determining additional information to use in providing the new composite network service to others, the additional information including one or more determined use prices for use of the new composite network service, one or more determined use conditions to restrict use of the new composite network service, and one or more determined interface descriptions that each specify one or more input and output parameters for use in accessing the new composite network service; and
registering the new composite network service as being available for use by others based on the determined additional information and the determined suggested inter-relationships, such that providing the new composite network service to another user will be performed in a manner that reflects the determined additional information and that includes automatically invoking the multiple indicated network services in accordance with determined inter-relationships that are based at least in part on the determined suggested inter-relationships.

2. The method of claim 1 wherein the registering of the new composite network services as being available for use by others includes making the new composite network services available to customers of an electronic marketplace, wherein the one or more programmed computing systems are associated with the electronic marketplace, and wherein the method further comprises, after receiving a request from one of the customers to provide one of the new composite network services,
determining that payment is available for at least one of the determined use prices for the one composite network service and that at least one of the determined use conditions for the one composite network service have been satisfied; and
invoking the constituent network services for the one composite network service in accordance with the determined inter-relationships for the one composite network service, the invoking including using one or more input values received in the request for one or more input parameters specified in one of the determined interface descriptions for the one composite network service.

3. The method of claim 2 wherein the determined additional information to use in providing the one composite network service to others includes indicated processing to be performed to generate response information for the one composite network service, and wherein the method further comprises:
receiving response information from the invoking of the constituent network services for the one composite network service;
performing the processing on the received response information to generate the response information for the one composite network service; and
providing the generated response information to the customer.

4. The method of claim 1 wherein, for each of at least some of the plurality of registered network services, each associating of a defined representation type with an input or output parameter of that network service is based at least in part on an indication of that defined representation type included in the information received from the representative of the provider of that network service while that representative is registering that network service.

5. The method of claim 4 wherein, for each of the at least some plurality of registered network services, the information received from the representative of the provider of that network service while that representative is registering that network service includes at least one specified use price for use of that network service by others and at least one specified use condition that restricts use of that network service by others.

6. The method of claim 5 wherein the determining of the additional information to use in providing each of at least some of the new composite network services to others includes automatically determining one or more suggested use prices for the composite network service that are based at least in part on specified use prices for the constituent network services of the composite network service, and automatically determining one or more suggested use conditions for the composite network service that are based at least in part on specified use conditions for the constituent network services of the composite network service.

7. The method of claim 6 wherein, for each of the at least some new composite network services, the one or more determined use prices for the composite network service are the automatically determined suggested use prices for the composite network service, and the one or more determined use conditions for the composite network service are the automatically determined suggested use conditions for the composite network service.

8. The method of claim 6 further comprising, for each of the at least some new composite network services, providing indications to the user who indicated the constituent network services for that composite network service, the indications including the automatically determined suggested use prices for that composite network service and the automatically determined suggested use conditions for that composite network service, and wherein the one or more determined use prices for that composite network service and the one or more determined use conditions for that composite network service are based on indications received from the user after the providing of the indications.

9. The method of claim 1 wherein, for each of at least some of the new composite network services, the creating of the composite network service includes providing information to the user who indicated the constituent network services for the composite network service, the provided information including one or more indications of the automatically determined suggested inter-relationships between those constituent network services, and receiving from the user one or more indications of the determined inter-relationships between those constituent network services for use in providing the composite network service, the indicated determined inter-relationships being based at least in part on the automatically determined suggested inter-relationships.

10. The method of claim 9 wherein the determined inter-relationships between constituent network services of a composite network service include one or more mappings that are each from an output parameter of one of the constituent network services to an input parameter of another of the constituent network services.

11. The method of claim 1 wherein, for each of at least some of the new composite network services, the automatic determining of the suggested inter-relationships between the constituent network services for the composite network service is further based at least in part on prior actions of users when creating other composite network services that use at least some of the constituent network services.

12. The method of claim 1 wherein, for each of at least some of the new composite network services, the creating of the composite network service includes performing iterative interactions with a user to identify the one or more determined use prices for the composite network service, the one or more determined use conditions for the composite network service, the one or more determined interface descriptions for the composite network service, and the determined inter-relationships between the constituent network services of the composite network service that are based at least in part on the automatically determined suggested inter-relationships for the composite network service.

13. The method of claim 1 wherein, for each of at least some of the input and output parameters of the plurality of registered network services, the associating of one of the defined representation types with the parameter is based at least in part on prior actions of users involving associating the one defined representation type with parameters of other registered network services.

14. The method of claim 1 wherein, for each of at least some of the input and output parameters of the plurality of registered network services, the associating of one of the defined representation types with the parameter is performed automatically based at least in part on received information related to the parameter.

15. The method of claim 14 wherein the automatic associating of one of the defined representation types with a parameter of a network service is performed as part of registering the network service.

16. The method of claim 14 wherein the received information related to a parameter of a registered network service that is used to automatically associate one of the defined representation types with the parameter includes an interface description for the network service that identifies the one or more input and output parameters for use in accessing the network service.

17. The method of claim 16 wherein the network service is a Web service, and wherein the interface description for the network service is a Web Services Description Language ("WSDL") document.

18. The method of claim 14 wherein the received information related to a parameter of a registered network service that is used to automatically associate one of the defined representation types with the parameter includes a data type of the parameter and a name of the parameter.

19. The method of claim 1 wherein, for each of at least some of the new composite network services, the multiple registered network services indicated by a user to be used as constituent network services for the composite network service are identified from search results provided to the user, the search results being based on search criteria provided by the user regarding network services of interest.

20. The method of claim 19 wherein the search criteria provided by a user include one or more defined representation types that are associated with one or more parameters of the network services of interest.

21. The method of claim 1 wherein, for each of at least some of the new composite network services, the multiple registered network services indicated by a user to be used as constituent network services for the composite network service are identified based at least in part on prior actions of users when creating other composite network services that use at least some of the constituent network services.

22. The method of claim 1 wherein the plurality of registered network services are registered at an electronic marketplace as being available for use by customers of the electronic marketplace, and wherein the registering of the new composite network services as being available for use by others includes making the registered new composite network services available to customers of the electronic marketplace.

23. The method of claim 1 wherein the registering of the new composite network services as being available for use by others includes making the registered new composite network services available to customers of a first electronic marketplace, and wherein, for each of at least some of the new composite network services, at least one of the multiple registered network services indicated by a user to be used as constituent network services for the composite network service is registered at another electronic marketplace that is unaffiliated with the first electronic marketplace.

24. The method of claim 1 further comprising registering each of multiple network services as being available for use by others based on information received from a representative of a provider of the network service, the registering including receiving an indication from the representative that a parameter of the network service has values that represent a type of information distinct from the types of information to which the provided group of defined representation types correspond, defining a new representation type for the provided group that corresponds to the distinct type of information, and associating the new defined representation type with the parameter.

25. The method of claim 1 wherein the method is performed by the one or more programmed computing systems on behalf of an organization, and wherein at least some of the defined representation types of the group are provided by the organization before the registering of network services of others.

26. The method of claim 1 wherein, for each of at least some of the new composite network services, the automatic invoking of the multiple indicated network services for the composite network service includes obtaining one or more output values from an output parameter of one of the indicated network services using a first protocol that is based on the one indicated network service and automatically supplying each of the obtained output values as an input value to an input parameter of another of the indicated network services using a distinct second protocol that is based on the another indicated network service.

27. The method of claim 1 wherein, for each of at least some of the new composite network services, the automatic invoking of the multiple indicated network services for the composite network service includes obtaining one or more output values from an output parameter of one of the indicated network services and automatically modifying each of the obtained output values before supplying the modified value as an input value to an input parameter of another of the indicated network services, the automatic modifying based at least in part on a type of value used by the input parameter.

28. The method of claim 1 wherein, for each of at least some of the new composite network services, the determining of an interface description that specifies one or more input and output parameters for use in accessing the new composite network service is dynamically performed based at least in part on receiving one or more indications from a user of one or more input parameters for the composite network service that are distinct from the input parameters for the constituent network services of the composite network service, the input and output parameters specified by the determined interface description including the indicated input parameters.

29. The method of claim 28 further comprising, after receiving the one or more indications from a user of the one or more input parameters for a composite network service, determining an association between each of the indicated input parameters and one or more of the input parameters of the constituent network services for the composite network service such that a value received for one of the indicated input parameters will be used to provide input to the one or more associated input parameters of those constituent network services.

30. The method of claim 29 wherein, for each of at least some of the new composite network services, the determining of the association between the indicated input parameters and the input parameters of the constituent network services for the composite network service is performed in such a manner that at least one of the input parameters of a constituent network service does not have any associated other parameters from which to receive values for use as input to that constituent network service.

31. The method of claim 30 further comprising, for each of the at least one constituent network service input parameters that does not have any associated other parameters, receiving one or more indications from a user of information to be used as an input value for that constituent network service input parameter.

32. The method of claim 28 wherein the receiving of the indications from a user of the one or more distinct input parameters for each of at least some of the composite network services includes receiving indications of names for the one or more input parameters that are distinct from names of the input parameters for the constituent network services of the composite network service.

33. The method of claim 28 wherein the receiving of the indications from a user of the one or more distinct input parameters for each of at least some of the composite network services that are distinct from the input parameters for the constituent network services of the composite network service is performed to obfuscate one or more of the constituent network services from others who use the composite network service.

34. The method of claim 1 wherein the method is performed by the one or more programmed computing systems on behalf of an organization in such a manner that the registered new composite network services are available from the organization for use by others, and wherein, for each of at least some of the new composite network services, the one or more input and output parameters of each of the one or more determined interface descriptions for the composite network service include at least one input parameter that is automatically added on behalf of the organization for use by the organization in providing the composite network service.

35. The method of claim 34 wherein the method is performed by the one or more programmed computing systems on behalf of an organization in such a manner that the registered new composite network services are available from the organization for use by others, and wherein, for each of at least some of the new composite network services, the one or more input and output parameters of each of the one or more determined interface descriptions for the composite network service include at least one output parameter that is automatically added on behalf of the organization for use by the organization in providing the composite network service.

36. The method of claim 1 wherein, for each of at least some of the new composite network services, the additional information determined to use in providing the composite network service to others includes information provided by a user for use in generating response information for the composite network service.

37. The method of claim 36 wherein the provided information for each of at least some of the composite network services includes indications of processing to be performed on information received from invoking one or more of the constituent network services of the composite network service in order to generate the response information for the composite network service.

38. The method of claim 36 wherein the provided information for each of at least some of the composite network services includes an eXtensible Stylesheet Language Transformations ("XSLT") document for use in generating the response information for the composite network service.

39. The method of claim 1 wherein, for each of at least some of the new composite network services, the registering of the composite network service as being available for use by others includes automatically providing multiple distinct interfaces for use by others in accessing the composite network service.

40. The method of claim 39 wherein, for each of the at least some composite network services, the multiple distinct interfaces are based on use of multiple distinct communication protocols.

41. The method of claim 40 wherein the multiple distinct interfaces include at least one interface that uses Simple Object Access Protocol ("SOAP") messages for information being exchanged and at least one interface that uses documents for information being exchanged that are based on eXtensible Markup Language ("XML") and that are sent using HyperText Transport Protocol ("HTTP").

42. The method of claim 39 wherein, for each of the at least some composite network services, the multiple distinct interfaces are based on use of multiple distinct input data formats.

43. The method of claim 1 wherein, for each of at least some of the new composite network services registered as being available for use by others, the one or more determined use conditions for the new composite network service include one or more indications of access rights that restrict the others to whom the new composite network service is available.

44. The method of claim 1 wherein, for each of at least some of the new composite network services registered as being available for use by others, the one or more determined use conditions for the new composite network service include one or more indications of access quotas that restrict availability of the composite network service.

45. The method of claim 1 wherein, for each of at least some of the new composite network services, the determined additional information to use in providing the composite network service to others includes logic specified by a user for use during the providing of the composite network service, such that the specified logic when executed dynamically selects one or more constituent network services to be invoked in a specified order for operation of the composite network service.

46. The method of claim 45 wherein the specified logic for each of one or more of the at least some composite network services includes an eXtensible Stylesheet Language Transformations ("XSLT") document.

47. The method of claim 45 wherein the specified logic for each of one or more of the at least some composite network services includes an eXtensible Markup Language ("XML") document.

48. The method of claim 45 wherein executing of the specified logic for each of one or more of the at least some composite network services includes using XML Path Language ("XPath").

49. The method of claim 1 wherein, for each of at least some of the new composite network services, the multiple registered network services indicated to be used as constituent network services for the composite network service are provided by multiple distinct providers.

50. The method of claim 1 wherein, for each of at least some of the new composite network services, the multiple registered network services indicated by a user to be used as constituent network services for the composite network service are provided by one or more providers unaffiliated with the user.

51. The method of claim 1 wherein the method is performed by the one or more programmed computing systems on behalf of an organization, and wherein, for each of at least some of the new composite network services, the composite network service is a new dynamically created Web service that is available to be invoked by others from a computer of the organization.

52. The method of claim 1 wherein, for each of at least some of the new composite network services, the multiple registered network services indicated to be used as constituent network services for the new composite network service include at least one other composite network service previously created by another user.

53. A computer-readable medium whose contents configure a computing device to assist users in generating new invocable composite network services that are based on multiple other invocable constituent network services, by performing a method comprising:
   providing a group of defined representation types for use in describing input and output parameters of network services, each of the defined representation types indicating a data type for a type of information;
   for each of multiple input and output parameters of a plurality of registered network services, associating one of the defined representation types with the parameter to indicate that values of that parameter are of the indicated data type for that one defined representation type, each of the registered network services being provided by a provider and having been registered as being available for use by others; and
   for each of multiple new invocable composite network services, creating the new composite network service by,
      receiving one or more indications from a user of multiple of the registered network services to be used as constituent network services for the new composite network service;
      automatically determining suggested inter-relationships between multiple of the indicated network services as the constituent network services of the new composite network service, the determining being based at least in part on matching the defined representation types associated with input and output parameters of the indicated network services;
      determining additional information to use in providing the new composite network service to others, the additional information including one or more determined use prices for use of the new composite network service, one or more determined use conditions to restrict use of the new composite network service, and one or more determined interface descriptions that each specify one or more input and output parameters for use in accessing the new composite network service; and
      registering the new composite network service as being available for use by others based on the determined additional information and the determined suggested inter-relationships, the registering enabling the new composite network service to be provided to another user based on the determined additional information, providing of the composite network service including automatically invoking the multiple indicated network services in accordance with determined inter-relationships that are based at least in part on the determined suggested inter-relationships.

54. The computer-readable medium of claim 53 wherein the registering of the new composite network services as being available for use by others includes making the new composite network services available to customers of an electronic marketplace, wherein the configured computing device is associated with the electronic marketplace, and wherein the method further comprises, after receiving a request from one of the customers to provide one of the new composite network services,
   determining that payment is available for at least one of the determined use prices for the one composite network service and that at least one of the determined use conditions for the one composite network service have been satisfied; and
   invoking the constituent network services for the one composite network service in accordance with the determined inter-relationships for the one composite network service, the invoking including using one or more input values received in the request for one or more input parameters specified in one of the determined interface descriptions for the one composite network service.

55. The computer-readable medium of claim 54 wherein the determined additional information to use in providing the one composite network service to others includes indicated processing to be performed to generate response information for the one composite network service, and wherein the method further comprises:
   receiving response information from the invoking of the constituent network services for the one composite network service;
   performing the processing on the received response information to generate the response information for the one composite network service; and
   providing the generated response information to the customer.

56. The computer-readable medium of claim 53 wherein, for each of at least some of the plurality of registered network services, each associating of a defined representation type with an input or output parameter of that network service is based at least in part on an indication of that defined representation type included in information received from a representative of the provider of that network service.

57. The computer-readable medium of claim 53 wherein the determining of the additional information to use in providing each of at least some of the new composite network services to others includes automatically determining one or more suggested use prices for the composite network service that are based at least in part on specified use prices for the constituent network services of the composite network service, and automatically determining one or more suggested use conditions for the composite network service that are based at least in part on specified use conditions for the constituent network services of the composite network service.

58. The computer-readable medium of claim 53 wherein, for each of at least some of the new composite network services, the creating of the composite network service includes providing information to the user who indicated the constituent network services for the composite network service, the provided information including one or more indications of the automatically determined suggested inter-relationships between those constituent network services, and receiving from the user one or more indications of the determined inter-relationships between those constituent network services for use in providing the composite network service, the indicated determined inter-relationships being based at least in part on the automatically determined suggested inter-relationships.

59. The computer-readable medium of claim 58 wherein the determined inter-relationships between constituent network services of a composite network service include one or more mappings that are each from an output parameter of one of the constituent network services to an input parameter of another of the constituent network services.

60. The computer-readable medium of claim 53 wherein, for each of at least some of the new composite network services, the creating of the composite network service includes performing iterative interactions with a user to identify the one or more determined use prices for the composite network service, the one or more determined use conditions for the composite network service, the one or more determined interface descriptions for the composite network service, and the determined inter-relationships between the constituent network services of the composite network service that are based at least in part on the automatically determined suggested inter-relationships for the composite network service.

61. The computer-readable medium of claim 53 wherein, for each of at least some of the multiple input and output parameters of the plurality of registered network services, the associating of one of the defined representation types with the parameter is performed automatically based at least in part on received information related to the parameter.

62. The computer-readable medium of claim 61 wherein the automatic associating of one of the defined representation types with a parameter of a network service is performed as part of registering the network service and includes using a received interface description for the network service that identifies input and output parameters for use in accessing the network service, wherein the network service is a Web service, and wherein the interface description for the network service is a Web Services Description Language ("WSDL") document.

63. The computer-readable medium of claim 53 wherein, for each of at least some of the new composite network services, the multiple registered network services indicated by a user to be used as constituent network services for the composite network service are identified from at least one of search results provided to the user that are based on search criteria provided by the user regarding network services of interest, and of prior actions of users when creating other composite network services that use at least some of the constituent network services.

64. The computer-readable medium of claim 53 further comprising registering each of multiple network services as being available for use by others based on information received from a representative of a provider of the network service, the registering including receiving an indication from the representative that a parameter of the network service has values that represent a type of information distinct from the types of information to which the provided group of defined representation types correspond, defining a new representation type for the provided group that corresponds to the distinct type of information, and associating the new defined representation type with the parameter.

65. The computer-readable medium of claim 53 wherein the method further comprises, for each of at least some of the new composite network services, dynamically determining an interface description that specifies one or more input and output parameters for use in accessing the new composite network service based at least in part on receiving one or more indications from a user of one or more input parameters for the composite network service that are distinct from the input parameters for the constituent network services of the composite network service, the input and output parameters specified by the determined interface description including the indicated input parameters.

66. The computer-readable medium of claim 53 wherein, for each of at least some of the new composite network services, the registering of the composite network service as being available for use by others includes automatically providing multiple distinct interfaces for use by others in accessing the composite network service.

67. The computer-readable medium of claim 53 wherein the computer-readable medium is a memory of the computing device that stores the contents, and wherein the contents are instructions that when executed program the computing device to perform the method.

68. A computing device configured to assist users in generating new invocable composite network services that are based on multiple other invocable constituent network services, comprising:
   one or more processors;
   a first component that is configured to, when executed by at least one of the one or more processors, create a new composite network service for a user by:
      providing a group of defined representation types for use in describing input and output parameters of network services, each of the defined representation types corresponding to a distinct type of information;
      for each of multiple input and output parameters of a plurality of registered network services, associating one of the defined representation types with the parameter to indicate that values of that parameter represent the type of information to which that one defined representation type corresponds, each of the registered network services being provided by a provider and having been registered as being available for use by others;
      receiving one or more indications from the user of multiple of the registered network services to be used as constituent network services for the new composite network service;
      automatically determining suggested inter-relationships between multiple of the indicated network services as the constituent network services of the new composite network service, the determining being based at least in part on matching the defined representation types associated with input and output parameters of the indicated network services;
      determining additional information to use in providing the new composite network service to others, the additional information including one or more determined use prices for use of the new composite network service, one or more determined use conditions to restrict use of the new composite network service, and one or more determined interface descriptions that each specify one or more input and output parameters for use in accessing the new composite network service; and registering the new composite network service as being available for use by others based on the determined additional information and the determined suggested inter-relationships, the registering enabling the new composite network service to be provided to another user based on the determined additional information, providing of the composite network service including automatically invoking the multiple indicated network services in accordance with determined inter-relationships that are based at least in part on the determined suggested inter-relationships.

69. The computing device of claim 68 further comprising a second component that is configured to, when executed by at least one of the one or more processors, and in response to a request from a second user for the created new composite network service, providing the created new composite network service to the second user by automatically invoking the multiple indicated network services that are the constituent network services for the created new composite network service on behalf of the second user, the invoking performed in accordance with the determined inter-relationships for the created new composite network service.

70. The computing device of claim 69 wherein the registering of the new composite network service as being available for use by others includes making the new composite network service available to customers of an electronic marketplace, wherein the computing device is associated with the electronic marketplace, wherein the second component is further configured to determine that payment is available from the second user for at least one of the determined use prices for the created composite network service and that at least one of the determined use conditions for the created composite network service have been satisfied for providing the created composite network service to the second user, and wherein the invoking of the multiple indicated network services that are the constituent network services for the created new composite network service on behalf of the second user includes using one or more input values received in a request from the second user for one or more input parameters specified in one of the determined interface descriptions for the created composite network service.

71. The computing device of claim 70 wherein the determined additional information to use in providing the created composite network service to others includes indicated processing to be performed to generate response information for the created composite network service, and wherein the invoking of the multiple indicated network services that are the constituent network services for the created new composite network service on behalf of the second user further includes:

receiving response information from the invoking of the constituent network services for the created composite network service;

performing the processing on the received response information to generate the response information for the created composite network service; and providing the generated response information to the second user.

72. The computing device of claim 68 wherein, for each of at least some of the plurality of registered network services, each associating of a defined representation type with an input or output parameter of that network service is based at least in part on an indication of that defined representation type included in information received from a representative of the provider of that network service.

73. The computing device of claim 68 wherein the determining of the additional information to use in providing the created new composite network services to others includes automatically determining one or more suggested use prices for the created new composite network service that are based at least in part on specified use prices for the constituent network services of the created new composite network service, and automatically determining one or more suggested use conditions for the created new composite network service that are based at least in part on specified use conditions for the constituent network services of the created new composite network service.

74. The computing device of claim 68 wherein the creating of the new composite network service further includes providing information to the user that includes one or more indications of the automatically determined suggested inter-relationships between those constituent network services, and receiving from the user one or more indications of the determined inter-relationships between those constituent network services for use in providing the new composite network service, the indicated determined inter-relationships being based at least in part on the automatically determined suggested inter-relationships.

75. The computing device of claim 74 wherein the determined inter-relationships between constituent network services of the created new composite network service include one or more mappings that are each from an output parameter of one of the constituent network services to an input parameter of another of the constituent network services.

76. The computing device of claim 68 wherein, for each of at least some of the multiple input and output parameters of the plurality of registered network services, the associating of one of the defined representation types with the parameter is performed automatically based at least in part on received information related to the parameter.

77. The computing device of claim 68 wherein the multiple registered network services indicated by the user to be used as constituent network services for the created new composite network service are identified from at least one of search results provided to the user, and of prior actions of other users when creating other composite network services that use at least some of the constituent network services.

78. The computing device of claim 68 further comprising registering each of multiple network services as being available for use by others based on information received from a representative of a provider of the network service, the registering including receiving an indication from the representative that a parameter of the network service has values that represent a type of information distinct from the types of information to which the provided group of defined representation types correspond, defining a new representation type for the provided group that corresponds to the distinct type of information, and associating the new defined representation type with the parameter.

79. The computing device of claim 68 wherein the creating of the new composite network service further includes dynamically determining an interface description that specifies one or more input and output parameters for use in accessing the created new composite network service based at least in part on receiving one or more indications from the user of one or more input parameters for the created new composite network service that are distinct from the input parameters for the constituent network services of the created new composite network service, the input and output parameters specified by the determined interface description including the indicated input parameters.

80. The computing device of claim 68 wherein the registering of the created new composite network service as being available for use by others includes automatically providing multiple distinct interfaces for use by others in accessing the created new composite network service.

81. The computing device of claim 68 wherein the first component and the second component each include software instructions for execution by the one or more processors.

82. The computing device of claim 68 wherein the first component consists of a means for creating a new composite network service for a user by:

provided a group of defined representation types for use in describing input and output parameters of network services, each of the defined representation types corresponding to a distinct type of information;

for each of multiple input and output parameters of a plurality of registered network services, associating one of the defined representation types with the parameter to indicate that values of that parameter represent the type of information to which that one defined representation type corresponds, each of the registered network services being provided by a provider and having been registered as being available for use by others;

receiving one or more indications from the user of multiple of the registered network services to be used as constituent network services for the new composite network service;

automatically determining suggested inter-relationships between multiple of the indicated network services as the constituent network services of the new composite network service, the determining being based at least in part on matching the defined representation types associated with input and output parameters of the indicated network services;

determining additional information to use in providing the new composite network service to others, the additional information including one or more determined use prices for use of the new composite network service, one or more determined use conditions to restrict use of the new composite network service, and one or more determined interface descriptions that each specify one or more input and output parameters for use in accessing the new composite network service; and registering the new composite network service as being available for use by others based on the determined additional information and the determined suggested inter-relationships, the registering enabling the new composite network service to be provided to another user based on the determined additional information, providing of the composite network service including automatically invoking the multiple indicated network services in accordance with determined inter-relationships that are based at least in part on the determined suggested inter-relationships.

* * * * *